(12) United States Patent
Addison

(10) Patent No.: US 7,076,472 B2
(45) Date of Patent: Jul. 11, 2006

(54) KNOWLEDGE-BASED METHODS FOR GENETIC NETWORK ANALYSIS AND THE WHOLE CELL COMPUTER SYSTEM BASED THEREON

(76) Inventor: Edwin Addison, 8395 Scalett Glen Ct., Millersville, MD (US) 21108

( * ) Notice: Subject to any disclaimer, the term of this patent is extended or adjusted under 35 U.S.C. 154(b) by 439 days.

(21) Appl. No.: 10/634,488

(22) Filed: Aug. 5, 2003

(65) Prior Publication Data

US 2004/0143725 A1    Jul. 22, 2004

Related U.S. Application Data

(60) Provisional application No. 60/401,139, filed on Aug. 5, 2002.

(51) Int. Cl.
*G06N 5/00*    (2006.01)
(52) U.S. Cl. .............................. 706/13; 435/6
(58) Field of Classification Search ............... 706/13; 435/6
See application file for complete search history.

(56) References Cited

U.S. PATENT DOCUMENTS

| | | | |
|---|---|---|---|
| 6,355,420 B1* | 3/2002 | Chan | 435/6 |
| 6,358,712 B1* | 3/2002 | Jarrell et al. | 435/91.1 |
| 6,733,743 B1* | 5/2004 | Jordan | 424/1.49 |

* cited by examiner

*Primary Examiner*—Wilbert L. Starks, Jr.

(74) *Attorney, Agent, or Firm*—Lawrence A. Husick; Lipton, Weinberger & Husick

(57) ABSTRACT

A new computing architecture that mimics the behavior of biological cells, called a Whole Cell Computer (WCC) is disclosed. The WCC is a computational architecture based on the biochemical processing of cells. It represents both a specialization and an extension of membrane computing. It is derived from the properties of biological cells and has extensive statistical redundancy built in. It can be programmed using genetic programming techniques.

1 Claim, 17 Drawing Sheets

Illustration of GABA Ion I/O Instruction

Figure 1.1-1.
Eukaryotic Cell Diagram
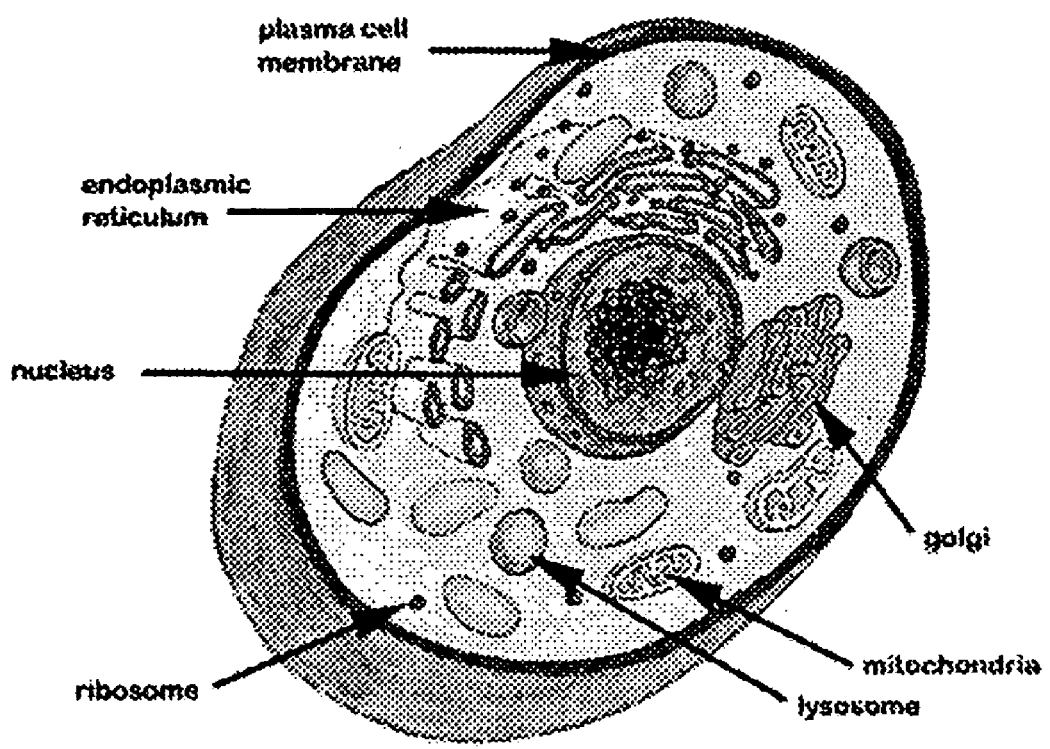

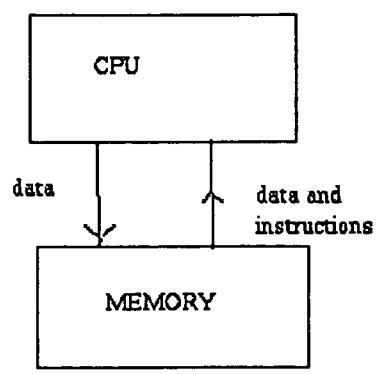
Figure 2.2-1 The Von-Neumann Machine. Illustrates the relationship between memory, data and instructions.

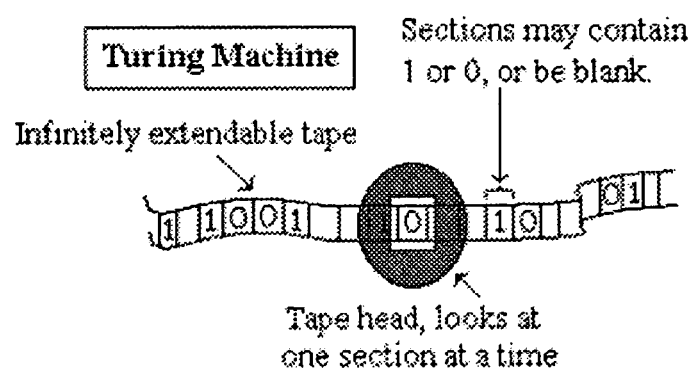
Figure 2.2-2 Turing Machine. Illustrates the concept of an infinite tape with a sequence of binary data. Ref: http://www.brunel.ac.uk/depts/AI/alife/al-turin.htm

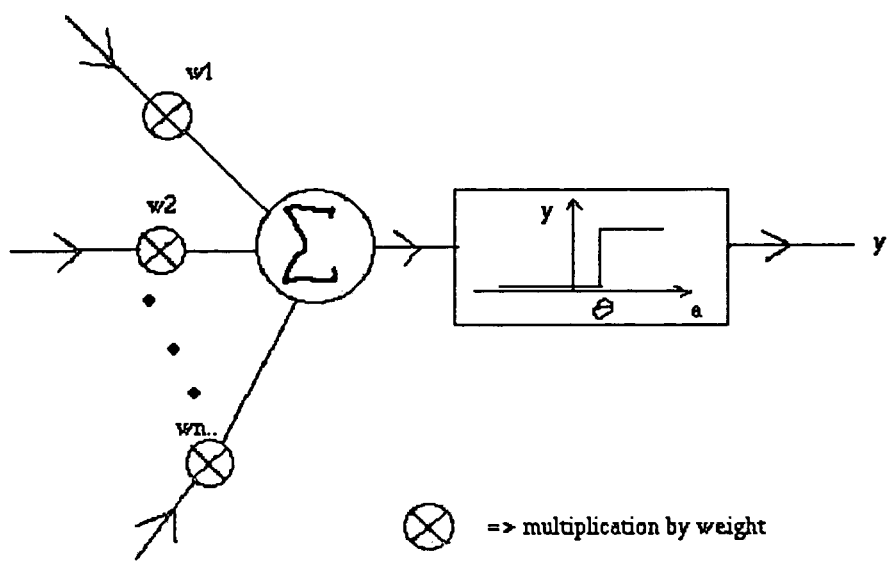
Figure 2.3-1, Neuron for Neural Net Computing, from (Gurney, 2002). Illustrates the method of computation at one node of a neural network.

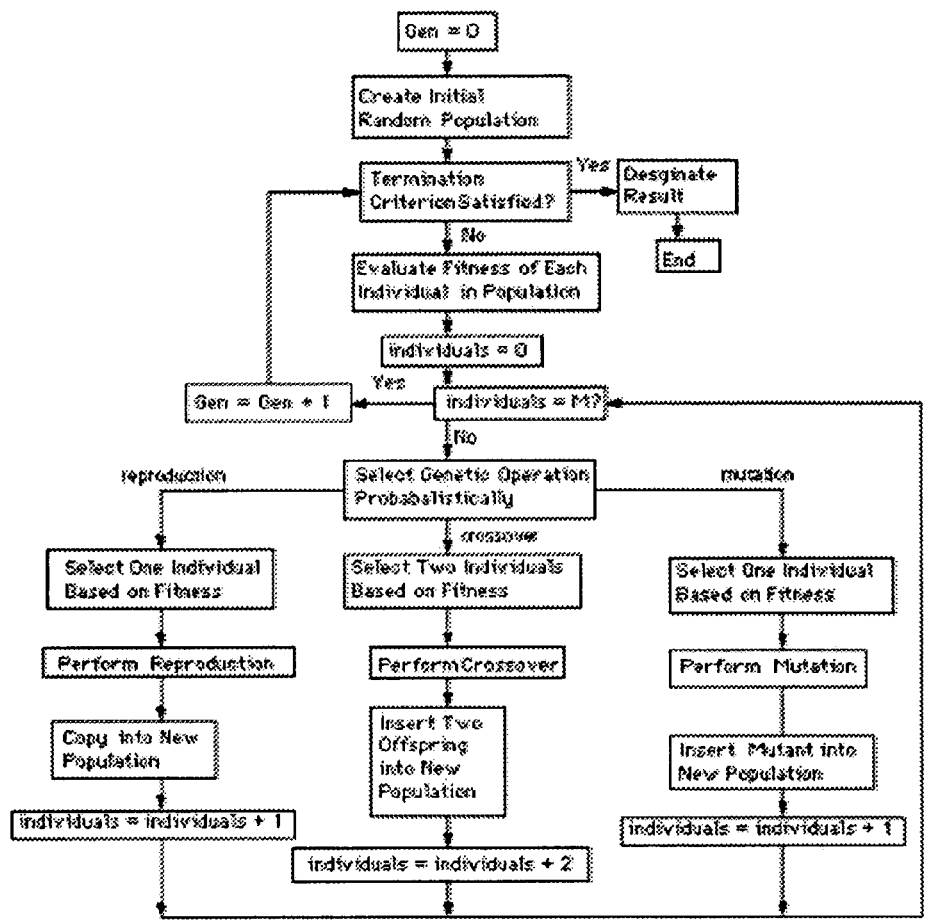
Figure 2.3-2. Flowchart of Genetic Programming. This figure shows the general process of genetic programming including all loops and branches.

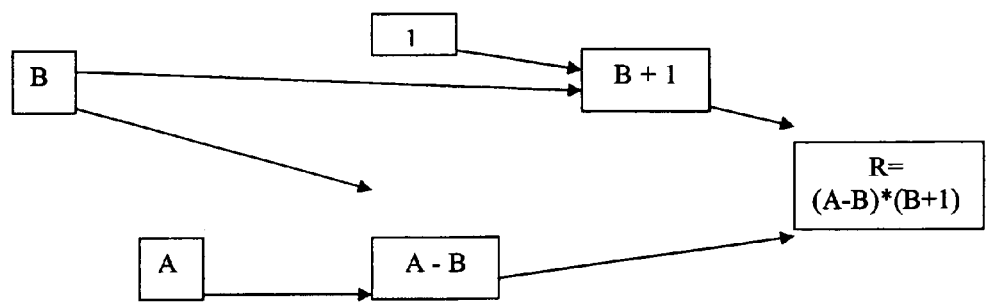
Figure 2.3-3. Dataflow Computing. This diagram illustrates the concept of the flow of operands through a dataflow machine, rather than the classical "fetch and execute".

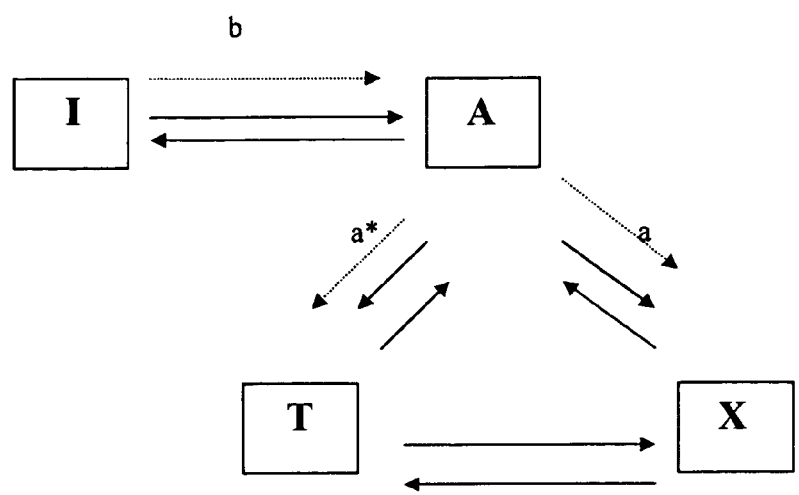
Figure 2.4-1. Regulated Isomerase State Diagram. Shows the flow of information for the Marijuan (1994) model.

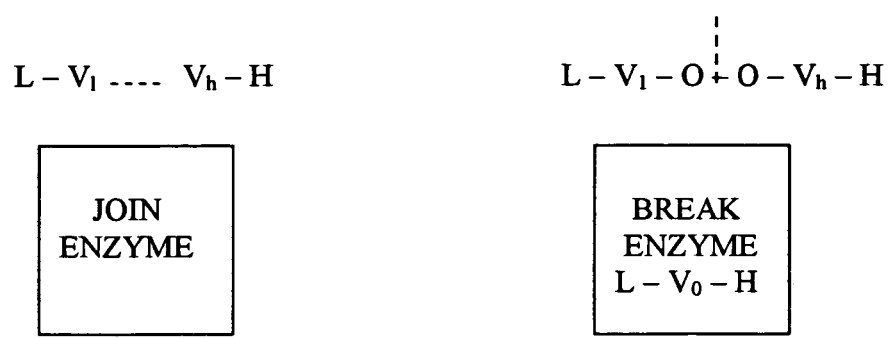
Figure 2.4-2. Shackleton's Join and Break Enzyme. Shows the operators associated with each artificial enzyme.

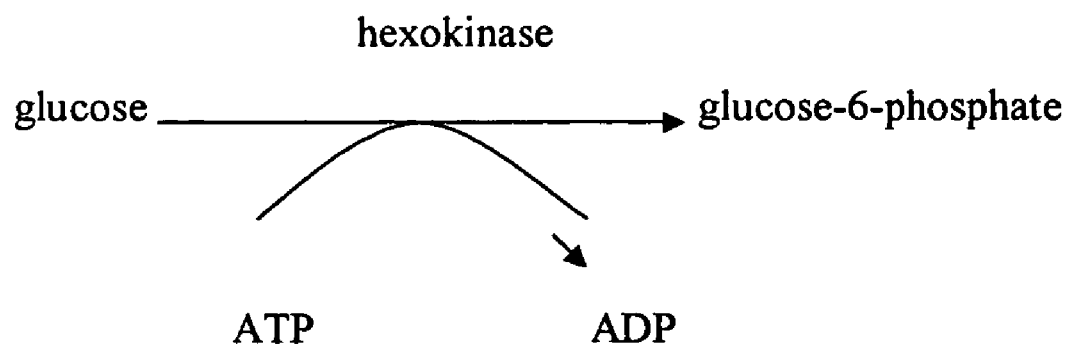
Figure 3.1-1 First Reaction in Glycolysis.

Figure 3.1-2 Lac Operon
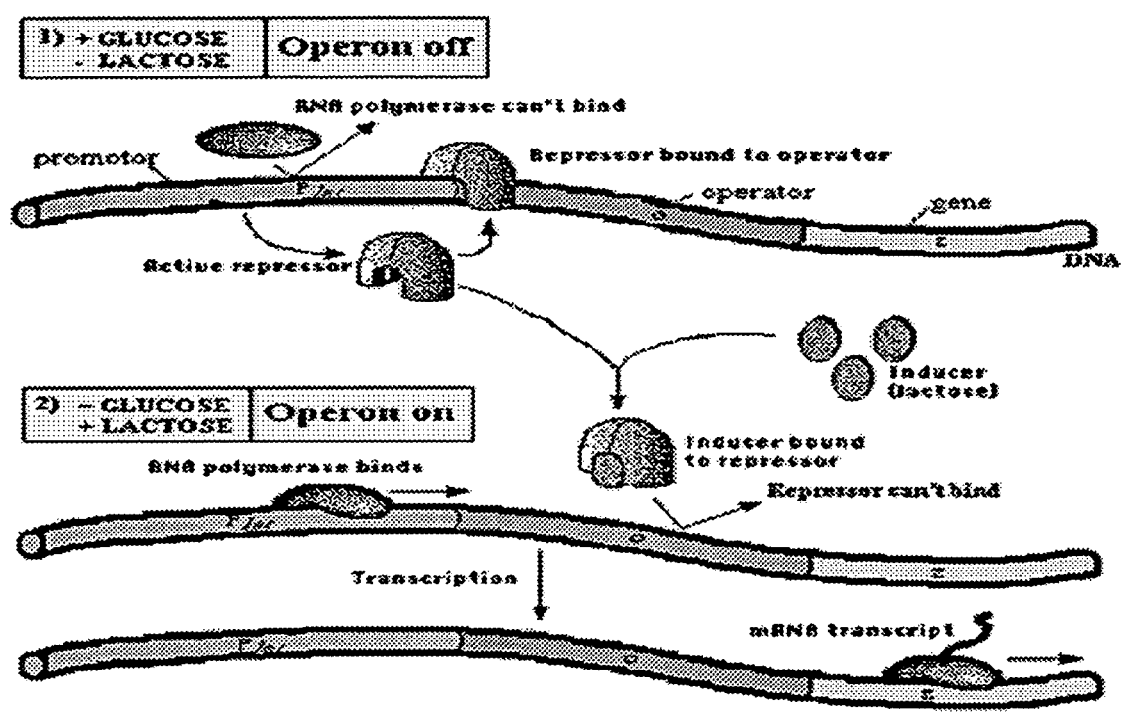

Figure 3.1-3. The JAK STAT Signal Transduction Pathway.
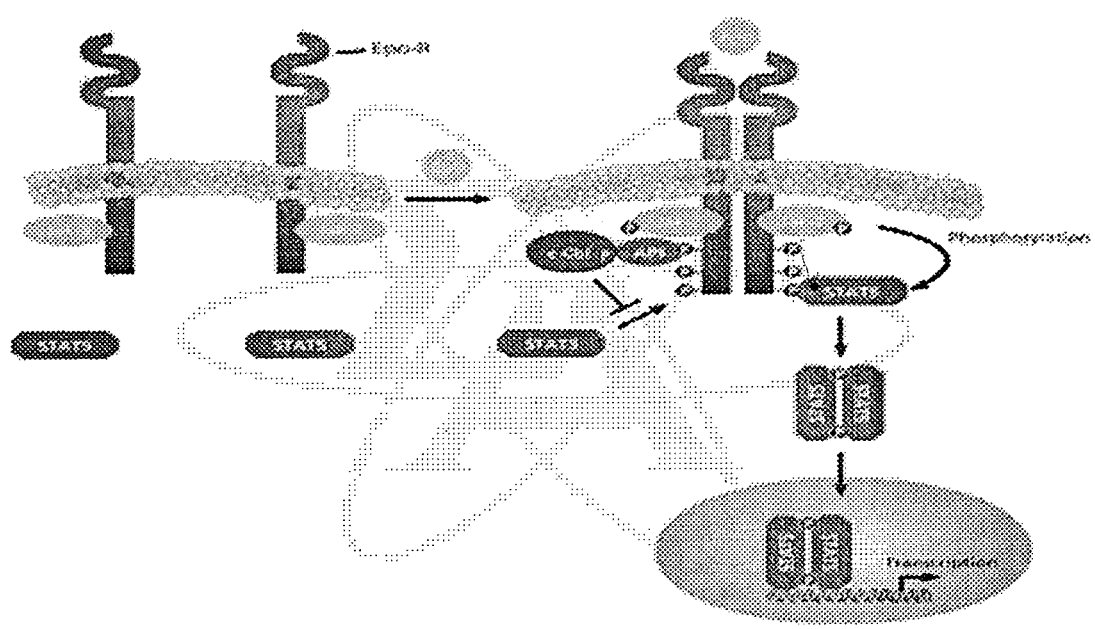

Figure 3.2-1. Illustration of a Node
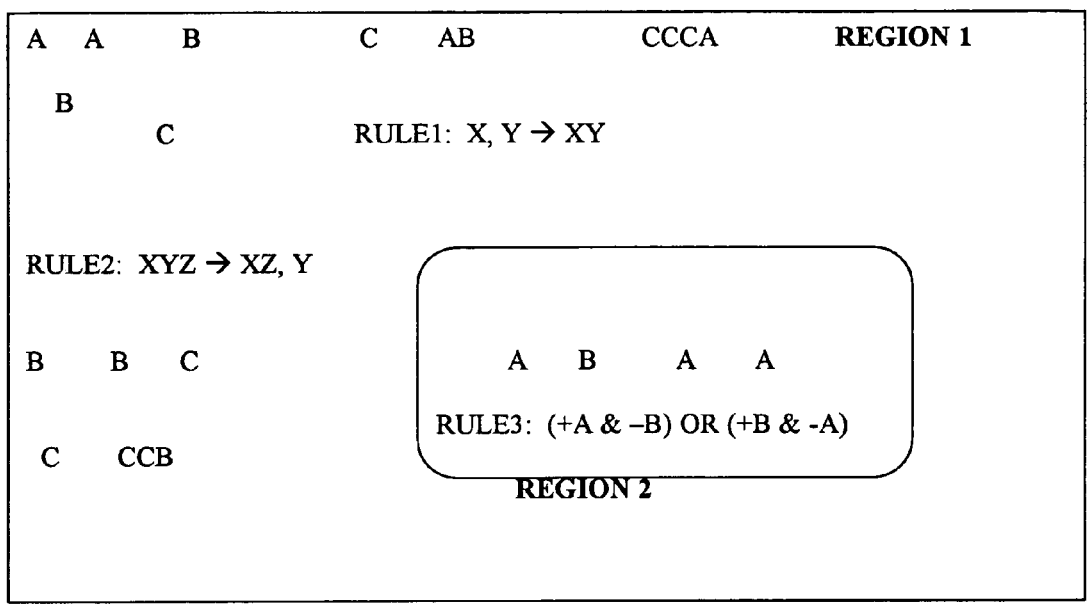

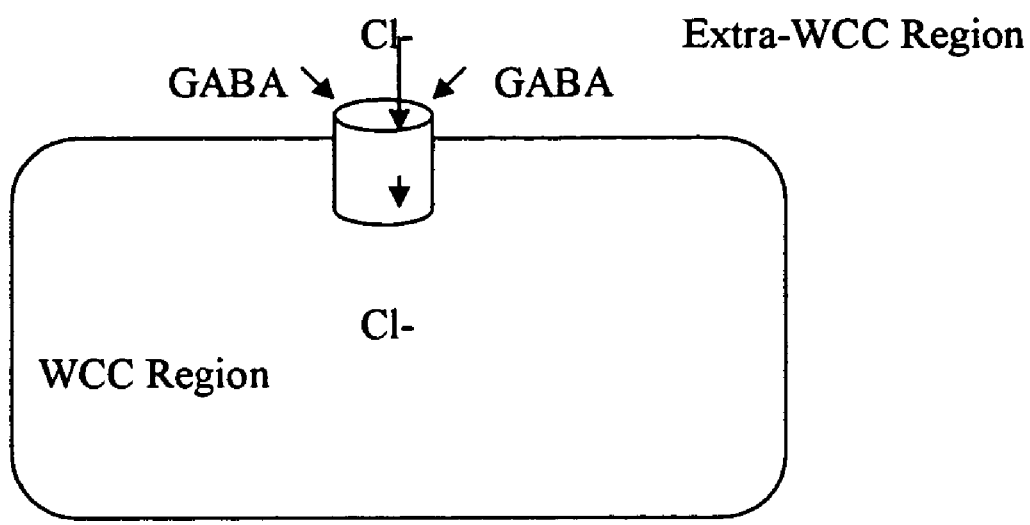
Figure 3.3-1. Illustration of GABA Ion I/O Instruction

Figure 3.3-2 Second Reaction in Glycolysis.
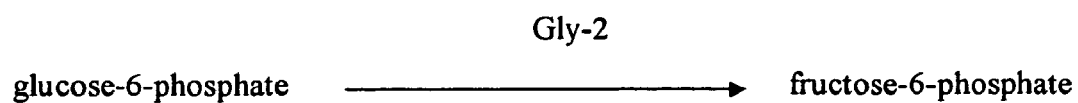

Figure 3.3-3 Illustration of KEGG Pathways for Instruction Compilation
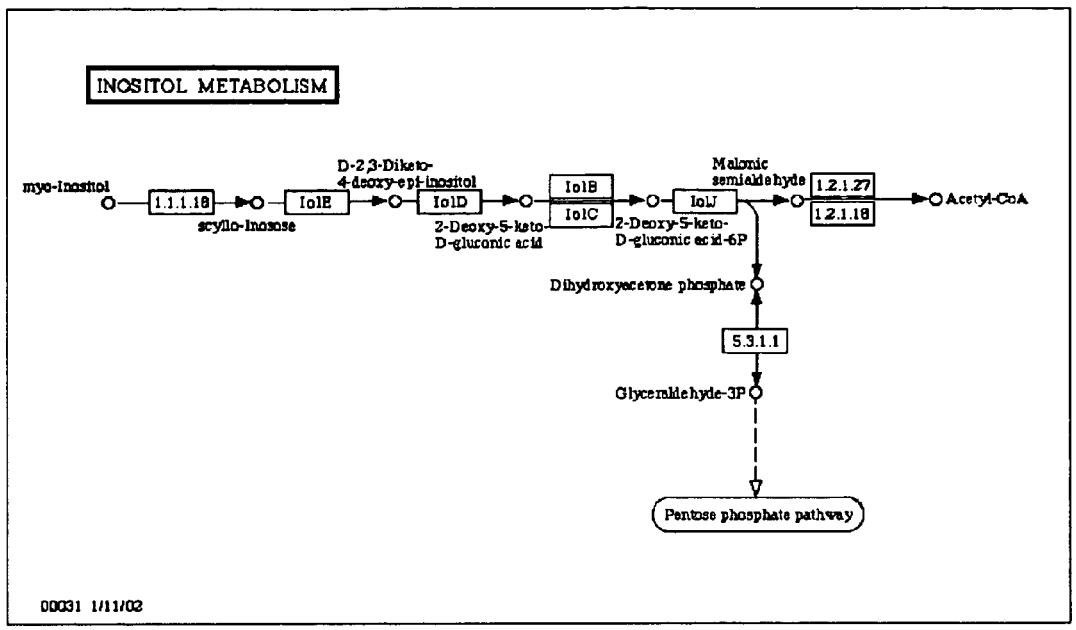

Figure 3.6.2-1. Binary Image of a T.
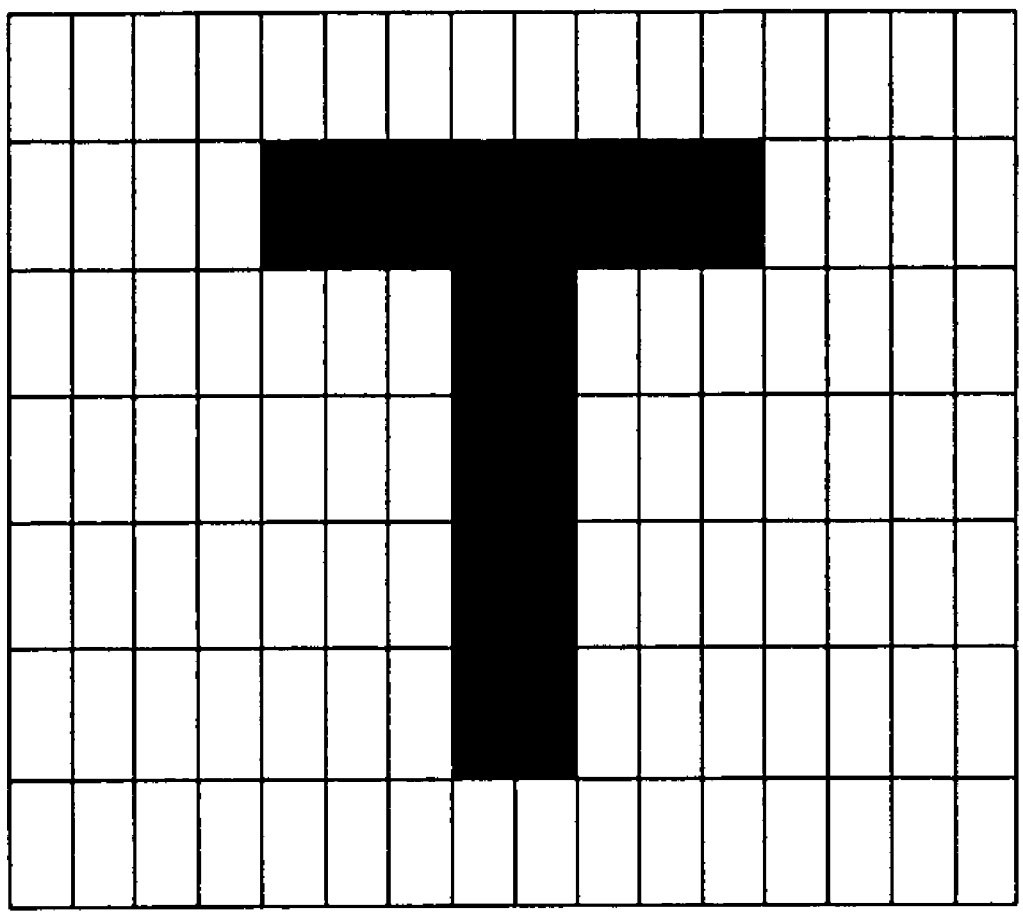

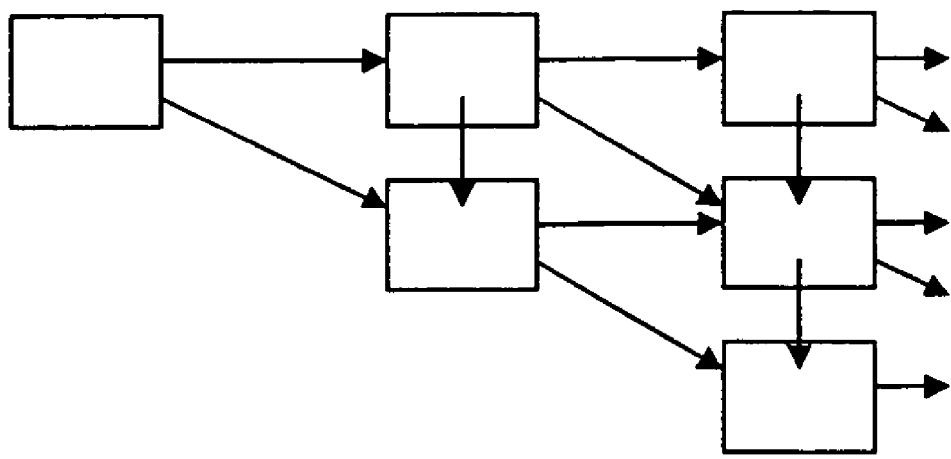
Figure 4.1.1-1 Illustration of CA

KNOWLEDGE-BASED METHODS FOR GENETIC NETWORK ANALYSIS AND THE WHOLE CELL COMPUTER SYSTEM BASED THEREON

The present application is a continuation-in-part of my application No. 60/401,139 filed Aug. 5, 2002.

SUMMARY OF THE INVENTION

A new computing architecture that mimics the behavior of biological cells, called a Whole Cell Computer (WCC) is defined by this research. The WCC is a computational architecture based on the biochemical processing of cells. It represents both a specialization and an extension of membrane computing. It is derived from the properties of biological cells and has extensive statistical redundancy built in. It can be programmed using genetic programming techniques. A single WCC computes by converging on an "attractor" state. More generally, a WCC "computes" by cooperating with a "network" of WCCs. Drawing from recent success in molecular biology, the computational properties of biological cells were characterized in detail. Using biological metaphors, the architecture of a more abstract machine, the WCC, was defined to enable it to solve problems from the field of complex systems. The architecture was evaluated by examples and analysis. It was shown that WCCs exhibit hypercomputing properties, exceeding the computational power of the universal Turing Machine. It was further demonstrated that WCCs offer superior computing potential for pattern recognition, complex simulation and nonlinear control. WCCs further offer superior pattern recognition performance potential than neural networks due to their increased computing power. Examples of each were provided. Several potential hardware implementations were discussed.

OVERVIEW AND BACKGROUND OF THE INVENTION

A new computing architecture that mimics the behavior of biological cells (called a whole cell computer) is defined by this patent application. The Whole Cell Computer (WCC) is a computational architecture only (and is therefore independent of what hardware or physical implementation is used to render it) and it is based on the biochemical processing of cells, it "computes" by cooperating with a "network" of WCCs, and it is "programmed" by genetic recombinations. It draws from recent success in molecular biology, bioinformatics and systems biology and it offers the promise of a machine that can solve pattern recognition problems, complex simulation problems and biochemical process problems (such as drug delivery or toxicity assessment). Depending upon the physical implementation, a WCC could also have significant relevance to the field of nanotechnology.

1.1 Statement of the Problem

Biological computing is a research area that includes efforts to determine how biology does information technology from the sub-cellular level to the systems and population level, and determines computing architectures to mimic these processing techniques (Hickman, Darema, Adrian, 2000). While neural networks, genetic and evolutionary algorithms fit this category (Harrogate, 2001); other robust and novel system ideas are beginning to emerge.

One area that is beginning to show early promise, but is as of yet quite undeveloped, is the development of computing architectures based on the biochemical processing properties of a cell. Some effort shave emerged to model aspects of this in a simple manner (Holcombe, 1994), (Marijuan, 1994), (Welch, 1994), (Winter, 1994), (Shackleton and Winter, 1998). However, there has been no effort to date to define and evaluate a comprehensive computing architecture that fully exploits the richness of cellular processing. The closest research effort to this goal is by Shackleton and Winter. They have outlined a concept in a conference presentation, but have otherwise only developed one processing example based on two artificial enzymes. A technical summary of the processing ideas contained in these research efforts is summarized in Chapter 2.

According to the National Science Foundation (Hickman, Darema, Adrian, 2000), biological computing based on cellular processing has huge untapped potential, but has not yet been exploited by researchers because of the funding focus on bioinformatics and on other faster computer architectures. Ray Paton of the UK is one of the early pioneers in this field. He has published an early edited works (Paton, 1994) and he hosts a biannual international conference on the subject, the International Conference on Information Processing in Cells and Tissues (Paton, 2002).

1.1.1 Biological Basis of Whole Cell Computers

In biology, the simplistic view of a cell as a homogenous, isotropic "bag" of metabolites and enzymes is long obsolete (Welch, 1994). Consider the eukaryotic cell diagram from (Becker, Kleinsmith, Hardin, 2000) repeated below in FIG. 1.1-1. The cell itself can be thought of as a sort of computing machine, although that notion is somewhat controversial (Preuss, 2000), (Lahoz-Beltra, 1998). Direct observation of the cell diagram in terms of biochemical operations leads to several ideas with little effort in thought, a few of which are bulletized below.

- There are numerous enclosed organelles or "compartments", each of which may have different "operations" occurring simultaneously. These operations may or may not be related to each other.
- A nucleus in the center contains the "code" (i.e. DNA) to produce "operands" (i.e. proteins) which are then sent to a particular location by signaling. This process provides the raw material for computation.
- Computation is not entirely based on events internal to the cell, but is influenced by external stimulus activating biochemical pathways (hormones, ingestion of food particles or oxygen, ions, etc.)
- Operations within the "computer" (the cell) may serve various purposes. Some simply maintain the life support system of the cell (the power supply), while others produce output products (i.e. exocytosis), and yet others respond to signals (i.e. signal transduction pathways).
- Proteins, which are the "workhorses of the cell", are the basic elements of computational operation. They are supported by other elements, however, including ions, small molecules, lipids, carbohydrates, and RNA. Their working substrate is cytocol or primarily water. Their processor physical boundaries are membranes or lipid bilayers, which molecules can sometimes pass under certain conditions.
- No single operation is ultimately critical. The results of computation are based on the concentration of operands based on thousands or millions of chemical reactions. Unlike traditional computing where every line of code could potentially crash a program, cells "compute" with the second law of thermodynamics.

A computing architecture based on cellular processing should therefore be based on concrete analysis of cellular processes (Marijuan, 1994) such as enzymes and proteins as the active computing elements and "operands", the ability to self organize through networks of interactions, and an real or artificial cell as the basis for the processing element. Some of the properties that should be encapsulated by such architecture include, but are not limited to (Shackleton and Winter, 1998), (Winter, 1994), (Welch, 1994):

Organization designed from a "process" perspective
Robustness against perturbations (homeostatis)
Processing dynamics reflective of enzyme kinetics
Pattern matching of enzymes leading to specificity for substrates
Evolvability or programmability based on genetic recombination
Operands that mimic the properties of small molecules and ions
Results based on stochastic properties, such as substrate concentrations The specification of a computing architecture based on cellular processing can be separated from its potential hardware implementation. It involves the topology of the regions of processing, the "instruction set" or list of biological operations, a method for genetically recombining the "cell" and thus a method of programming, a method for using multiple "cells" in concert to solve a problem, and methods for implementation of the features above. Due to the daunting complexity of a real cell, and the limited number of architectures defined to date, the best approach is perhaps to define a set of features aimed at solving a specific set of problems, initially from an experimental point of view before attempting to focus on theoretical issues.

1.1.2 Abbreviated Overview of Cellular Based Computing Architectures

The field of biological computing ha had a long history. In particular, there has been substantial work in the areas of neural networks (McClelland, 1986), (Gurney), (Wasserman, 1989), (and many others), genetic programming (Koza, 1994), (Koza, 1999), artificial intelligence (Minsky, 1988), (and many others), DNA computing (Adelman, 1994), molecular computing (Bray, 1995), and bacterial computing (Garfinkle, 2000). These areas are summarized in Chapter 2, but are only peripherally and background related to the current work and represents only a small fraction of this vast field.

However, work in the area of biological computing architectures based on cellular processing has thus far been limited. Cells as well as their biological molecules (i.e. proteins, enzymes) are capable of processing information, but such information processing differs from traditional digital computers. Paton (1994) is an early pioneer in this field and he introduces several concepts for cellular architectures in his edited works and biannual conferences.

The principal philosophy for computing architectures based on cells is to represent some aspects of cellular biochemistry as the computation of suitably defined data. There is a nascent, but growing body of work in this area, including Paton (1994), Shackleton and Winter (1998), Holcombe (1994), Marijuan (1994), Preuss (2000, Summer), Lohaz-Beltra (1997, 1998, 2001), and others.

Relating biochemical activity to computing is a concept that began over 50 years ago. Early work by McCulloch and Pitts (1943) and Rosen (1967) explored these ideas. McCulloch proposed the first computational model of an artificial neuron in 1943. Rosen provided a systems model for neuron computation. These early efforts focused on cell computing for neurons only, which eventually led to neural nets, rather than the present notions of cellular computing architectures.

An early attempt to model metabolism was provided by Krohn (1967). They used finite state automata to model metabolic reactions. Their goal was to use the computer to understand the biochemistry better. The significance of their work to the present effort is that it captured the concept of using chemical reactions as a computing metaphor, a notion that is deeply nested inside the WCC architecture.

Welch and Kell (1986) explored the notion of multicellular computation. They were the first to define the state of a machine by chemical concentrations. The significance of their work to the present WCC work is that it introduced two important notions: 1) computing based upon statistical concentration levels, and 2) computing based upon internetworking of individual "cells".

More recently, a simple example of using cellular biochemical activity to model state changes is provided by Holcombe (1994) using the Krebs cycle. Here, he modifies the Krebs cycle as a state machine. This work was one of the first to compute with a complete biochemical pathway.

The most recent work, and the most relevant to this current work is Shackleton and Winter (1998) who also propose a computing architecture based on cellular processing, but other than a single example of artificial enzymes to accomplish a numerical sorting function, they offer few details as to how one would work. Cellular architectures are the subject of this research project. Enzymes therefore are considered key ingredients in any computing model based on the cell. Enzymes are proteins that exhibit specificity for particular substrates (thus they are "instructions" that trigger upon the arrival of an operand much like the dataflow computing concept). In essence, processing within cells are highly parallel, asynchronous, stochastic dataflow machines that are self-programming and whose input is determined by the environment. Shackleton and Winter also suggest that cellular computers should be programmed by genetic algorithms, but offers no mechanistic detail as to how this might be done. The architecture proposed by Shackelton and Winter is a starting point for WCC as it expresses some of the nascent ideas for WCC, but does not complete the architecture, nor the details beyond notions except for the sorting problem with the join and break artificial enzyme.

In Chapter 2, three small examples of instruction processing based on enzymes and/or metabolism as reported by Holcombe (1994), Marijuan (1994) and Shackleton and Winter (1998) are summarized. These examples include an enzyme from the Krebs cycle shown as a computational instruction, an allosteric protein that can be in one of two states, and two artificial enzymes designed to sort a list of numbers, respectively. These provide simple examples at the level of the computational instruction. None of these authors except for Marijuan briefly, report on system dynamics. The mechanics of system dynamics, which undoubtedly plays a significant role in the definition of any architecture based on cellular processing, has been described by Bower (2001), Addison (2002), and Yi (2001) in numerous examples of differential equation models, Boolean models and stochastic models.

An even more recent innovation is the concept of membrane computers. These have been proposed as a generalization of cellular processing (Calude and Paun, 2001). A membrane computer can be represented by a Venn diagram with no intersecting regions. Each region is an area for computation. Outputs of computation in one region make inputs to other regions. Calude and Paun have addressed membrane machines in theoretical depth. He describes a system where "objects" inside membrane regions "evolve" through a series of computational steps and rules. A computational system, called a "P System" will halt when no object can further evolve. Calude and Paun explores several variants of P Systems from a theoretical perspective by investigating properties such as decidability conditions and normal forms. However, Calude and Paun provided no practical computational examples or implementations of a membrane machine, nor has a P system yet been developed. Computing with membranes starts from the analogy of processes, which take place in the complex structure of a living cell with a computing process.

There is a confluence of reasons why this field is ripe for rapid advancement, including:

The explosion in molecular biology and bioinformatics research resulting in extensive databases of relevant information online.

Compelling, but as of yet unproven visions of the pioneers in the field including (Paton, 1994), (Marijuan, 1994), (Shackleton and Winter, 1998), (Holcombe, 1994), and others.

The lack of biology skills and knowledge by traditional Computer Science researchers is beginning to be filled by the growing number of bioinformatics degree programs at universities.

To achieve success, early architectures are needed that solve specific problems so that details can be understood. There is a need for experimental work developing architectures aimed at solving specific problem, rather than the purely theoretical work of, say Calude and Paun (2001). Some of the challenges that will be faced by any system designer include, but are not limited to the following:

Computational complexity sufficiently bounded so as to make a physical realization or simulation feasible.

Identification of viable physical platforms beyond simply analytical studies or software emulation.

Programming, which is or will be genetic/evolutionary rather than explicit in most cellular processing systems.

Finding a methodology to map multiple cellular computing components into a network so as to cooperatively solve a problem.

Finding techniques to extract instruction sets from biological metaphors using available bioinformatics databases as a resource.

Incorporating the stochastic way of computing into practical problems.

Assessing the performance of systems to determine practical limitations.

Developing a precise system specification for a large scale, self-evolving system.

In this research project, an experimental, comprehensive cellular motivated computing architecture called a "Whole Cell Computer" was developed. The main research objective was to define a generalized architecture and apply it to two suitable and practical problems: 1) the simulation of lymphocyte response in the immune system, and 2) intelligent character recognition. The former is a strongly biological problem, which is highly suited to defining the requirements of the WCC. The latter is a well-known pattern recognition problem that should be well served by a network of genetically programmed WCCs. The main goal was to learn the useful features, performance capabilities and suitable programming tasks for cellular processing architectures.

1.2 Purpose

This project exposed new insights by defining the concept of the Whole Cell Computer (WCC). A WCC is a computing structure that acts like a cell. It is defined sufficiently general so that it can be a real cell, or it can be considerably simpler than a real cell, yet exhibit many of its properties.

1.2.1 Significant New Innovations.

The central problem of the conception of the WCC was a task to characterize some of the main computational processes of a biological cell and devise a computing architecture using these ideas as a metaphor. There were two significant innovations work advancing the state of the art:

The derivation of the design of the architecture based upon the extraction of computational instructions from established bioinformatics databases and from modeling a biologically relevant complex computing problem An illustration of the architecture working on an established, nontrivial computing problem, including statistical interpretation of computational instructions and genetic recombination to "program" performance These innovations are significant because no architecture based on cellular processing or membrane computing to date has yet been illustrated over a large-scale computing problem, nor has one been shown to be genetically programmed in mechanistic detail. Hence, there was both an accomplishment of useful scale and an accomplishment of detail, which elucidates features and limitations of these architectures, which were not previously known.

The significance of these innovations is threefold:

It brings new understandings of distributed computing by solving problems with a new paradigm. Greater practical and theoretical understanding will be attained.

It offers the potential of using real biological cells as computing devices.

It potentially leads to greater understanding of biology (from forward modeling), which may include insights into why selective cell properties are the way they are.

1.2.2 Made Possible by Recent Advances in Molecular Biology.

Recent advances in molecular biology and bioinformatics have dramatically improved our understanding of the inner workings of the cell. The cell is clearly an information-processing engine (Lahoz-Beltra, 1998), (Preuss, 2000). The ability to reduce the cell to its component parts leads next to the ability to reassemble the parts into a working system. The field of whole cell simulation that attempts this is in its infancy, but the work on whole cell simulation, particularly stochastic simulation has been drawn on directly in this work.

Impact on Complex Systems Theory. The theory of complex systems (Bar-Yam, 1992) is a potential "gold mine" to serve in this respect. Not only is the cell itself a complex system, but also the cell operates in a larger complex system (tissue, organism, or ecosystem).

Beyond what has been suggested, the WCC will lead to new ways of doing complex systems modeling by networking many WCCs together. In fact, the implementation of a WCC to solve a practical computing problem will almost always involve the working together in concert of many WCCs. While this notion of complex systems using WCCs will be generally out of scope for this research, its direction will be defined. Such complex systems models with WCCs are expected to generalize to many areas:

Economic or stock market simulation

Evolutionary biology

Cosmology

Weather

Sociology

Biological and medical systems

Ground Floor Opportunity. The status of funding a peer reviews in the field is still low, combined with the recognition that this problem has high potential. This is then an unusual opportunity to participate in an emerging field early. The reasons are varied, but most certainly include the tremendous focus of attention on bioinformatics and Genomics which draws on the shortage of qualified researchers in the area. Hickman ET. Al. (2001) in an NSF Report on a workshop held in early 2001 describes the area of biological computation has having "huge untapped potential" and stated that research in the area has been "scattered, not well focused, and often very application oriented".

In addition to the reason cited above, an additional reason that research in this area has been ignored is that computer scientists have thought biology to be uninteresting as a model for computing because the resulting architectures would be very slow (Hickman, et. al., 2001). In fact, this view is changing because of the massive parallelism that is exploited by biological systems. Further, biological architectures are possibly slow only when considering a cell as the basic unit of computation. When a cell is seen as a computing element and the focus is on what is inside of a cell as in the present work, computational steps can be very fast at the molecular level.

The combination of the cited huge untapped potential, the shortage of researchers in the area and the large draw on these researchers by bioinformatics and Genomics leaves biological computing open as a fruitful area of research with high probability of breaking new ground, particularly for a self funded project such as this one. For example, Hickman ET identified determining the "instruction set" for biology. Al (2001) as needed research in support of NSF's ten-year goals, yet we are delving into that in part in the current research.

This is an exploratory research project. The output of this work is expected to provide advances in three areas:

Definition of WCC, a new type of computer

New insights into how cells work systematically, and accompanying improvement in our ability to simulate them New concepts for using real cells as computing devices Part of the motivation behind this work is a simple analogy: "More was learned about how a bird flied by building an airplane than by studying the anatomical properties of birds." This research will not only provide the basis of a newly defined computing architecture, but it will also provide new insights into biology.

The primary "thesis" of this work is that a WCC can be defined that exhibits biologically motivated attributes not found in conventional von Neumann machines, including but not limited to the following features:

1. Control is distributed with many inter-related processors operating asynchronously in parallel
2. The machine is a data flow, not a control flow architecture
3. Execution is driven statistically and therefore the principles of "soft computing" are used and results interpretation based on entropy and thermodynamic principles are considered
4. Programming takes place by adapting to the problem environment and surviving competitive solutions, using genetic programming techniques
5. Instructions can be derived from bioinformatics by mining databases
6. The solution of problems using a WCC is accomplished by deploying a large network of WCCs that operate together
7. "NP complete" problems can be solved in linear time by deploying an "exponential volume" of processors
8. The computer can be considerably simpler than a real cell, although real cells could potentially be used as WCCs A key purpose of the research is to demonstrate these features and to assess the capabilities and limitations of WCCs in general. This research is "experimental" in nature rather than theoretical. However, the work experimental refers to the development of computing paradigms rather than laboratory exercises.

The work is derived by two rather different computational examples to insure robustness. The first of these is to simulate a portion of a human immune system. This biological example is used partly to derive the basis of the detailed definition of the WCC in Chapter 3. The second computing example is to use a network of WCCs cooperatively to do intelligent pattern recognition. This was also used in Chapter 3 to serve as a partial basis of the functional definition of a WCC. Genetic programming techniques will be used to optimize the performance by modifying the instruction set (genetically).

1.3 Questions Addressed

A summary "high level" definition of the WCC is provided in this section.

1.3.1 Main Objective

This research leading up to the design of the WCC sought to answer the following main question: "How can one define and utilize a computational paradigm based on the biochemical behavior of eukaryotic cells to solve complex computing problems which are otherwise difficult for conventional machines?"

1.3.2 Sub-Questions

In answering that question, the research explored to varying degrees of depth, answers to the following "sub-questions".

1. What are 10 examples of computing instructions that typify a WCC?
2. How are the concentration levels of "operands" and the second law of thermodynamics relevant to computing with these instructions?
3. What are the architecture of WCC in terms of "organelles" (compartments or membrane bound subsets), the "nucleus" and its functions, and the concentrations levels of "operators" (i.e. enzymes)?
4. How are sample instructions "derived" from bioinformatics databases?
5. How are WCCs configured into a network to solve problems?
6. How are WCCs "programmed" using genetic programming techniques?
7. Show 2 examples of computing problems and how they are solved using WCCs (lymphocyte response simulation in the immune system, and intelligent character recognition).
8. How well do WCCs perform in terms of time to solution, computing resources required, time to program, ability to solve a problem (computability), etc.?
9. What classes of problems are best solved with WCCs and networks of WCCs? Provide an assessment of their computability.

10. What are some potential physical/hardware implementations for WCCs?

1.3.3 High Level Definition of the Whole Cell Computer

Consider a computing device whose mechanistic behavior mimics that of the genetic and biochemical activities of a biological cell. We shall call such a device a "whole cell computer" or WCC. A WCC shall consist of all of the following:

- Any computing device that behaves similar to a biological cell and whose computing operations, operands and data elements behave in similar ways to enzymes, proteins, pathways, transcription factors and other objects involved in cellular metabolism, signaling or functioning.
- The device may be a real or artificial biological cell, a processing element implemented in silicon that exhibits the defined WCC properties, an abstract device that is emulated in software, a device that is implemented with chemical elements, or any other conventional or unconventional elements as long as the device exhibits the defined properties of a WCC.
- The processing of a WCC is statistical and behaves according to the second law of thermodynamics with respect to its operations, operands, instruction set and data elements when absent any other imposed constraint. The processing of a WCC has features that mirror cellular operations such as signaling, transcription, translation, vesicle trafficking, enzyme activation, Michales-Menton kinetics defined over its operations and operands, exocytosis, extaracellular communication, etc.
- The WCC is designed to operate in a network with other WCCs in order to accomplish a task. This network can be loosely connected (as in a bacterial colony), or tightly connected (as in a solid tissue), or some combination (perhaps functioning like erythrocytes in the bloodstream).
- Programming of a WCC is genetic or artificially genetic. In other words, the creation of diversity and the survival of the best WCC elements "programs" a task. Specific ways this can be accomplished are discussed below.
- The WCC is capable of the following kinds of "calculations" or "computing". We have broadened the definition of computing to include certain chemical processing tasks such as medical intervention, toxic waste removal, etc. as well as simulation of complex systems in the more conventional sense (which we expect to be one of the most valuable uses of a WCC). Thus the word "computing" can also refer to drug discovery, Nanotechnology, instrumentation, simulation or emulation, as well as conventional computing. It is expected that pattern recognition tasks will perform quite well with a WCC. Examples of WCC computing problems may include:
  - Search problems (needle in a haystack) by using WCCs as "intelligent agents"
  - Handwriting recognition, speech recognition (if we can find a fast enough implementation), or machine vision problems
  - Simulation of complex systems such as weather, the stock market or the behavior of biological systems
  - Molecular sensing or drug delivery (real or simulated)
  - Measurement of contamination levels of biochemical's or toxic wastes
  - Genetic measurements
  - Bioinformatics problems, particularly identifying unknown functions
  - Data mining of any kind A WCC is not explicitly programmed. Instead, its "genome" is modified based upon use, environmental competitive conditions, simulated genetic crossover, real genetic crossover in the case of the use of real cells, or any other process designed to mimic the properties of genetic mating and evolution in a competitive ecosystem. The details of such programming will vary based upon mode of implementation of the problem being solved. An algorithm is provided in Section 2.3 and examples will be provided in Chapters 3 & 4.

Instructions and calculations may be a real or metaphorical implementation of any cellular biochemical process. Examples include, but are not limited to:

- Using a "ligand" or ligand metaphor to activate a "signal transduction cascade" that is a series of instructions that produces one or more "objects" (molecules) in concentration and whose presence leads to a later instruction activation.
- "Vesicle trafficking", or the translocation of an operand from one WCC compartment to another, triggered by the presence of an "enzyme"
- Logic decisions which are made by the presence or absence of an adequate concentration of an operand (ligand, enzyme or transcription factor).
- State measurement of energy (i.e. presence of ATP), which indicates whether or not, the WCC can continue to operate (adequate metabolism insures that a cell has energy, a similar "calculation" will determine the ON or OFF state of a WCC).
- "Digestion" or catabolic pathways correspond to the self-destruction of objects or instructions so that they can no longer operate.

1.4 Limitations/Delimitations of Study Leading up to WCC

This was an exploratory study and an experimental study in applied computer science motivated by advances in biology. An experimental architecture was defined by examining the needs of a focused computing problem—the simulation of lymphocyte response in the immune system. Then the architecture was used to solve a different problem—intelligent character recognition. The latter was implemented as a simulation in the C programming language and genetic recombination was used to optimize the architecture. The performance was assessed based on simulation results and analysis. Capabilities and limitations as well as conclusions were drawn by observation of the simulation and the design.

To focus the current effort, a WCC was defined with an illustrated implementation (in software and algorithms only) that has an instruction set that uses 10–20 biologically motivated instructions. Such instructions were drawn from functions like biosynthesis of an amino acid, a particular signal transduction pathway, a metabolic function like glycolysis or aerobic respiration, exocytosis, ubiquinin tagging, actin synthesis, transcription factor translocation into the nucleus, etc. The instruction set was general enough to account for DNA function, transcription, translation etc. as well as molecular (i.e. enzyme) function. The instruction sets was used to solve some basic computing problems like logical comparison, pattern recognition or multiplication.

The architecture defined by this effort considers the algorithm and configuration only. No hardware implementation was explored or implemented beyond assessment of what a good hardware platform might be. The algorithms were defined by practical need. This was not a study in theoretical computer science. Hence, no effort was made to develop theorems and proofs about theoretical performance bounds or properties.

Some of the novel issues that were addressed and reported on by the study include:
1. The use of bioinformatics databases to compile representative instructions.
2. The use of a truly biological and distributed problem (simulation of lymphocyte response in the immune system) to define instruction sets, architectural configuration and state variables of importance.
3. The use of genetic programming to optimize the architecture for solving a problem—something that has only been speculated but not demonstrated for cellular architectures.
4. A processing mechanism that takes into account "operator" and "operand" concentration levels in a statistical and/or stochastic manner as required. This has only previously been demonstrated in systems biology, and is for the first time mechanistically applied to cellular processing architectures here.
5. Insight into performance based on an illustration of two problems (intelligent character recognition and immune system simulation). There is currently a lack of such data and performance from even one problem area will be novel and insightful. A table of performance for several problem classes was provided.

To achieve these results in a timely and resource-constrained manner, several delimitations on the scope of the studies were made. These were selected such that the results are still quite meaningful, yet a reasonable rate of progress could be made. These delimitations included:
1. The immune system simulation problem was limited to one antigen and the modeling of 4–6 "objects" in determining the response. The model was done manually and used primarily to elucidate the definition of needed features of the WCC.
2. The character recognition problem was limited to 10 characters (the digits).
3. The use of bioinformatics databases to compile instructions was limited to the application of two databases (KEGG, EcoCyc) to two of the 10 instructions to show mechanism and feasibility.
4. The use of genetic programming for the purposes of training or "programming" a WCC was limited to using existing genetic programming techniques. No new research on genetic programming was conducted.
5. Experimenting and assessing performance of WCCs was limited to providing example computations and an analytical assessment of the performance and computability of classes of these problems.
6. The approach to character recognition will be based on existing work (Yeshurun, 2001) and does not advance the state of the art there.

1.5 Overview

The following disclosure is in a five-chapter format, with the remaining four chapters described as follows.

1.5.1 Summary of Chapter 2: Prior Art

Chapter 2 provides a critical review of the current literature and identifies shortfalls that can be exploited in the near term. It begins with Section 2.1, which defines biological computing.

Before surveying the history of computing metaphors based on cells, the stage is set by briefly summarizing two standard computing paradigms, The Turing Machine and the Von Neumann Machine in Section 2.1. This is then followed by a broad, but brief survey of biological computing paradigms in Section 2.3 in order to position the present work relative to other biological computing paradigms.

A historical and important overview of the other work in the field of computing architectures based on cellular processing, the specific area of the WCC concept is then provided in Section 2.4. This justifies the need and sets the stage for the present work, and then an outline of unexploited areas for research in this field are provided in Section 2.5.

1.5.2 Summary of Chapter 3: Methodology

Chapter 3 provides a detailed definition of the Whole Cell Computer. This definition is arrived at fully by using the biological computing example of simulating the human immune system with a network of WCCs.

The Whole Cell Computer is defined in detail, including sample instruction sets, examples of how it computes using concepts from the second law of thermodynamics, how WCCs are networked to solve large problems and the methodology of using genetic programming to "program" the computer. A methodology for extracting instruction set elements from bioinformatics databases will be presented.

A biological function—the simulation of the immune system—is used as a manual example to insure the issues addressed are adequately broad to be useful. This is a good example to use to focus the definition effort of the WCC because the problem is biological in nature, well characterized (Abbas, 2000), and highly represented of distributed computing networks.

Research Methodology Described in Chapter 3. To achieve the purpose above, the following research plan was used to guide the work:
1. Define the WCC architecture in detail including instruction set examples and processing mechanisms. Use the simulation of lymphocytes in the immune system in response to an antigen as a computing problem to focus the WCC definition effort.
2. Develop 1–2 dozen sample instructions that are biologically motivated, illustrative of the WCC features, spanning the range of capabilities of WCC and can be used to illustrate various computing problems, and capable of solving the immune system simulation problem being used to drive the effort. Instruction results must be interpreted based on concentration levels and not simply a single execution.
3. Define how WCCs operate together in a network to solve computing problems. This will be modeled after the tissue computing ideas expressed in Paton (1994), after the complex systems ideas in Bar-Yam (1992), and including the immune system example provided by Bersini (1994).
4. Develop computational illustrations using the instruction set of a half dozen smaller computing problems of various types such as simple pattern recognition, sorting, logical comparison, multiplication, optimization, and parsing.
5. Define how WCCs are "programmed" using genetic programming as described in Chapter 2 and possibly draw from DNA and molecular biology principles as a guide. Be specific and detailed and go beyond that of the mere suggestion of use of such principles as made by Shackleton and Winter (1998) and others.
6. Design a WCC network and define a simulation to evaluate it to solve the problem of character recognition using the numerical characters 0, 1, . . . 9. The purpose of this was to show the ability of a WCC in a network to act as a pattern recognition machine.

7. Suggest possible hardware and/or physical implementations of WCCs.

Approach to Defining WCCs Using Lymphocyte Response Simulation. The immune system is a highly distributed, complex and asynchronously parallels system of cells, antibodies, antigens and signaling molecules. To simulate lymphocyte response requires differently defined WCCs for each element of the system. For example, a different WCC architecture (instructions, compartments, concentrations) is needed for a B-lymphocyte, an antigen and an antibody, among others. Specific actions are simulated by defined instructions in each WCC type.

For example, a common action in the immune system is when an antigen is presented to a lymphocyte causing the release of cytokines (Abbas, 2000). This leads to the specification of instructions and "cell organization" by modeling the specific action. The biochemical pathway causing the release of cytokines may be identified by referencing the KEGG database (Kanehisa, 2000). This pathway then represents the model of a WCC instruction. In the overall simulation, when an antigen comes in contact with the lymphocyte, that instruction sequence will be activated, causing an increase in the concentration of "cytokines", an object which can trigger other WCC instructions. Then, the overall dynamics of a "system" or network of WCCs determines the overall outcome. In this case, the overall outcome may be a mapping of the number of active lymphocytes as a function of time, where an "active" lymphocyte is one whose concentration level of a specific operand is above a certain level, the choice of which may be determined by genetic programming.

Approach to the Intelligent Character Recognition Problem. The intelligent character recognition problem is classic and has been solved in many ways with varying degrees of success (Yeshurun, 2001). To solve the intelligent character recognition problem with WCCs, one must define the representation of a character, perhaps as a dot matrix plot. Then, WCCs "operate" on the dot matrix by having instructional pathways "stimulated" by the dot pattern.

An architecture for the WCC network was determined. One possibility that was explored was to have a large number of identical WCCs that freely float over the dot matrix representation of the character to be recognized. Each WCC had N membrane bound sacs of instructional pathways, each corresponding to one of the characters in the alphabet over which recognition is to take place. (For example, the character set might be {0, 1, . . . 0, A, B, C . . . Z}). Various "enzymes" transfer "operands" to organelles based upon stimulation by the character grid. The enzyme rules were parameterized and genetically recombinable using the algorithm provided in Section 2.3, FIG. 2.3-2.

1.5.2 Summary of Chapter 4: Findings

Chapter 4 provides the results of a performance analysis of WCCs and an assessment of the computability of various classes of computing problems with WCCs. This is accomplished through a series of simple illustrative analyses, followed by an analysis of the different problem classes.

The purpose of Chapter 4 is to provide results of the performance analysis and computability for several classes of computing problems with the WCC. The ultimate objectives were to assess the capabilities and limitations, computing classes and ultimate potential of the WCC as a computing device.

Research Findings Tasks in Chapter 4. To achieve the purpose above, the following research plan was used to guide the work:

1. Describe the generalities and limitations of WCCs. Discuss categories of computation that WCC is good for. Discuss how WCC generalizes in networks. Compare to theoretical limits of Turing machines and of membrane computers.
2. Analyze and describe the performance of WCCs according to various metrics. Using two or more of the computing examples, evaluate the performance of the WCC including, but not limited to the following aspects: accuracy, fault tolerance, speed of computation, frequency of convergence, time to program, ability to program.
3. Identify the classes of problems that are most suited to computation by WCCs and networks of WCCs and assess the computability of these problem classes using analytical techniques. The problem classes addressed include, but are not limited to pattern recognition, simulation, signal processing and control. Computability is assessed by analytically examining the underlying computing algorithms when implemented on WCCs in terms of tractability and efficiency.
4. Analyze theoretical performance limits using computational complexity analysis based on the previous research methodology in Chapter 3.

1.5.2 Summary of Chapter 5: Summary, Conclusions and Recommendations

Chapter 5 concludes by identifying the problem sets most suitable for WCCs, speculating on the hardware implementations most reachable, summarizing the expected performance and assessing the impact of this work on several areas including both computing technology and biology.

This chapter concludes with a discussion of the value and relevance of the work and of the WCC concept in general. The conclusions were drawn intuitively based on the experience of designing the WCC (Chapter 3) and based on the computability assessment and performance analysis (Chapter 4).

Summary and Conclusion Tasks in Chapter 5. To achieve the purpose above, the following research plan was used to guide the work:

1) Review the results of Chapter 3 and assess the classes of computing that the WCC serves well and those that it is less applicable to and create a comparison table. Provide a rationale for each entry.
2) Review the results of Chapter 4 and assess the practical implementation possibilities of WCC. Consider each of several platforms (bacterial cells, bio-chemicals, silicon, software simulation, nano-technology, etc.) and identify those with the most promise and identify the obstacles and future work needed for success.
3) Review the insight obtained in Chapters 3 and 4 and assesses the implications of this for biology. Identify areas of knowledge that are likely to be enhanced (or that have been enhanced) by this effort.

CHAPTER 2

Review of the Prior Art

The concept of the "Whole Cell Computer" (WCC) rightfully falls in the field of biological computing. Biological computing is a hybrid field (Forbes, 2000). It combines information from computer science and biology to build computational models of biological systems. The field is not new, as neural networks, genetic algorithms, DNA computing, cellular automata and evolutionary programming could all be considered as aspect of biological computing. In the past several years, the explosion of research in bioinformatics and molecular biology has inspired new hybrid architectural ideas, such as those based on cellular computing. Many researchers feel the time is ripe for further research in this area because of the greater understanding of fundamental biological processes achieved in the last 20 years.

This chapter provides a review of the literature from both a historical and from a constructive point of view. It begins by describing the roots of biological computing, followed by a review of the key concepts in traditional computing that are used later for performance comparisons. It then describes how the field of artificial intelligence emerged from traditional computing and how biological computing is a further extension of that trend. A progressive history of computing based on cellular models is carefully reviewed that shows the progress and limitations of each major line of work. This is followed by a discussion of agent-based models, the way in which multiple cells cooperate. Finally, a review of the state of knowledge in bioinformatics and a statement of unexploited research areas lays the foundation for the remaining chapters.

2.1 Introduction

The Roots of Biological Computing

The earliest work in biological computing could be traced to the work of McCulloch and Pitts (1943). In their paper, McCulloch and Pitts (1943) attempted to understand how the brain computes with many interconnected neurons. Their paper gave the first, albeit simplified, model of a neuron and it's processing. Their research is commonly viewed as the inception of the theory of finite state machines as well as neural networks.

The progression of research leading up to biological computing has been long and circuitous. The work of McCulloch and Pitts (1943) initially influenced the development of conventional computing, discussed in Section 2.2. Conventional computing led to the development of many techniques in the field of artificial intelligence, including biologically inspired techniques such as neural networks and genetic programming. These are surveyed in Section 2.3.

While the concept of comparing computing to biological cells has been around since the start of computing research (Holcombe, 1994), it was not until the 1990s that biological models of computing based on whole cells emerged as nascent research. Cray (1996, May 30) in a visionary speech to the Shannon Center of Advanced Studies at the University of Virginia forecasted the emerging collaboration of molecular biologists and computer scientists to develop biological computer architectures based on cells. In that speech, he described his vision of the operating system of a cell in precise computer terms for the first time. Paton (1994) has been one of the leading voices in the emerging field of computing based on cells and tissues. His papers, book and biannual conference in Europe are beginning to stir more significant interest in the area. Paton describes the goals of biologically motivated computing as the following: 1) to extend biological theory, 2) to extend computational theory, 3) to develop practical tools and systems, and 4) to provide meaningful cross-disciplinary dialog.

In a more brash and forward-looking book, Kurzweil (1999) predicts intelligent machines that will supercede the capability of humans within 30 years. While this is controversial, to see information like this published by accomplished researchers catches attention and motivates thought.

2.2 Departure Point

Traditional Machine Architectures

The work of McCulloch and Pitts (1943) preceded the development of conventional machines, a vital step on the pathway to any computing architecture. Such conventional machines, called von Neumann machines, are based on a sequence of instructions whose intermediate results are stored in registers. This is known as control flow architecture.

Within the computing and information technology worlds, the von Neumann machine has been universally accepted as the de facto standard computer architecture for most computational tasks. It is well suited for most ordinary computing tasks such as arithmetic tasks, office tasks and computing tasks that are inherently serial in nature. The operation of a von Neumann machine may be modeled simply by FIG. 2.2-1 (Gurney, 2002).

The way a von Neumann machine works is to repeatedly perform a cycle of events (Gurney):
1. Fetch an instruction from memory.
2. Fetch any data required by the instruction from memory.
3. Execute the instruction (process the data).
4. Store results in memory.
5. Go back to step 1).

This method of computing can solve problems that can readily be formulated in terms of an algorithm or a well-defined procedure that generates a precise answer. Examples are the solution to a system of equations, the retrieval of information from a database or a spell checking system. In each case a set of simple instructions executed on proper order can be reduced to instructions to the Central Processing Unit (CPU). The machine must be told in advance what to do by means of a computer program, or the sequence of instructions. The data it deals with must be in a precise format. If a single failure of software or hardware occurs, it most likely means the program will fail.

The von Neumann architecture is less well suited to tasks, which are parallel, asynchronous, or those that have a significant pattern recognition element to them. Some of the more difficult problems in these areas have been tackled by the methods of neural network computing (Wasserman, 1989), (Gurney, 2002), genetic programming (Koza, 1999), and soft computing or fizzy logic (Tettamanzi, 2001).

There are two machine architectures that could be considered the reference designs of all computation. These are the Universal Turing Machine (UTM), (Kampis, 1994), which acts as a reference design for theoretical computing performance and the von Neumann architecture (Gurney, 2002), which acts as a reference design for practical computer implementation. These may be appropriately considered "apples" and "oranges". The UTM is abstract and the von Neumann architecture is the basis of most modern computers.

During the time the von Neumann machine was being developed, researchers were working to determine the theoretical limitations of computing. The theory that most universally describes this is that of the UTM. A Universal Turing Machine machine, illustrated in FIG. 2.2-2, is an abstract representation of a computing machine (Kampis, 1994). It consists of a read/write head that scans a tape divided into squares, each of which is inscribed with a 0 or 1 and possibly of infinite length. The machine begins in a given "state". It then scans a square, erases what it finds there, prints a 0 or 1, moves to an adjacent square, and changes to a new state. This process can be described by three parameters: the state the machine is in, the number on the square, and a list of instructions. The list of instructions specifies what the machine should write, which direction it should move in, and which state it should go into.

UTMs are of theoretical interest because algorithms that can be computed on other architectures can be mapped into Turing machines. There is a well-known thesis called the Church-Turing thesis that states that every effective computation or algorithm can be carried out by a UTM. This is accepted to be true by many, but is often challenged by researchers in artificial intelligence or biological computing when investigating novel architectures. For example, Kampis (1994) has proposed a "non-Turing" machine to represent certain biological architectures as a machine that operates like a Turing machine except that it uses a shifting reading frame instead of a predefined one. This allows for "mistakes" to be accepted without crashing the machine, somewhat akin to biological processing in large numbers.

2.3 Initial Departure

Machines Based on Artificial Intelligence and Artificial Life

Over the years in the field of computer science, numerous computing architectures have been conceived of that mimic one or another aspect of artificial intelligence or artificial life. This section briefly highlights the main areas at the intersection of biology and computer science where biological metaphors have driven computing architecture concepts. Ideas from several of these areas impact on the present research effort.

Neural Networks. Neural networks have been studied at some level since the 1940s (Gurney, 2002). They represent perhaps the first biologically inspired computing architecture. Neural networks are networks of neurons where a neuron is a simple two step instruction representing a real neuron, as depicting in FIG. 2.3-1 below.

A detailed review of neural network computing is beyond the scope of this work, and other references can provide this (McClelland, 1986), (Gurney, 2002), (Bar-Yam, 1993). An important observation to make here is that the "neurons" in neural nets are a very simplified form a WCC that compute only one or two functions (summation and threshold logic). Neural network architectures may potentially be able to be improved dramatically by replacing the neurons with a more in depth cellular computing architecture enabling a much richer instruction set at the neuron level.

Genetic and Evolutionary programming. Genetic programming is a subset of the field of genetic algorithms (Forbes, 1999). Genetic programming creates computer programs whereas genetic algorithms create a string of numbers that represent the solution (Koza, 1999). Genetic programming uses four steps to solve problems as indicated by FIG. 2.3-2 (Fernandez, 2002). Such methods have been applied to traditional programming, but not yet to programming biological computers. The four steps are:

1) Generate an initial population of random compositions of the computer programs.
2) Execute each program in the population and assign it a score according to how well it solves the problem.
3) Create a new population of computer programs by copying the best programs and "genetically" recombining them using "mutations" and "crossover".
4) The best computer program that appeared in any generation, the best-so-far solution, is designated as the result of genetic programming (Koza, 1999).

Genetic programming is an established technique as a method of biologically inspired computing. However, it has not yet been applied to automatic programming of distributed, self organizing computing architectures. This research positions genetic programming to do that by applying the known technique in the Figure below to the definition of the WCC (in Chapter 3). Hence, the novel advance within this research is not an advance in genetic programming, but in the application of it to a WCC framework that enables automatic self adaptive programming.

Distributed Computing. Distributed computing is not purely biologically motivated per se, but its properties may be relevant to any biologically inspired computing mechanism. The very term "distributed computing" has multiple meanings. Sometimes it refers to neural network computing, sometimes it refers to peer to peer computing as in the well-known SETI project (search for extra-terrestrial intelligence) (SETI@ Home) and at other times it may mean solving computational problems using different machines located in a network.

Entropia (http://www.entropia.com) defines distributed computing as computing that harnesses the idle processing cycles of the PCs on your network and makes them available for working on computationally intensive problems that would otherwise require a supercomputer or workstation/server cluster to solve. A server splits your large applications into very small computing tasks, which are then distributed to PCs to process in parallel. Results are sent back to the server where they are collected and presented to you. The more PCs in your network, the more processors available to process your applications in parallel, and the faster the results are returned. A network of only a few thousand PCs can process applications as quickly as today's fastest supercomputers.

The Entropia definition is the one that we shall use in reference to the term "distributed computing". As far as the current research project is concerned, a distributed computing system is one possible hardware platform for the implementation of a whole cell computer system. This style of peer to peer distributed computing is well established and is normally accomplished on existing von Neumann machines. Its purpose is usually to gain access to unutilized computing cycles and focus them on large scale problems. The peer to peer distributed computing architecture also has significant limitations. It requires significant communication bandwidth, communication delays and the use of potentially millions of computers of a traditional architecture.

The concepts of distributed computing can be advanced well beyond the peer to peer distributed computing paradigm when utilizing biological cells as a metaphor. In cells, there are billions of molecular operations, almost all of them multiply redundant, in a tightly connected space and with no central control. Computing architectures that implement these principles (such as the WCC described in Chapter 3) overcome the aforementioned limitations of peer to peer.

Dataflow Computing. Dataflow computing is a computing architecture sub-discipline that was popular in the 1980s. For example, see Hwang and Briggs, 1985. Dataflow architectures are distinct from control flow architectures (like the von Neumann machine) in the operations wait for operands to "arrive" before they trigger. Such computing has been determined to be less applicable to general purpose computing and sometimes applicable to signal processing applications and the like. It is not particularly a biologically motivated architecture. However, cellular and biochemical processing act like a stochastic dataflow machine, and hence a brief overview is relevant. As an example of execution occurring when data is ready, consider the following sequence of events shown in FIG. 2.3-3. Nodes fire when data is present on all input arcs and no "tokens" are present on output arc (if a token is present on output arc then last value has not been 'consumed' yet by next node).

Dataflow computing has been extensively developed by Arvind (1993) at MIT. It has not seen widespread use because of the engineering difficulty in directly implementing a dataflow machine, a machine that needs to specified in precise detail. The concept of a dataflow architecture is a precursor to cellular architectures, however, because of the dataflow approach. Cellular architectures, namely the WCC described in Chapter 3, overcome this limitation by executing instructions in large multiplicity and redundancy, which both relaxes the rigid requirement of error free computing, and enables one to consider use of existing biological cells or bio-chemicals for their implementation.

Pattern Recognition and Artificial Intelligence. Pattern recognition and artificial intelligence are general computing disciplines that are loosely biologically motivated. Their principal motivation comes from attempting to solve thought problems using methods that may be similar to the way the mind works. Minsky (1988) draws a number of illustrative parallels between AI concepts and the way the brain is speculated to work.

DNA Computing. The field of DNA computing is relatively new. Computers generally make use of binary code—1's and 0's. Since the DNA molecule is also a code, but instead made up of a sequence of four bases which pair up in a predictable manner, it may be used it as a molecular computer (Adelman, 1994). Instead of relying on electronic switches, a DNA computer relies on the faster reactions of DNA nucleotides.

A DNA computer is a type of non-deterministic computer. It is a molecular computer as distinct from a cellular computer and it relies only on the properties of the DNA molecule. Adelman (1994) used it to solve the well-known Hamiltonian Path problem, a problem chosen because it is known as "NP-complete". Every NP problem can be reduced to a Hamiltonian Path problem (Adelman, 1994). A DNA computer solves problems using operations derived form the following processes (Adelman, 1994):

Synthesis of a desired strand
Separation of strands by length
Merging: pour two test tubes into one to perform union
Extraction: extract those strands containing a given pattern
Melting/Annealing: break/bond 2 DNA molecules with complementary sequences
Amplification: use PCR to make copies of DNA strands
Cutting: cut DNA with restriction enzymes
Ligation: Ligate DNA strands with complementary sticky ends using ligase
Detection: Confirm presence/absence of DNA in a given test tube The field of DNA computing is in its infancy and thus far has not been applied in hybrid environments with other types of computing motivated by cellular processes. In particular, the potential use of DNA computing as a subset of a broader cellular architecture (such as the WCC proposed in Chapter 3) is novel and has the advantage that such energy minimization computing (Hamiltonian problems) are generally not isolated problems and are usually a subset or embedded part of the solution of a more complex problem. Ideally then, a DNA computing component is most useful if it is a subservient component to a larger distributed system.

Molecular Computing. Biochemical circuits are responsible for information processing and algorithmic control tasks within the cell, such as regulation of gene expression, phosphorylation and dephosphorylation of enzymes and self assembly (Bray, 1995). Networks of interacting kinase enzymes, as in signal transduction cascades, are among the simplest and fastest of these mechanisms. Previous studies have shown that in principle, arbitrary logic functions can be constructed from biochemical gates (Hjelmfelt, 1995). Neimark and Winfree (2001, November) has proposed to model computation using molecular dynamics in the cell by defining a class of biochemical reactions based on kinetic cascades, and to express the stochastic kinetics as a continuous Markov process. While their work is incomplete as of the date of this writing, they hope to study the fundamental limits of biochemical computation and optimal design of cell-scale biochemical circuits.

The modeling of biochemical circuits to date has primarily been done in the field of systems biology (Yi, 2001) and for the purposes of modeling a simulation. The same models could potentially be used for programming biological computing devices. Bower (2001) reports on three models for biochemical networks: Boolean, differential equations and stochastic.

Modeling of biochemical circuits generally described the aggregate statistics of the underlying processes. While it provides useful insight, the lack of the detailed emulation of the specific processes and their redundancy limits the accuracy of the results and the fidelity to which computing may take place. It is widely known that complex systems display emergent behavior (Bar Yam, 1993) and this behavior is a function of the relationships of the parts. This emergent behavior cannot be fully captured by biochemical models that evolve gross statistics or composite behavior. While they are extremely useful for observing general trends, a finer grained architecture that emulates or simulates the details of low level instructions (such as the WCC developed in Chapter 3) is required to capture the richness of emergent behavior of complex systems.

2.4 Progressive Research History

Modeling Information Processing in Cells

Cells as well as their biological molecules (i.e. proteins, enzymes) are capable of processing information, but such information processing differs from traditional digital computers. Paton (1994) introduces several concepts for cellular architectures in his edited works. Shackleton and Winter (1998) also propose a computing architecture based on cellular processing, but other than a single example of artificial enzymes to accomplish a numerical sorting function, they offer few details as to how one would work. Cellular architectures are the subject of this research project. Prior work is limited and is briefly reviewed in the following section. According to the National Science Foundation (Hickman, et. al., 2000, September), the potential is enormous and unexploited except in a few scattered efforts.

The principal philosophy for computing architectures based on cells is to represent some aspects of cellular biochemistry as the computation of suitably defined data. There is a nascent, but growing body of work in this area, including (Paton, 1994), (Shackletona and Winter, 1998), (Holcombe, 1994), (Marijuan, 1994), (Preuss, 2000, Summer), (Lohaz-Beltra, 1997, 1998, 2000), and others.

One view of processing within cells is that of an intricate series of production lines that assemble increasingly complex molecules from simpler components, with reactions that make these transformations controlled by enzymes (Shackleton and Winter, 1998). Enzymes therefore are considered key ingredients in any computing model based on the cell. Enzymes are proteins that exhibit specificity for particular substrates (thus they are "instructions" that trigger upon the arrival of an operand much like the dataflow computing concept). In essence, processing within cells are highly parallel, asynchronous, stochastic dataflow machines that are self programming and whose input is determined by the environment.

The field of biological computing have had a long history. In particular, there has been substantial work in the areas of neural networks (McClelland, 1986), (Gurney, 2002), genetic programming (Koza, 1994 and 1999), artificial intelligence (Minsky, 1988), DNA computing (Adelman, 1994), molecular computing (Bray, 1990), and bacterial computing (Garfinkle, 2000). These areas are summarized in Section 2.3, but are only peripherally and background related to the current work.

However, work in the area of biological computing architectures based on cellular processing has thus far been limited. Cells as well as their biological molecules (i.e. proteins, enzymes) are capable of processing information, but such information processing differs from traditional digital computers. Paton (1994) is an early pioneer in this field and he introduces several concepts for cellular architectures in his edited works and biannual conferences.

Early Research. Relating biochemical activity to computing is a concept that began over 50 years ago. Early work by McCulloch and Pitts (1943) and Rosen (1967) explored these ideas. McCulloch and Pitts proposed the first computational model of an artificial neuron in 1943. Rosen provided a systems model for neuron computation. These early efforts focused on cell computing for neurons only, which eventually led to neural nets, rather than the present notions of cellular computing architectures. The work on the study of neurons was the earliest work on the use of cells as computing elements. This work quickly led to the model of neuron as a nonlinear summation device, focusing only on membrane currents and action potential firing, leaving all other cellular metabolism, gene expression, signal transduction and biosynthesis out of the model.

Models of Metabolism. An early attempt to model metabolism was provided by Krohn, Langer and Rhodes (1967). They used finite state automata to model metabolic reactions. Their goal was to use the computer to understand the biochemistry better. The significance of their work to the present effort is that it captured the concept of using chemical reactions as a computing metaphor, a notion that is deeply nested inside the WCC architecture. The work was limited in that it only focused on a single reaction pathway and laid the groundwork for using chemical reaction pathways as models for computation.

Multi-cellular Computation. Welch and Kell (1986) explored the notion of multi-cellular computation. Their work explored the interaction of multiple cells and considered the effects of individual chemical concentrations. They were the first to define the state of a machine by chemical concentrations. The significance of their work to the present WCC work is that it introduced two important notions: 1) computing based upon statistical concentration levels, and 2) computing based upon internetworking of individual "cells". The major contribution toward the present work is that Welch and Kell laid the groundwork for the use of these two principles. However, it's major limitation is that neither has been explored beyond the conceptual notion in any great depth in the subsequence computing literature, despite the fact that there is extensive biological research in these areas. There is a lack of experimental data in biology on chemical concentrations (Yi, Hucka, et. al, 2001) within cells, which in part explains the dearth of computing research in this area. This is now undergoing change with recent National Institute of health funding for the Institute for Cellular Signaling, which is undergoing a ten year research program to study cellular concentrations of enzymes. Specific mechanistic implementations were not addressed, as they are in Chapter 3 describing the WCC.

Biochemical State Models. More recently, a simple example of using cellular biochemical activity to model state changes is provided by Holcombe (1994) using the Krebs cycle. Here, he modifies the Krebs cycle as a state machine. This work was one of the first to compute with a complete biochemical pathway using a state machine model. His model is deterministic and does not capture the statistical nature of metabolic processing.

A simple example of using cellular biochemical activity to model state changes is provided by Holcombe (1994) using the Krebs cycle. Here, he modifies the Krebs cycle as a state machine. As an example of one step in the process, consider the reaction and symbols:

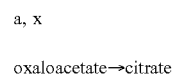

a, x oxaloacetate→citrate

This means that the input when the system is in the state "oxaloacetate" gives rise to the output x and the new state "citrate". This simple example shows how a reaction can model state. It says nothing about the concentration of the states corresponding to hundreds or thousands of asynchronously parallel copies of the same reaction as is the case in real biology.

A slightly more illustrative example based on a regulated isomerase, one of the simplest cases of allosteric regulation, is provided by Marijuan (1994). A state diagram is provided in FIG. 2.4-1 below. The enzyme in the inactive state is represented by I.

The effector b enables the enzyme to be in the active state is represented by A. States T and X represent it in the enzyme-substrate complex with a* and the enzyme-product complex respectively with a, corresponding to the two allosteric states of the isomerase. The system can be mathematically described by the rate equations (Marijuan, 1994):

$$dI/dt = -k_1 A + k_{-1} A$$

$$dA/dt = k_1 b - k_{-1} A + k_{-2} x - k_2 a\, A + k_4 T - k_{-4} a^* A$$

$$dX/dt = k_2 A + k_{-3} T - k_{-2} X - k_3 X$$

$$dT/dt = k_3 X + k_{-4} a^* A - k_{-3} T - k_4 T$$

Here, I, A, T and X are the four states as in FIG. 2.4-1 above. The state variables which are binary in value include the indicated objects b, a and a* and the rate constants $k_i$. Such rate equations were shown by Marijuan (1994) to be able to be implemented by an automaton with activation and inhibition rules. In fact, Rosen (1979) showed that one could create an automaton, which can parallel any system of rate equations. This is quite a profound observation with regard to biological computing as the field of systems biology often describes cellular biochemical behavior in terms of rate equations, yet implementation of any such system as a computing device is more related to the automaton model.

The contribution of this work was to show how to use biochemical reaction cycles as models of computation. The limitation is that it does not address or otherwise relate to the potential for distributed, statistical computing with redundancy or computing that can self organize, as described in Chapter 3 on the WCC.

Enzyme Processing Model. More recent work, and the most relevant to this current work is Shackleton and Winter (1998) who also propose a computing architecture based on cellular processing, but other than a single example of artificial enzymes to accomplish a numerical sorting function, they offer few details as to how one would work. Cellular architectures are the subject of this research project. Enzymes therefore are considered key ingredients in any computing model based on the cell. Enzymes are proteins that exhibit specificity for particular substrates (thus they are "instructions" that trigger upon the arrival of an operand much like the dataflow computing concept). In essence, processing within cells are highly parallel, asynchronous, stochastic dataflow machines that are self programming and whose input is determined by the environment. Shackleton and Winter also suggests that genetic algorithms should program cellular computers, but offers no mechanistic detail as to how this might be done.

Their more sophisticated, but isolated computing example is provided by Shackleton and Winter (1998). This example consists of two artificial enzymes that are used to sort numbers. These are the "Join" enzyme and the "Break" enzyme. A join enzyme is responsible for assembling lists of increasing length by joining two smaller lists together appropriately. A break enzyme is responsible for splitting a list into two sub-lists when they contain gaps of missing values. A join enzyme binds the high end terminator of one list to the low end terminator of another list. See FIG. 2.4-2 below where the join enzyme is connecting L–$V_1$ to $V_h$–H, provided that $V_1 < V_h$. Similarly, the break enzyme cuts two strings provided that either $V_1 > V_h$ or that there exists a sub-string with terminator X where $V_1 < X < V_h$. The system dynamics, together with the concentrations of enzymes and data items govern the rate at which the "reaction" takes place. In the example, no specific data is provided regarding such rates or their dynamics.

The architecture proposed by Shackleton and Winter is a starting point for WCC as it expresses some of the nascent ideas for WCC, but does not complete the architecture, or the details beyond notions except for the sorting problem with the join and break artificial enzyme. In particular, the simulation reported on by Shackleton and Winter did not model either operand concentration levels, nor genetic programming of processing element instruction sets. The paper lacked in mechanistic detail and merely stated metaphors (except for the JOIN and BREAK enzyme example).

Membrane Computers. An even more recent (2000) innovation is the concept of membrane computers. These have been proposed as a generalization of cellular processing (Calude and Paun, 2001). A Venn diagram with no intersecting regions can represent a membrane computer. Each region is an area for computation. Outputs of computation in one region make inputs to other regions. Calude and Paun have addressed membrane machines in theoretical depth. He describes a system where "objects" inside membrane regions "evolve" through a series of computational steps and rules. A computational system, called a "P System" will halt when no object can further evolve. Calude and Paun explore several variants of P Systems from a theoretical perspective by investigating properties such as decidability conditions and normal forms.

However, Paun provided no practical computational examples or implementations of a membrane machine, nor has a P system yet been developed. Computing with membranes starts from the analogy of processes, which take place in the complex structure of a living cell with a computing process. P Systems make a useful theoretical viewpoint and method of comparison for any practical architecture. Unfortunately, the work in the field to date does not go beyond computational complexity studies of theoretical machines. No computing problems have been solved using this method to date. At the present time, the only results in P systems are theoretical. The WCC implementation architecture presented in Chapter 3 shows how a specialization of Membrane Computers, combines with a variant of DNA computation in concert with genetic programming can provide a large scale, distributed and robust system.

Computing with Bacterial Cells. Garfinkle (2000) described the work of Thomas Knight at MIT in the development of bacteria as computing elements. Knight's approach is to use each cell as a computing element to a larger problem. The main operation is an inverter gate constructed by the interaction of several bacterial cells. Compared to traditional computing, such an approach is very slow. But its appeal is the applications that are possible: production of drugs on demand in the bloodstream, toxic waste detection, dust filters and other process oriented industrial applications. This differs substantially from computing architectures based on cells in that the latter looks at the internal biochemistry of a cell as a computing model.

2.5 Potential Computation by Cooperating Cells

Agent Based Models and Their Applicability

One further class of biologically motivated computing are models based on tissues or networks of cells. Paton (1994) provides several, but unrelated papers in this area. The area of complex systems (Bar-Yam, 1993) provides theories that have the potential of modeling cellular networks. Architectures based on cellular processing could be linked by these theories.

Biosystems at the tissue/organ level of complexity can be used to provide valuable insights for computer scientists and others interested in elaborating parallel models of computation. Two of the most important are the central nervous system and the immune system. The area of neural networks has explored central nervous system models extensively. There have been a limited number of studies of models of the immune system for computation, including Bersini (1993). Bersini applied the principles of distributed, adaptive pattern matching to modeling the immune system. His model could potentially be used as the basis of a program for modeling the immune system using a cellular computing architecture.

The theory of agent based modeling provides a framework for which WCCs can be programmed to act in concert. This concept is explored in Chapter 3. Agent based models emerged from artificial intelligence and represent a way of understanding distributed computing. For the purposes of this research, it suffices to define agent based models as they are a framework in which WCCs will ultimately reside.

An "agent" is an individual entity that seeks to serve itself by some objective function (Bar-Yam, 1993). A WCC can be thought of as an agent. At any point in time, an agent will consider its effort level and either maintain the current level, increase or decrease its effort, or start a new problem. Tissues in living organisms are societies of agents where the agents are cells. A Whole Cell Computing Network (WCCN) shall be defined as a network of WCCs cooperating to solve a problem. When such a model is used, each WCC is an agent and the entire problem is an Agent Based Model (ABM).

An ABM is defined by a working environment and some objects, also called agents that evolve within the environment. These agents are dedicated to solve a specific problem according to a method, which can lead to a distributed computing problem (Ferber J., 1995).

The design of an ABM requires the definition of an agent model. This requires the definition of the agents' knowledge and capable tasks or instructions. The problem solving process "emerges" (Bar-Yam, 1994) from the agent to agent interactions.

There are many different models of agents. For example, the reactive model is related to those agents that are able to deal with precise states of the environment. The cognitive model points at agents that are able to process complex tasks and so are able to deal with complex states of the environment. (Maes P., 1992).

2.6 Sources of Knowledge for WCC Design

Advances in Applicable Biological Knowledge

To accurately model or mimic the behavior of cells in computing operations, it is necessary to draw upon the fields of biochemistry, molecular biology and bioinformatics. The enormous explosion in research in these fields over the last few decades has resulted in a substantial knowledge base of chemical reactions, pathways and cellular functioning that can be drawn upon to obtain computing instructions.

It is not the purpose of this patent applicaiton to review these fields. However, the databases produced by these fields were drawn upon to develop the WCC computing instructions discussed in Chapter 3.

Baxevanis (2001) provides a comprehensive overview of bioinformatics databases on the web. The WCC research reported in this patent applicaiton has been limited to the databases described there. The databases referenced by Baxevanis (2001) used in this research included GenBank, Swiss-Prot, Eco-Cyc, LocusLink and KEGG, all described within. The molecular biology functions used in the WCC definition within this research is limited to the description of a cell in Becker (2000).

2.7 Emerging and Unexploited Areas of Research

Some further limitations of the work in this area so far include the following:

The architectures proposed to date to not yet fully take advantage of high volume transactions and the $2^{nd}$ law of thermodynamics in the computational process.

These architectures have been small and illustrative and do not yet take advantage of the rich range of the natural biological instruction set.

There has been no attempt to use bioinformatics databases to extract instruction sets for computing, yet this is a natural and available source of such detail.

A general principle of programming and computation has not yet been proposed other than the highly abstract theory of membrane machines (Calude and Paun, 2001).

No genetic programming method that works has been suggested in mechanistic detail as of yet, but only merely the notion that genetic programming might be able to be exploited for programming a cellular architecture (Shackleton and Winter, 1998).

The present work begins where Shackleton and Winter (1998) left off, starting with the work reported in their cellular processing paper, then puts it in the context of membrane computing, and makes it all more specific to biological cells, and include concepts of statistical processing per the evolving field of systems biology. The limitations listed above are exploited throughout this research.

Seeking to develop a computing machine based on a biological cell is a complicated endeavor with many aspects. In the course of researching previous work on the various aspects of this, several areas of biologically inspired computing where almost no work has been done were identified, further refining what has been stated above. These are identified here and exploited as an important part of the focus of the present research:

1) Mining bioinformatics databases for the purposes of extracting the "instruction set" of biological functions. This is a needed step in the identification of the instruction set structure for the whole cell computer. While extensive work on the mining of bioinformatics databases for the biological and medical purposes has been done, there has been little or no work in doing such mining for the purposes of discovering computing architectures.

2) Systems Biology studies for the purposes of creating a computing machine is also an area that has been underserved. Systems Biology itself is new and the main vehicle for reporting its results thus far has been the annual conference of Systems Biology (Yi, 2001). To date, most of these papers have focused on gene regulatory network and biochemical simulation and identification of the models that underlie such simulation using reverse engineering and system identification techniques.

3) Using genetic programming to "program" a computer is also a wide open problem. Genetic programming as a technique is reasonably well developed (Koza, 1999). But usually it focuses on the solution to computing problems rather than the construction of computing programs.

CHAPTER 3

DETAILED DESCRIPTION OF THE INVENTION

This research sought to answer the following main question: "How can one define and utilize a computational paradigm based on the biochemical behavior of eukaryotic cells to solve complex computing problems which are otherwise difficult for conventional machines?" To answer this question, a research methodology was undertaken that proceeded as follows:

1) The question was broken down into components or sub-problems, corresponding to the ten sub-questions identified in Section 1.3.2.

2) An answer was posed to each sub question by analogy to biological principles.

3) Then, the answers to each question were further developed by application to selected computational problems, reiterating as necessary to refine the answers.

4) Next, the performance of the resulting computer architecture was evaluated by analysis of computability (this is reported on in Chapter 4).

5) Finally, the answer to the main question was summarized by combining the results from the ten sub questions (this is reported in Chapter 5).

Chapter 3 addresses the first three of these research steps and reports on research that has followed the methodology outlined in section 1.6.2. Section 3.1 describes a eukaryotic cell in computational terms as a baseline for reference. Section 3.2 defines the salient features of the WCC by biological analogy. It addresses sub-questions 2 and 3 from section 1.3.2. Section 3.3 develops a range of sample computing instructions by analogy to cell biology. It addresses sub-question 1 and 4. Section 3.4 defines how WCCs operate together in a network. It addresses sub-question 5. Section 3.5 defines and describes the operating system for a WCC. It further addresses sub-questions 2 and 3 from section 1.3.2. Section 3.6 develops computational illustrations of problems that can be solved with WCCs; it addresses sub-questions 7 and 9. Section 3.7 defines how WCCs are programmed using genetic principles. It addressed sub-question 6. Section 3.8 addresses possible hardware implementations of the WCC, sub-question 10.

Thus, Chapter 3 is a descriptive summary of a WCC, the network that it must operate in, and a methodology for programming it. The detailed analysis and computability assessment, including the response to sub-question 8 is addressed in Chapter 4. The final response to sub-question 9 is addressed in Chapter 4 and the main question based on this research depends on the results to Chapters 3 and 4 and is deferred to Chapter 5.

Table 3-1 below cross-references the main research question and the ten sub questions to the section in this patent applicaiton that addresses it.

TABLE 3-1

Research Questions Cross Reference

| Sub-Question | Section |
|---|---|
| 1 | Section 3.3 |
| 2 | Sections 3.2, 3.5 |
| 3 | Sections 3.2. 3.5 |
| 4 | Section 3.3 |
| 5 | Section 3.4 |
| 6 | Section 3.7 |
| 7 | Section 3.6 |
| 8 | Chapter 4 |
| 9 | Sect. 3.6 and Ch. 4 |
| 10 | Section 3.8 |
| Main Question | Chapter 5 |

3.1 Describing a Cell in Computational Terms

Before identifying the architecture and components of the WCC, it is instructive to identify the components of a biological cell and make a functional analogy to traditional computing architecture. Several authors have addressed this idea, but a full description is not yet realized. Cray (1996, May 30) gave a landmark speech on this subject where he made a correspondence between various operating system components and the functioning parts of a cell.

A cell may be viewed as a computing element or processor with the following characteristics. It is an interrupt driven dataflow machine that processes many instructions in parallel and uses many subordinated processors. Ultimately, the cells role is to send and receive various communications (electrical, chemical) with other cells at various points in time. The purpose of its internal "computation" is to stay alive, recycle "operands", express selected genes (i.e. run programs), and produce output. The output produced by the cell can be viewed as information, although it often takes a physical form (molecules). The cell phenotype is a physical response to gene expression (i.e., programs that have run). It can be viewed as a "state vector".

Unlike a traditional computer that purely produces abstract information, the cell often produces physical information and it changes in structure and state as it does so. Therefore, a cell can be viewed as more than an information processing engine—it is also a molecular machine. While the primary interest of this research for WCCs is in information processing, it has not escaped our attention that a WCC network may also serve as a molecular machine, leaving open the possibilities of playing a role in nanotechnology, micro-electromechanical devices, noninvasive medical treatment, etc. Such applications will be noted, but in general, are beyond the scope of the present research project. The program code of the cell lies in its nucleus in the form of genes within DNA. That DNA also contains many inactive or defunct chunks of code.

3.1.1 Computing Elements of a Cell

A cell is indeed a computer, as pointed out by Cray (1998). The following table makes a partial comparison of the components of a computer with the functioning elements of a cell that greatly extends the ideas of Cray (1998). Key features of a computer are matched with a related feature of a cell that accomplishes functionally similar things.

TABLE 3.1.1-1

Comparing a Computer to a Cell

| Feature of a Computer | Related Feature of a Cell |
|---|---|
| Program | DNA |
| Cache Memory | mRNA, or "messenger RNA" |
| Operand | Small molecules, proteins |
| State | Expression Level |
| Interrupt | Enzyme |
| Switch | Allosteric Protein |
| Inputs | Ligand, hormone, neurotransmitter, cytokine (small molecules) |
| Circuit | Pathway |
| Kernel | Transcription and translation |
| Output | Exocytosis, Ionic current, neurotransmitter, cytokine, hormone |
| Power supply | ATP |
| Microprocessor | Organelle (multiple types, many copies) |
| CPU | The entire cell |
| Manufacturing of a computer | Replication, cell cycle control |
| Programming | Genetic recombination and adaptation |
| Gate | Channel |
| Error correction | DNA repair, apoptosis |
| IO support | Vesicle |
| Amplifier | G Protein |
| Subroutine or function call | Transcription factor |

Table 3.1.1-1 is provided for illustrative positioning purposes only and it does not serve as the definition of the WCC, which is provided subsequently. It does provide, however, a metaphor for thinking in terms of grafting information from cellular biology and incorporating it into computing architecture. The features described in the table above are used to guide the examples and theoretical framework which is to follow.

The computer program of a cell is its DNA. The DNA maintains copies of nucleotide sequences that encode for proteins, which perform functions in cells. A given gene (a subset of the DNA) is transcribed into mRNA when appropriate transcription factors (specialized proteins) are present.

Hence, mRNA acts as a cache memory or copy of a specific instruction in a temporary location. When a gene is transcribed, it is said to be expressed, and its expression level is the number of copies of mRNA currently present in the cell and thus can be thought of as the "state" of cell with respect to a specific gene at a given point in time. The cell has an operating "kernel" which translates mRNA into proteins.

There are many kinds of proteins that perform different functions in a cell, each encoded by a gene (or several genes). Some of the types of proteins include enzymes, allosteric proteins, channels, G proteins, structural proteins, transmembrane proteins, and many others. Each of these categories of proteins represent functions that are performed by a cell, and in turn are analogous to functions performed by ordinary computers. For example, an enzyme catalyzes reactions and can be thought of as a kind of signal or switch or interrupt in the processing of information. A channel on the other hand, is typically an allosteric protein that acts as a gate to allow small molecules and ions across cellular membranes.

There are some notable differences between the functioning of a cell and that of a von Neumann machine. A few of the most important differences are listed below:

1) A cell is a dataflow machine. Instructions (i.e. chemical reactions) execute when their operands (i.e. reactants and enzymes) arrive on the scene. There is no sequential program of instructions as in the von Neumann machine.
2) Instructions operate in a statistical manner, based on the second law of thermodynamics. That is, the chemical reactions in a cell are significant only when they occur in large concentrations exceeding a significance threshold. The behavior of such concentrations of proteins is driven by the laws of thermodynamics. The well known chemical processes of diffusion, active transport, enzyme driven chemical reactions, and metabolism drive the production, location and concentration of cellular reactants (Becker, 2000). Unlike the von Neumann machine, a single instruction execution by itself is not significant unless it occurs a significant number of times producing a concentration of products (operands for subsequent instructions).
3) A series of instructions or reactions in a cell forms a pathway or circuit representing a sequence of instructions as in a subroutine or function call in a von Neumann machine. What is different, however, is that such pathways execute in large numbers and in parallel with many other active pathways at the same time. Thus, the cell is not only a statistical machine, but it operates as a parallel, distributed machine.
4) The cell may be thought of as a processor or CPU. In a von Neumann machine, there is one (and sometimes a few) CPUs. In a cellular environment, there must be many cells in order for useful processing to occur. For example, a tissue or organ consists of a very large number of cells acting cooperatively. Hence, the ultimate deployment of a cell is in a large "swarm" of other cells in a network, rather than a single CPU integrated with peripherals and a control system. Cellular behavior in large numbers or in a network is driven by competition for energy and survival (Bar-Yam, 1993).
5) In a cell instructions are hardware elements (proteins) or actions of hardware elements (chemical reactions). The reactants and products can be digested, synthesized, ingested, or exported. They are tokens or objects. Hence, the operating environment of a cell is highly object oriented.

The cellular computing architecture could then be described as a parallel distributed object oriented statistical dataflow machine. Each of these computing concepts alone has been studies for years, but together in a single architecture is daunting and leaves open the possibility of learning substantially about computing by borrowing what is known about cell and molecular biology! A major goal of the present research is to lay the groundwork for future computing systems by extracting what has been learned in biology. A secondary goal is to further understand biology by understanding advanced computing architectures at a greater level of depth.

This research began with these observed differences between a cell and a von Neumann machine and used them to define a new class of computing machine called a Whole Cell Computer (WCC). As discussed in a subsequent section, a WCC is a computing device that has certain key features (but by no means all features) of the information processing environment of a cell.

3.1.2 The Operating System of a Cell

When a close analogy is made between a living cell and a computer, the cell can be thought of as having an operating system. In a computer, an operating system is responsible for process control, memory management, interrupts handling, resource scheduling, file management, and I/O support. It usually has a "kernel" responsible for controlling operating system processes. If one compares these functions to the machinery of a living cell, the operating system components of the living cell can be identified (see Table 3.1.2-1 below). A fundamental difference is that in the cell, software and hardware are not as readily separable (Lahoz Beltra, R. and Di Paola, V., 2000) as software functions are often done with "hardware" or rather "wetware". Table 3.1.2-1 below identifies the key elements of a living cell operating system. The purpose of this is to illustrate a metaphor for positioning the WCC operating system, which is defined later using more formal principles.

The operating system of a cell corresponds to the central dogma of molecular biology, or the concept in which DNA is transcribed into mRNA, which is then translated into proteins to perform the operations within a cell (Becker, 2000). A "program" corresponds to DNA, which encodes the genes and in turn the proteins, and it is stored in the nucleus of the cell, which corresponds to disk memory in a computer. When DNA is translated into mRNA, the mRNA can be thought of as short term or cache memory for the program instructions. The cell has its own way of optimizing program code, When DNA is transcribed into mRNA, splicing of exons takes place and therefore, a form of code optimization takes place (Lahoz-Beltra, R. and Di Paola, V., 2000).

Programs execute in a cell after mRNA has been translated into proteins and the proteins become active in the cell. Motifs, or amino acid patterns within the protein, signal it for its destination location.

Upon arrival, the protein acts as an enzyme, substrate or plays another functional role in the cell. Instructions, or chemical reactions, execute upon the arrival of all necessary proteins or "operands".

TABLE 3.1.2-1

Components of Cell's Operating System

| Operating System Function | Living Cell Implementation |
|---|---|
| Program Execution | Transcription and translation, including post translational modifications and molecular chaperones. This includes the transcription factors that switch on genes for transcription. |

TABLE 3.1.2-1-continued

Components of Cell's Operating System

| Operating System Function | Living Cell Implementation |
|---|---|
| Cache Memory | Messenger RNA serves as a short term memory of executable program units (i.e., genes) that have been chosen for near term execution. Transfer RNA serves as the cache memory for translating source code (DNA) into executable code (proteins). |
| File System Support | Files do not exist. Information is distributed and represented by expression levels of genes, proteins, and metabolites. There is no need for central support as it is handled intrinsically by the architecture. |
| Code Optimization | Mapping of genes into introns and exons and the subsequent splicing in mRNA after transcription (Lahoz-Beltra, R. and Di Paola, V., 2000) |
| Program Execution Policies | Protein signaling for its destination, ubiquitin tagging for deletion, $2^{nd}$ law of thermodynamics |
| I/O Control | Transcription of and regulation of the transcription of membrane channels; vesicle trafficking including exocytosis |
| Memory Management | Expression levels of mRNA and protein store information. Regulatory processes controlling gene expression, or gene regulation networks manage this. |
| Virtual Memory | Memory is not fixed. A cell can continue to express many genes and proteins and is limited only by its total molecular material obtained through endocytosis and metabolism. |
| Scheduling of Resources | There is no clock in a cell. Program execution is parallel and distributed and operand driven. Proteins such as enzymes and bin ding factors schedule resources by their presence and hence the genes that produce them and their transcription factors are responsible for scheduling resources. |

Chemical reactions, or instructions, operate statistically in the cell, according to the second law of thermodynamics. Objects or chemical species move based on diffusion and active transport. Reactions take place spontaneously or by enzyme triggered catalysis. Energy and entropy drive the state of the cell. Generally, there are a large number of copies of each species or chemical object and the work is accomplished based on the total concentration of the reactions and their products. Consequently, one may think of thermodynamics as one of the components of the cellular operating system. Reactions are driven to their lowest energy state, sometimes aided by enzymes.

There is no direct equivalent of files in the cell operating system. Instead, memory is distributed and represented as the concentration of the tens of thousands of proteins, mRNA molecules and other small molecules within the cell. These expression levels represent information, state or memory in the cell. Memory is managed by the regulatory process controlling gene expression, or gene expression networks (Bower and Bolouri, 2001). Such networks are pathways of chemical reactions, each feeding the next. The expression of a given gene, or instruction in program memory, is controlled by proteins known as transcription factors. Transcription factors serve the role in the cell operating system to turn on or activate an instruction or gene.

In general, resources are scheduled in the cell operating system by proteins known as binding factors. This includes, but is not limited to, transcription factors. It also includes regulatory proteins for metabolism, signal transduction and other functions. In fact, the entire cell is interrupt driven in this manner. Events occur when their regulatory elements or enzymes arrive. The cell operates by process creation and destruction (Cray, 1999).

It has previously been stated that a cell is a dataflow machine. Further, it is a dataflow machine that operates with a large multiplicity for each specific operation and whose computed output is based on the total expression level of proteins and metabolites. All cellular biochemical operations are events that occur as a result of the presence of an enzyme, a ligand, an open channel gate, etc. These molecules act as gates or interrupts. They are either present or they are not. When they are present, a reaction takes place. When they are not, no event occurs.

A discussion of an operating system is not complete without mention of I/O or input/output. A cell communicates with the outside world in several manners. One is through the processes of endocytosis and exocytosis, where vesicles wrap around groups of molecules and move them across membrane boundaries (in or out, respectively) by fusing with the membranes. This process of vesicle formation of membrane fusion can be thought of as a cell operating system I/O. In addition, smaller molecules are allowed into the cell either by diffusion, or by entry through a channel or allosteric protein that opens and closes based upon voltage difference or else the presence of a neurotransmitter or other binding molecule. Each of these cellular processes is alternative means of I/O for different substances.

A cell operating system has some unique features that computer operating systems do not have. These include, but are not limited to:
1) The ability to replicate itself (mitosis).
2) The ability to program itself (genetic recombination).
3) The ability to destroy itself (apoptosis).

Each of these may be thought of as sophisticated operating system functions that are not found in traditional computers. All of them are driven by the properties of en entire network of cells rather than a single cell. Cells compute in networks and standalone cellular computing is of limited value.

3.1.3 Examples of the Computational View of a Cell

Several simple biological examples are now described below that illustrate fundamental elements of the computational view of a cell. In particular, the examples provide illustrations of the following key features of the computational view of a cell:
1) Instructions execute upon the arrival of operands
2) Programs are activated by the context or state of the cell
3) External I/O can cause program execution to change As the first example, the glycolytic pathway is common to all living organisms (Becker, 2000) and represents a chain of enzyme catalyzed reactions that convert glucose to pyruvate in a series of 11 intertwined steps. The glycolytic pathway is described in almost any biochemistry or molecular biology text, such as for instance Becker (2000), Chapter 13. Each of the 11 chemical reactions can be thought of as an "instruction" when viewing the cell as a computing device. In a cell, there are many simultaneous glycolytic pathways undergoing reaction, and in each pathway, several or all of the steps can be executed simultaneously by cascaded reactions, producing a continuous flow of the output product.

In order for glycolysis to continue to occur, the reactants, enzymes and small molecules (operands) must be abundant and available. The state of the cell is partly characterized by the current concentration of all of the operands required for glycolysis. This includes the enzymes for each step, the produced chemicals at each step, the available ATP and ADP (energy availability), the available NADH and NAD+, and the availability of phosphate groups (Becker, 2000). Glycolysis does not occur in isolation of other cellular functions (or instructions). For example, it relies on the TCA cycle and oxidative phosphorylation to produce an adequate supply of ATP.

For example, consider the first step of the glycolytic pathway. Here, glucose is converted to glucose-6-phosphate in the presence of the enzyme hexokinase and an ATP molecule, which is simultaneously converted to ADP. (For the purposes of this discussion, the chemical formulas are not needed, but rather each chemical product is viewed as a single object.) A diagram of this reaction is shown in FIG. 3.1-1 below.

In order for the reaction or "instruction" to proceed, the required operands are Glucose, hexokinase and ATP. This illustrates a fundamental element of the computational view of the cell, namely that instructions "execute" upon the arrival of the necessary operands, such as enzymes. The resulting products are glucose-6-phosphate and ADP. Hexokinase is not consumed and is reusable. This reaction may proceed as many times as the operands are present. The products of this reaction become operands for subsequent reactions in the glycolytic pathway or elsewhere. While this example sheds no particular new insight to the biochemistry involved, it does illustrate a way of viewing cellular functions as computational instructions and makes clear that the execution of one instruction may be necessary before the execution of a subsequent one, unless there are adequate additional copies of the necessary operands at any given point in time. Glycolysis can be modeled as a dynamic system consisting of many discrete events or instructional executions. For example, the software product "Genomic Object Net", (Genomic Object Net, 2003), models glycolysis as a Petri net simulation.

A second example is the classical Lac operon in biochemistry. The Lac operon is a gene regulatory factor that enables certain genes to be expressed based on the presence or absence of lactate in the cell. This serves as an example of how the "computer program" or gene is turned on or shut off based upon the context or state of the cell. Gene regulation is another fundamental element of the computational view of a cell.

FIG. 3.1-2 below (Access Excellence, 2003) illustrates the well known Lac operon (Becker, 2000). The Lac operon is a cluster of genes regulated by the presence or absence of glucose and lactose. It contains a region of DNA that has three genes preceded by a promoter or a sequence of DNA where regulatory proteins bind. Gene transcription can be switched on and off by these proteins (Access Excellence, 2003). "Glucose and lactose levels control the initiation of transcription of the Lac operon, i.e. whether the lac operon is switched ON or OFF" (Access Excellence, 2003).

The computational significance of the Lac operon is that it operates as a switch. If glucose is present and lactose is not, the operon is off and the gene is not transcribed (and hence the instruction does not activate). On the other hand, if glucose is absent and lactose is present, the gene transcribes. The presence or absence of glucose and lactose is determined by other biochemical reactions (computational instructions) within the cell. Therefore, the Lac operon illustrates the cell's ability to activate or deactivate its own instructions or programs. This is an important computational property of the cell (and also of a WCC).

A third and final example is the JAK STAT pathway. This is a pathway that explains how cells respond to certain ligands resulting in the transcription of specific genes (Becker, 2000). The reason it is being mentioned here is that it has computational significance when viewing the cell as a computing machine. In particular, two aspects of the JAK STAT pathway are of interest. The first is that it accepts input from an external signal, an IO operation. The second is that it results in a series of reactions or a pathway illustrating a sequencing of instructions that execute upon the proper "operand" arriving. In this case, a gene is turned on by an external event and therefore this is considered I/O activation rather than activation by internal biochemical reactions as was the case with the Lac operon.

Various extracellular signals (such as cytokines) activate the STAT (signal transducers and activators of transcription) class of transcription factors. Many signal cell surface receptor tyrosine kinases that are associated with and activate Janus kinases (JAKs). This induces the receptors to combine into pairs and subsequently activate a chain of sequential events or reactions that ultimately results in inducing transcription of specific genes (Yamada and Yoshimura, 2001). See FIG. 3.1-3 for an illustration of the pathway. A more detailed description of JAK STAT can be found in Becker (2000).

3.2 Definition of the Salient Features of the WCC

The previous section described the cell in computational terms. This section defines the Whole Cell Computer (WCC) by analogy to cells and through specific computational examples. It seeks to answer, in part, sub-questions 2 and 3 from Section 1.3.2, repeated immediately below.

1. How are the concentration levels of "operands" and the second law of thermodynamics relevant to computing with these instructions?
2. What are the architecture of WCC in terms of "organelles" (compartments or membrane bound subsets), the "nucleus" and its functions, and the concentrations levels of "operators" (i.e. enzymes)?

A Whole Cell Computer (WCC) is a computing device that behaves in certain ways like biological cells. For the purposes of this research, the WCC may be implemented in any hardware realization that exhibits a certain minimal set of cell like behavior. This research focused on the functional behavior of the WCC and is otherwise independent of any present or future hardware realizations for WCCs. This research also considered the behavior of WCCs in a network of other WCCs, called a Whole Cell Computing Network (WCCN).

3.2.1 Describing WCCs by Analogy to Cells

In defining the functional behavior of a WCC by analogy to a cell, two important properties must be accounted for. The first is that cells compute with chemical reactions. The implication of this for WCCs is that computing must take place by a large number of independent instructions triggered by the products of other instructions. The number of times it executes or the number of products it produces determines the significance of any one reaction or instruction. In cells, this is normally described as a molar concentration level rather than an exact number. The ability of a reaction or instruction to execute relates to the presence of reactants and enzymes or operands in the language of computing. These reactants and enzymes, or operands, arrive for consumption by the reaction or instruction based on the second law of thermodynamics or the collective random walks of the entire population of such operands within the region or membrane of operation.

The second major property of cell functioning that must be accounted for by the definition of a WCC is that cells "cooperate" with each other in tissues or systems to function. For example, neurons operate in a network, a heart consists of a large number of cardiac myocytes, and the immune system consists of an "army" of lymphocytes and other actors behaving cooperatively. The implication of this for WCCs is that to perform a computing problem, a large number of WCCs must participate cooperatively according to some protocols.

A network of WCCs is expected to solve a class of problems similar to what biological systems accomplish. As such, this includes broad classes of problems like pattern recognition, simulation and control. Details of how a network of WCCs operates are presented in section 3.4.

It is not be required that all the instructions of a WCC mimic all the chemical reactions of a cell. Nor is it be required that all the protocols of a WCC mimic all the protocols of Multicellular biological function. However, it is required that these instructions and protocols behave similarly to select cellular chemical reactions and multi-cellular communication protocols. It further is required there are "classes" of instructions and protocols that parallel the major classes of biological reactions and protocols. The intent is that A WCC exhibits the behaviors and advantages of biological function without being burdened to fully mimic all the details of biological function. Thus, a WCC is a subset of a complete biological cell analog and it may be considerably simpler (or equally as complex as) than a biological cell.

For modeling purposes, the properties of a eukaryotic cell are used to model the intracellular reactions (WCC instruction set). In particular, when biological detail makes a difference, the well-known cell s. cervisea (yeast) will be used. The reason for this choice is that Eukaryotic cells contain numerous membrane bound organelles and thus can serve as a model for exploiting the established field of membrane computing, and the choice of s.cervisiea is relevant because yeast is well studied and documented. (Saccharomyces Genome Database, 2003). Also, for modeling purposes, the properties of the mammalian immune system is used to model intercellular communication (inter-WCC communication protocols). The reason is that the immune system exhibits powerful and flexible intercellular communication mechanisms as well as cooperation via distributed processing, and the structure and functioning of the immune system is well documented (Abbas, 2000).

3.2.2 The WCC is a Special Case and an Extension of Membrane Computing

The WCC is a special case of membrane computing. Recall, that a membrane computer is an unconventional model of computation associated with a new computing paradigm. The field of membrane computing was initiated in 1998 by Paun (2001). It is a branch of natural computing inspired by the structure and functioning of the living cell and devises distributed parallel computing models in the form of membrane systems, also called P systems. Its inspiration is driven primarily by the cell's membrane and not by the massively redundant biochemical composition of the cell.

The reason a WCC is a special case is that the "objects" and "rules" are required to exist in large multiplicity. The biochemistry of a cell works because of the large concentration of biochemicals which undergo evolution. Membrane computers were defined with emphasis on the hierarchical membrane structure and with less attention to computational properties of problems implemented with a very large number of copies of the objects and rules involved. When membrane computation with a large number of copies of objects and rules are allowed to exist, the meaning of computation is shifted from that of finding an object as the solution to a problem to that of finding the statistical properties of the resulting object set, or of the dynamics of the object set.

The reason a WCC is an extension of a membrane computer is that it must have the capability of self organization through genetic recombination. The way this is done is that the configuration of the WCC is represented parametrically and those parameters are optimized through a process of genetic programming. The output of each stage of genetic programming is yet another WCC, ideally one with better performance (or convergence properties) than the previous generation. This process is described in Section 3.7.

Consequently, the WCC introduces new computing properties that were not anticipated in the conception of a membrane computer.

3.2.3 The WCC is a Complex System

A complex system is defined as a system for which it is difficult, if not impossible to restrict its description to a limited number of parameters or characterising variables without losing its essential global functional properties. A more precise definition of a complex system: Formally, a system starts to have complex behaviours (non-predictability and emergence etc.) the moment it consists of parts interacting in a non-linear fashion. It is thus appropriate to differentiate between a complicated system (such as a plane or computer) and a complex system (such as ecological or economic systems). The former are composed of many functionally distinct parts but are in fact predictable, whereas the latter interact non-linearly with their environment and their components have properties of self-organisation which make them non-predictable beyond a certain temporal window.

A truly complex system would be completely irreducible. This means that it would be impossible to derive a model from this system (i.e. a representation simpler than reality) without losing all its relevant properties. However, in reality different levels of complexity obviously exist. If we are interested in situations which are highly structured and governed by stable laws, then it is possible, without loosing too many of the system's properties, to represent and model the system by simplification. Thus, the essential question is to know to what extent the properties of the socio-technical systems that we analyze and design fall into one or the other of these situations. In other words, to what extent can we make an abstraction of microscopic interactions in order to understand macroscopic behaviors? In what measure are microscopic interactions linked in a non-reducible way with the laws that govern more structured behaviors? Finally, is it possible to explain the most structured behavior using rules which control the microscopic behavior (the principle of emergence)? This last question is important from an epistemological and methodological point of view: if we consider theoretical economy, it can be preferable to generate the structural property of a system using knowledge of its microscopic properties (emergence), rather than suggest its macroscopic properties and only validate them with an analytical process.

The reduction of complexity is an essential stage in the traditional scientific and experimental methodology (also known as analytic). After reducing the number of variables (deemed most relevant), this approach allows systems to be studied in a controlled way, i.e. with the necessary replication of results. This approach in itself need not be questioned. However, when considering complex socio-technical systems it is appropriate to analyse precisely the limits of the approach.

Consequently, a WCC is a complex system because of its massively redundant parallelism and many simultaneous interconnected and independent operations, similar to the behavior of a cell by construction. On the other hand, a membrane computer in its generically defined form is not necessarily a complex system because it need not have massive redundancy nor a large number of "rules". To date, membrane computers have been theoretical constructs only and have focused purely on computability.

Complex systems are known to behave in three regions: ordered, chaotic and the edge of chaos (Bar Yam, 1993). The dynamics of complex systems lead to recurring trajectories in state space called "attractors". Any state that is not on an attractor, but converges to one is said to be on the basin of attraction for that attractor. The definition of a WCC later in Chapter 3 also defines state as the number and location of objects and rules in the WCC membrane system. Hence, the "solution" of a computing problem represented as a WCC is the attractor that a given initial condition arrives at. This is defined quite differently than the solution of a membrane computer which is defined by (Paun, 2001) as a halting condition where the solution is the number of objects in the membrane. Hence, a generic membrane computer produces sets of objects and their ordinals as solutions, whereas a WCC produces a dynamical state as a solution.

One might suggest then that the kinds of problems that can be solved by WCCs are pattern recognition, control, simulation and any other computing problem involving dynamical systems that are inherently nonlinear.

3.2.4 Illustrating the Need for WCC Networks by Analogy to the Immune System

Modeling the immune system with WCCs represents a good example of the need for a WCCN. The immune system operates as an army of working objects that perform tasks related to the overall function of protecting the body against invaders. Each "object" of the immune system, such as a B Cell or macrophage, represents an individual WCC (and in fact satisfies the definition of a WCC). The overall operation of the immune system represents the WCCN that cooperates to solve a problem or complete a task. The following text describes the immune system from then point of view of identifying what the objects are and what they do. This will be followed by a detailed description of the WCCN properties and behavior of the immune system, with the intent of using it to lay the foundation for the use of WCCNs for a much broader class of computing problems.

The purpose of the immune system is to provide a reaction against foreign substances, including infectious microbes, as well as to macromolecules such as proteins or polysaccharides. This includes protection against infection, but also inflammation and repair. The response of the immune system against invading pathogens in multi-layered. The initial defenses are passive and include the skin and physiologic conditions unfavorable to the invader. Invaders that survive these passive barriers may then be attacked by the innate immune system, a nonspecific defense against microbes before infection fully occurs. Those surviving the innate immune system are attacked by the adaptive immune system, a highly evolved defense mechanism that increases in capability with each successive exposure to the same pathogen.

The innate immune system protects against infection using mechanisms that were in place before the infection occurs. While it is nonspecific to the infectious agent, it is also very rapid in its response as no time is needed for adaptation. The innate immune system is the first line of defense and in many cases the innate immune system can eliminate microbes. The innate immune system also stimulates the adaptive immune system.

The molecular machinery of the innate immune system is designed to detect structures that are characteristic of microbes but are not also characteristic of mammalian cells. Unlike the adaptive immune system, the inn ate immune system is not sensitive to different types of microbes. Based upon this general set of properties, one would expect the detection performance of the innate immune system to be less sensitive (lower probability of detection) than the adaptive immune system, but it provides a much quicker response. The receptors for the innate immune system are encoded in the germ line, whereas the receptors for the adaptive immune system are derived from somatic genetic rearrangements. Hence the innate immune system and the adaptive immune system complement each other.

The innate immune system is unable to recognize non-microbial chemical substances (such as heat shock proteins as present in mad cow disease) and hence these must be reserved for the adaptive immune system, which can recognize specific epitopes based upon molecular diversity.

The innate immune system reacts the same way to all infections. It consists of a set of "actors" as described below. The components of the innate immune system are listed below. Many of these effectors are also used by the adaptive immune system.

The adaptive immune system is a more complex coordinated system whereby lymphocytes that are specific to the invading pathogen are brought to bear in a defense. In the adaptive immune response, immunity is mediated by lymphocytes (primarily B and T cells) that are stimulated by the infectious agents. Only those lymphocytes that are specific to the infectious agent defend against the agent. A complex set of communications and coordinated reactions occur which enable the ultimate destruction of the invader.

Adaptive immunity is superimposed on the innate immune system to improve host defense against microbes. The adaptive immune system first appeared in jawed vertebrates, whereas the innate immune system is present in all multi-cellular organisms. The adaptive immune system provides both memory of antigen encounters and specialization of the effector mechanisms with regard to specific epitopes.

To accomplish its overall function, the immune system is composed of various cells and molecules, each of which serves a specific function. The bulleted list below highlights the main "actors" of the immune system.

Granulocytes. These are white blood cells involved in innate immunity and produced in the bone marrow. This category breaks down into several subcategories:
  Neutriphils. These cells engulf bacteria by a process called phagocytosis.
  Eosinophils. These cells release molecules that damage parasitic infections, or they participate in allergic reactions.
  Basophils. These cells release molecules that enable substances to pass through blood vessel walls.

Dendritic Cells. Cells that present antigens. They have long tentacles and reside in epithelial layers.

Natural Killers. Lymphocytes that can destroy virus infected cells or sometimes cancerous cells.

Complement. A group of some 30 proteins that plays a role in signaling in the immune system. During an infection, they break down into fragments that perform various signaling functions.

T-Cells. T cells recognize specific antigens of invaders. An initial encounter with a specific antigen may be by a "naïve" T cell, or one that has not acquired memory yet. T cells then retain a "memory" of the antigens they encounter. There are several types of T cells:

- Helper T cells. Also known as CD4 T cells for the molecules they present on their surface, these cells act as coordinators, enabling B cells and other cells to do their job during an immune response.
- Cytotoxic T lymphocytes, or CTLs. These are "killer" cells that eliminate infected cells in the body. These are of the CD8 variety.
- Gamma Delta T cells. These cells assist in repair of wounds and in the inflammatory response.

B-Cells. B Cells manufacture antibodies, small protein fragments that bind to antigens. They have a receptor that allows recognition of antigens. Each B cell recognizes only one type of antigen.

Epithelial barriers and/or chemical substances produced at epithelia whose role is to cause damage to infectious microbes. Oil and sweat acidify the skin to pH of 3–5, which discourages microbial growth. The enzyme lysozyme in perspiration, tears and saliva attacks the cell walls of bacteria. Stomach acid kills bacteria entering with food.

Cytokines are proteins that communicate between cells, and regulate or coordinate the activities of the innate immune system.

An immune system response occurs by the coordinated effort of these immune system actors, subject to the context of the infectious agent. For example, the effector mechanisms and actors of both the innate and adaptive immune system mediate defense against microbes, with the innate immune system providing the early defense and the adaptive immune system providing a specific and highly targeted defense.

The concept of WCC computing is that there are many WCCs, possibly of a number of different kinds. These WCCs compute by the principles of stochastic dataflow computing, but also operate in a network with each other to compute a total solution.

The immune system is a biological example of a WCCN at work. Each of the cellular elements—B Cells, T Cells, macrophages, natural killers, dendritic cells, etc.—are a type of WCC. The entire immune system is a WCCN. While each cell operates on its biochemical principles, the stochastic dataflow computing rules for a cell, the entire network operates as a distributed agent based model, or a WCCN. These principles are explored further in subsequent discussions.

3.2.5 Illustrative Examples of WCC Computing

The approach taken by this experimental research project is to define WCC properties based on the guidelines and biological examples above and then to use that general definition to devise a simulated special case that solves a simple pattern recognition problem. This serves as a "proof of concept" that a network of WCCs defined by analogy with biological processing can perform processing functions that are otherwise difficult for conventional machines.

In order to reach a formal definition of a WCC, several examples of computing functions are first considered. In the Section 3.1, three examples of a cell doing "computing" were presented. These were classical cell biology problems and they will be used to capture the definition of a WCC. In addition to these three examples, two additional examples will be used to capture the essence of cooperative cellular functioning or networking.

The first is a very simple minimalist problem that needs only simple logic. That is the sorting of three WCCs based upon an objective function that is determined by the concentration of two operands. The WCCN consists of three identical WCCs. Each WCC consists of just two interdependent instructions, and IO function and a logic comparator. A vector of concentration data then describes the state of each WCC. Each WCC also has an IO function and a comparator.

The second problem is a distributed computing problem. A problem in biology that can serve as a model of a distributed computing problem is the response of the immune system to extra-cellular microbes. The immune system and why it is a good example of a WCC in a WCCN network was described above.

The definition of a WCC will now be stated and described, followed by a definition of "state" as pertaining to a WCC and then a list of twelve minimum required properties, called Basic WCC Properties. Determining a set of minimal properties that enables the five chosen exemplar calculations to operate, and then adding sufficient generality to enable standard computer logic gate operations to be performed within each WCC, if desired derived this definition. Further, properties were included to enable basic communication between local WCCs, as motivated by biological examples such as the immune system response. All such instructions are assumed to be able to operate in a statistical sense—that is, a large number of copies of any instruction may exist and the output or execution is based upon the random arrival of "operands" to each instruction. It is this property that is referred to as statistical dataflow computing. Any computing device that satisfies the definition and the Basic WCC Properties will be considered a WCC for the purposes of this research.

3.2.6 Formal Definition of a WCC

Before presenting the definition of a WCC, several preliminary definitions must be informally made:

Token. A single atomic unit such as a letter, number or symbol or any abstract or physical element that can be represented by such a letter, number or symbol.

String. A set of tokens that are bound together in a particular order by definition or by existence from an operation or previous event. For example, if a, b and c are tokens, then 'abccccbbbaaa' is a string.

Tree. A string whose elements may also consist of other strings. For example, the following nested string is a tree: {a, b, (a, b, c, (a, b)), c, a, (b, b), c}.

Rule. A representation of an operation that changes the composition of a string. A rule may merge strings, decompose strings, add or delete characters from strings, or insert characters within strings. Further, a rule may move an operand to another location (see below for definition of location).

Object. Any string, token, rule or defined set of strings, tokens and rules is an object.

Operand. A token or string that may be operated on by a rule is an operand.

Instruction. A rule and its allowable operands, that operates on such operands when they are available, Region. A set of tokens, rules, operands, instructions and possibly other objects that belong together at a point in time.

Location. This represents the coordinates in a Euclidean space within which a region and nodes reside. Euclidean or similar distance metrics may be used to assign proximity or presence within a region.

Membrane. A 'membrane' is the boundary of a region if represented topologically, or the list of the set membership of the region.

I/O Instruction. This is an instruction that allows an operand to be removed from a region or that allows an operand to be added to a region.

Node. A computing 'node' shall refer to a region that also may contain regions within it.

Local communications. This is the process by which a node performs I/O instructions and objects removed from a node may be acquired through I/O instructions by other proximal or nearby nodes.

Network. A collection of nodes that relate to each other through local communications. Stochastic data flow computing. Stochastic dataflow computing will be defined as a region with a very large (>>10) number of copies of each of its instruction types and operands that are in random motion within the their regions and whose instructions 'execute' when their respective operands are proximal or within a certain distance simultaneously.

Membrane computing. Membrane computing was introduced in Chapter 2 and has been define by Calude (2001). Informally, membrane computing do membrane bound nodes that in addition to instructions and operands, also contain other membrane accomplish computing bound nodes nested within. The output from a membrane bound node can be transferred to another level through an I/O instruction.

The following is an example of a node for the purposes of illustration.

The node above contains tokens (such as A, B and C) and strings (such as CCCA and CCB) and two rules (RULE1 and RULE2). It also contains a nested node (Region 2) that has tokens and an I/O Rule that allows the exchange of A tokens for B tokens or visa versa with Region 1. In Region 1, RULE1 concatenates two tokens or strings and RULE2 removes the middle out of a string that is at least three elements long. The rules execute when their respective operands are within a distance δs of the rule. It shall be assumed that objects move randomly and at any time a rule's tokens satisfy the distance requirement, it executes. So a plausible sequence of events is eventually Region 2 exchanges the entire A elements for B elements in Region 1 and then RULE1 eventually builds up a string AAAAA. This event might be deemed improbable if all objects move randomly and therefore many other possibilities exist.

Before proceeding to the definition of a WCC, a further discussion of the concepts of stochastic dataflow computing and membrane computing are warranted, as they are deeply intertwined into the notion of a WCC, yet the current body of research in these areas does not anticipate the problems of computing motivated by biological cells. While there is a body of literature on dataflow computing (Silc, 1998), (Arvind, 1993), (Williams, 1997), the field sufficiently underdeveloped that a search for "statistical dataflow computing" or "stochastic dataflow computing" returns no hits as of February 2003. Examples in this field have been limited to isolated instructions and the effect of a large number of copies of the instruction executed upon the random arrival of operands has not yet been addressed by the theoretical literature.

Silc (1998) reports that implementation of dataflow computers has been found to be an arduous task and that research has turned toward the integration of dataflow and control flow computers. This is precisely the wrong direction if one is to model biological computation. In biological systems, not only is large-scale asynchronous MIMD dataflow computing the method of functioning, it is a largely statistical implementation (many copies of every instruction and operand and with results being determined by concentration and not the single output of any one instruction).

Progress in dataflow computing has lead to the conclusion that multi-threading is needed (Silc, 1998). The multithreading that has been pursued is of low dimensionality and that can be implemented on today's RISC processors, which are inherently von Neumann machines. A biological cell is massively multi-threaded with thousands of simultaneous instructions and with repeated computation on the same kind of operand many times over. Such massive multi-threading and statistical instruction behavior has not been addressed by the literature on dataflow computing. A major contribution of this current research is the identification of statistical dataflow computing as an ontological variation in the field of dataflow computing that should be pursued. The present work is limited to the conceptual identification of the architecture and the assessment of performance issues related to it in Chapter 4.

Similarly, the field of membrane computing is new and underdeveloped. Calude (2001) represents the most advanced work and this is a theoretical treatment of abstract structures. While a definition and some theorems about membrane computing are established, no practical programs are given. In contrast to dataflow computing, membrane computing does not have two decades of research history. It is a very nascent field and in its present state, the only useful constrain on the definition of a WCC is that a WCC is a membrane computer—that is a node with that not only contains operands and instructions, but other nodes which do the same. This nested aspect of WCCs is known as a membrane computer. No practical computer programs' have yet been written for membrane computers and the work there remains theoretical in nature. In this present research, a WCC extends the concept of membrane computing into a practical domain whereby the types of computation, example algorithms and performance evaluations are assessed. This is a second contribution of the present work to the field of computer architecture.

The definition of a Whole Cell Computer (WCC) will now be given.

A Whole Cell Computer (WCC) is a computing node that operates in a network of many other WCCs of similar or different types, and that satisfies the four criteria:

b) The node operates by the principles of stochastic dataflow computing. Operands in the node obey principles of interaction driven by or analogous to the second law of thermodynamics.

c) The node can be classified as a membrane computer.

d) The node obeys the twelve basic principles outlined in Section 3.2.5.
e) The node may be 'programmed' by manually fixing the instruction set and operands or through genetic programming as described in section 3.6.

Lastly, the definition of a WCC Network (WCCN) is given. A Whole Cell Computer Network (WCCN) is defined as the network in which a given set of WCCs operates. A WCCN is a specialized form of an Agent Based Model (ABM). An ABM is a model consisting of multiple "agents", which are entities or processors that act on their own behalf with a set of rules. For example, the human immune system response is an ABM that is also a WCCN. Each cell type can be thought of as an agent or WCC. Each has their own rules of operation. For example, a B-Cell responds by making antibodies when it senses a matching antigen. A macrophage engulfs and destroys invading pathogens. Each is an agent following rules of response. The workings of WCCNs and ABMs are addressed in greater depth in Section 3.4.

A living cell is a WCC. A living cell is considerably more complex than a WCC. A WCC can therefore be considerably simpler than a living cell. This definition was chosen to satisfy certain basic operations. Because it is considerably simpler than living cells, parts of the definition and boundaries are arbitrarily set and may be modified in future definition of WCCs or their derivatives and variants.

Agent based models (ABM) may be WCCs, but in general are not. Not all ABMs have rules that follow a membrane computing paradigm. An example of an ABM that is not a WCC is the stock market. While it could be simulated with a WCC network, the market itself has no membrane boundaries, nested structure, etc.

A traditional von Neumann computer is not a WCC. It is a control flow architecture and does not obey the principles of stochastic dataflow computing. A WCC can be simulated on a traditional von Neumann machine to the extent that random numbers can be generated to represent the behavior of a large number of objects. Such a simulation would require a very large memory to account for all of the WCCs, objects, states and rules. Chapter 4 addresses the performance issues involved in a WCC and a WCCN for computational purposes, including the performance of stochastic dataflow machines.

A WCC is a massively parallel computing device in its most general form. It is potentially constantly in a state of flux. To be useful in computation, it is necessary then to define the state of a WCC.

The "state" of the WCC is the collective concentration or expression level of all operands, called the "state vector". It has meaning associated with a particular genetic "program" or a particular point in time in a computation for a given WCC in a network.

For a given $WCC_j$ of a WCCN, let O be the set of operands that are currently present $o_1, o_2 \ldots o_n$, that is $O=\{o_1, o_2 \ldots o_n\}$. The size of the set O is n, meaning that there are n operand types in it. In general, the set O must be partitioned by node and any operand present in multiple nodes must be represented by different $o_i$. Hence a more general representation of O is given by:

$$O=\{o_1, o_2 \ldots o_n | o_{d+1}, o_{d+2} \ldots o_{2d} | \ldots | o_{(n-1)d+1}, o_{(n-1)d+2} \ldots o_{nd}\}.$$

Now let, $S_t=\{S_1, S_2, \ldots s_n\}$ where $s_i$ is an integer that represents the number of copies of $o_i$ in $WCC_j$ at time instant t. $S_t$ is then called the state vector of $WCC_i$ and in general is referred to as the state. An individual value of $s_i$ is called the expression level of $o_i$. In cell biology, this is analogous to gene expression, as measured by microarrays.

Hence, in general a WCC consists of a 6-tuple set $\{N, I, O, S_t, M_W, M_N\}$ where:
N is a set of properly nested nodes
I is the set of instructions, subscripted by the nodes they belong to
$O_i$ is the set of operands for $WCC_i$
$S_t$ is the state vector for $WCC_i$
$M_W$ is a map of how the nodes are nested with respect to each other
$M_N$ is a map of the network of other WCCs that the $WCC_i$ is related to Any such 6-tuple characterizations that also obey the principles of a WCC by the definition above shall be considered a WCC in a particular expression state.

3.2.7 Twelve Basic Properties of the WCC

This section presents twelve Basic WCC Properties. Any computing element that satisfies the definition of a WCC and the twelve Basic WCC Properties will be formally classified as a WCC. The analysis and performance results in this research presented in Chapter 4 correspond to computing devices classified as a WCC. The reason these twelve properties were selected is that it is the smallest number of properties that captures the essence of the biological computing examples discussed in 3.1 and 3.2.1-3 that were provided to motivate the concept of a WCC. The definitional boundary is in a sense arbitrary and selected to provide a balance between capturing the essence of real biological computing and simplicity so as to allow a multitude of potential physical and practical implementations. The trade off between these two aspects of WCC computing is as much art as it is science. The research approach used was to test definitions of increasing complexity until not only the forgoing criteria was satisfied, but also that the resulting architecture was capable of implementing the anticipated classes of problems.

Before presenting the 12 properties, some observations will be made about the 5 exemplar computational problems being used as a model. Table 3.2.5-1 below summarizes the five exemplar problems and their computing properties that must be assumed by the definition and principles of WCCs.

To prepare for discussing Table 3.2.5-1, an overview of the sorting operation is needed. Assume there are three identical WCCs, each containing an operand $o_1$. Each WCC has many rules, some of which produce $o_1$. Each WCC also has an I/O instruction that causes the WCC to move to the right of its right hand neighboring WCC if it has greater concentration of $o_1$. Over time, the three WCCs will sort into increasing order. The time that it takes to do this is dependent upon the "motion" properties of the operands or the rate of transport and diffusion. The result is approximate in the sense that at any given point in time, there is a probability that one or more elements is slightly out of order for statistical reasons. This is an important contrast with traditional computing.

TABLE 3.2.5-1

Properties of Exemplar Computing Problems

| COMPUTING EXAMPLE | IMPORTANT PROPERTIES |
|---|---|
| Glycolytic Pathway | Dataflow driven, multithreaded, highly parallel |
| | Statistical behavior, determined by aggregate concentration |
| | Enzyme activated instructions |

TABLE 3.2.5-1-continued

Properties of Exemplar Computing Problems

| COMPUTING EXAMPLE | IMPORTANT PROPERTIES |
|---|---|
| LAC operon | Same properties as glycolytic pathway |
| | Instructions regulate each other |
| | Responds to concentration level |
| JAK/STAT Signal transduction Pathway | Same properties as two examples above |
| | External signaling activates some instruction |
| | Pathway activates expression of new instructions or enzymes |
| Sorting | Responds to concentrations level |
| | Simple rules or heuristics |
| | Network of simple agents |
| Immune System Response to Bacteria | Same properties as all of the above |
| | Multiple agents operating in a complex network |
| | Agents produce actions or signals as output |

The resulting 12 properties considered essential are as follows.

1) A WCC is a membrane computer according to the definition by Calude (2001). Any given node of a WCC has at least one membrane bound instruction within it.
2) A WCC contains one or more instructions, all of which operate by the definition of stochastic dataflow computing. Instructions convert one or more operands into one or more operand products and sometimes require the presence of additional operands that do not undergo change (corresponding to enzymes or binding factors in biological cells). Instructions execute upon the arrival of all necessary operands within a proximal distance to the instruction. The distance is determined by rule or instruction.
3) Objects move randomly in a WCC according to Brownian motion (or active transport, if WCC instructions and operands exist to move objects via active transport) as in the second law of thermodynamics. The state vector of the WCC provides information about the results or status of "computing". Such results or status are determined by the statistical aggregate expression level and state vector as a result of the random motion and aggregate execution of instructions.
4) Programs are stored as one or more strings of embedded operands and programs execute by arrival of activating or regulating operands. Programs do not execute entirely, but only those instructions that are instructed to become active do so. This is analogous, but not isomorphic to DNA in biological cells. Instructions are in a latent state as long as they remain bound in a string, and are activated when other regulatory instructions "copy" the string and move them into an active region of the WCC. (This is a vital concept that defines the storage of programs).
5) Contains a "cache" memory, which maintains a single copy of each individual instruction that is active in a given WCC. This corresponds to mRNA in biological cells. Instructions have already been copied from programs (DNA), but are not yet made into executable copies.
6) Contains at least one of the following types of IO Instruction: 1) Instructions that cause operands to cross membrane boundaries, and/or 2) instructions that respond to ligands. The latter is motivated by the JAK/STAT example whereby instruction is activated by the presence of a molecule on a cell surface receptor.
7) A WCC contains an operating system that provides the mechanism for copying instructions and operands from programs, delivering them to the proper location, and providing the power for their execution upon the arrival of their operands. This operating system is analogous to cellular transcription, translation, metabolism and enzymatic activation of reactions and is described in terms of a WCC in Section 3.5.
8) Program execution is massively parallel, distributed, multi-threaded and otherwise contains no central processing unit.
9) Memory and computing results are stored via the state of WCC in a distributed manner. The short term memory 9STM) of the WCC is the current state vector. The long term memory (LTM) of the WCC is the active pathways (sequences of instructions where one the output of one feeds the input of others into a network resulting in a pipeline of action or execution).
10) There may be differing types of WCCs in a network, but there are many (>>10) copies of each type.
11) A WCC is robust to computing errors. Because there are many copies of any given instruction, operand or WCC, a defect in any one unit will not greatly affect the computational results. A direct consequence of this is that WCC networks may continue to operate in a defective or "diseased" state if stable, system errors such as incorrect pathways become established.
12) A WCC may cease to function by its own decision if it becomes defective. An operating system pathway called "apoptosis" accomplishes this and it corresponds to cellular apoptosis or programmed cell death.

3.3 WCC Computing Instructions

The notion of a WCC instruction was described in section 3.2.2. A definition of a WCC instruction is provided here, along with the properties of a WCC instruction and several examples. The WCC instruction examples are sufficient to cover basic logic functions, I/O and program execution commands.

This section answers the following two questions:
1) What are 10 examples of computing instructions that typify a WCC?
2) How are sample instructions "derived" from bioinformatics databases?

It answers these questions by analogy to biological examples and by development of computational examples covering a range of possible WCC instructions as detailed within this section.

The concept of a WCC instruction was introduced in Section 3.2. In this section, a WCC instruction is formally defined, followed by ten examples including both biologically motivated examples as well as computationally motivated ones such as computer logic gates. Also, a method is provided for extracting instructions from bioinformatics databases in Section 3.3.3 with the third example instruction.

An instruction I is defined as the transformation of a set of N operands: $O_I = \{O_{I1}, O_{I2}, \ldots O_{In}\}$ into a set of M products $P_I = \{P_{I1}, P_{I2}, \ldots P_{IM}\}$ in the presence of a set of L invariant operands (which are called "enzymes" corresponding to an analogy to biochemical enzymes, and which may be an empty set if no enzymes are needed): $E_I = \{E_{I1}, E_{I2}, \ldots E_{IL}\}$. Usually L=0 or 1 and M and N are small numbers, but this need not be the case. The operands, enzymes and products are strings or trees, as defined in Section 3.2.4. An instruction "executes", that is converts its operands to products, each time there is a complete set of operands and enzymes available to it (within a minimal distance of the location of the instruction). In a WCC, location refers to a Euclidean distance metric in a region and every instruction I must have a set of location coordinates. The following shorthand notation will also be used for instructions:

$(O_{I1}, O_{I2}, \ldots O_{In})|(E_{I1}, E_{I2}, \ldots E_{IL}) \rightarrow (P_{I1}, P_{I2}, \ldots P_{IM})$ An important property of instructions is that their execution must preserve the tokens in all the strings involved. In other words, no new tokens may be created or destroyed, but they may only be rearranged on the strings and trees representing the operands and products. Hence, the total token set (the set of tokens if all strings were completely digested to the token level) contained in $O_I$ must be identical to the total token set contained in $P_I$.

Another property of instructions is that operands and products are strings or trees and are not algebraic variables. The only way to assign a value to an operand or product is to modify it by appending or deleting a substring from it by means of an instruction. The result of any computation shall be associated with the expression level of the products, or the number of copies of each that exists. The expression level of a product $P_I$ is denoted by $<P_I>$ and shall be read "the expression level of $P_I$".

In cells, which are also WCCs, the concept of energy or power supply is built into the definition of an instruction, as often one of the required operands is an energy molecule, such as ATP, that gets transformed to a molecule of lower energy state, such as ADP, as the instruction executes. The cellular operating system uses metabolism (also a series of instructions or pathways) to produce energy or ATP.

At any time in a given region, the space of next possible instructions are all those that can possibly execute. Execution is not serial however, and in general, can be parallel, if adequate resource exists. It is assumed all "energetically favorable" instructions execute, unless they compete for resources. If there is competition for resources, the criteria for the next instruction are based upon spatial distribution, proximity, strength of concentration, etc. In general, each instruction operates when its prerequisites are satisfied, and not according to any sequential program.

In WCCs, execution of instructions results in products, which may be operands for another instruction. A sequence of instructions $P=\{I_1, I_2, \ldots I_K\}$ is called a pathway if each instruction $I_j$ has at least one operand that is a product of instruction $I_{j-1}$. A pathway is a sequence of instructions that depend on the results from previous instructions in order to execute. In biological cells, WCC pathways correspond to biochemical pathways (metabolic pathways, biosynthetic pathways, signal transduction pathways and gene regulatory pathways).

3.3.1 Example Instruction #1: Ion Channel

The first example is an I/O instruction that is modeled after ion channels in cellular biology. The operation of the neurotransmitter GABA is used as an illustrative example. When two molecules of GABA bind to the cell surface receptor, chloride ions rush into the cell. The channel opens because the channel proteins rotate sideways serving to open and close the channel and allow chloride ions in based on the presence or absence of GABA at its surface (Zimmerberg, 2000).

When modeling a biological function, often the biological details are unimportant. An instruction may be specified if its operands, products and enzymes are known, leaving biochemical details behind. This opens up the possibility that bioinformatics databases can be used to automatically compile instruction sets for engineering WCC systems. This is further discussed in Section 3.3.3.

For the chloride ion channel activated by GABA, the instruction can be modeled as follows. The operands are two GABA molecules (which remained bound to the channel) and a chloride ion $Cl^-$ arriving at the region outside the WCC membrane in the vicinity of the channel (instruction). The products are the same two GABA molecules remaining where they are (on the outside of the WCC membrane at the location of the channel or instruction, and a chloride ion on the inside of the WCC membrane. This is clearly an I/O instruction in that at least one product appears in a different region that the operands. In the biological sense, the ion channel remains open as long as the two GABA molecules are bound to it and chloride ions pass through repetitively. In neurons, this is a ligand gated neurotransmitter channel that allows chloride ions in the neuron, causing a hyper polarization and therefore inhibition of transmission (Zimmerberg, 2000). In WCCs, this corresponds to repetitive execution of an instruction.

In computation, it could be used as a logic gate or signaling mechanism. If $<Cl^->$ are present, some subsequent action can occur that cannot if it is not present. Such gating factors are WCC are more useful as steps in a signal cascade (instructional flow) than as a control flow computer device executing an IF THEN statement. Using the biological analogy, the most direct biological interpretation of this WCC instruction would be to inhibit the output signaling of a WCC (thereby inhibiting its communication with a neighboring WCC). The net computational value (for simulation and analysis purposes) then is "upon the arrival of an adequate quantity (to be specified) of GABA, then inhibit the output of WCC signaling. One could imagine a complementary instruction that does the opposite. Upon the arrival of a sufficient quantity of X, then excite (or enable) the output of WCC signaling.

This explanation leads to the need for expanded notation, as one of the products crosses a membrane boundary. FIG. 3.3-1 illustrates this instruction in a cartoon. Chloride ions enter the WCC region through the channel provided that two GABA molecules are present. A formal representation of this instruction is:

$I=[O_I=\{GABA, GABA, Cl^-\} \rightarrow P_I=\{GABA, GABA|Cl^-\}; E_I=\{ \}]$.

The vertical bar is introduced to represent the membrane boundary. In a complete system, a subscript would be needed to indicate the location of the instruction. There are no enzymes. Notice that two of the operands (GABA and GABA) are also products, meaning that they are not "consumed" by the execution of the instruction. To be systemically useful, we must identify the source of GABA and the "instruction" that produces it. I/O instructions are more useful for communication between WCCs than processing within them.

3.3.2 Example Instruction #2: First Step of Glycolysis

Recall FIG. 3.1-1 which illustrated the first reaction in glycolysis. It can be represented as a WCC instruction as follows:

$I=[O_I=\{glucose, ATP\} \rightarrow P_I=\{glucose-6-phsphate, ADP\}; E_I=\{hexokinase\}]$.

The details of the string or tree composition of the operands and products are not needed for the purposes of this illustration. This instruction transforms an operand into a product and consumes energy by transforming another operand (ATP) into another product (ADP). An enzyme is required for execution.

3.3.3 Example Instruction #3: Second Step in Glycolysis

The second step in glycolysis (Becker, 2000) is represented in this section as an instruction as a further illustration and also to further elucidate the notion of pathways. The concept of compiling WCC instructions automatically from bioinformatics databases is also introduced in this section because it is based on pathway information.

FIG. 3.3-2 illustrates the second reaction in glycolysis. It transforms the product of the first reaction to fruscose-6-phosphate and requires an enzyme, which is represented by the symbol Gly-2 (Becker, 2000). No ATP is needed.

The representation of the instruction that models this reaction is given by:

$$I=[O_I=\{\text{glucose-6-phosphate}\} \to P_I=\{\text{fructose-6-phsphate}\}; E_I=\{\text{Gly-2}\}].$$

The concept of a pathway was previously defined and this instruction and the previously illustrated instruction are examples of two instructions that belong to a pathway, in this case the glycolytic pathway.

Metabolic pathways and other kinds of pathways have been cataloged in databases in the bioinformatics community. Examples of such databases include KEGG (KEGG, 2003), a database of metabolic pathways, and EcoCyc (Karp, 2000), a database of pathways in prokaryotes. These databases can be used to compile instructions that model cellular processes. Typically, each database entry will represent the steps of a pathway by their reactants (operands), energy consumption of ATP (also an operand), enzymes, and output products. To compile instructions from a pathway database is as simple as writing a parser to extract each set and drop it into a list representing the instruction. The system designer must specify the token and string language to be used.

FIG. 3.3-3 below is a pathway extracted from KEGG (KEGG, 2003). It illustrates the pathway for inositol metabolism. It is a relatively simple pathway. Each node identifies a reactant or product and each arc refers to a database entry that contains the details of the reaction. An "instruction compiler" could in principle extract and parse the entry on each arc into a representative instruction. While this is a simple process, it is significant and one of the notable results of this research. It is a process that enables the direct computer encoding of metabolic or biochemical processes as computational paradigms and this will potentially be a tremendous research tool for systems biology in the future.

3.3.4 Example Instruction #4: Immune System Response Example

The immune system has been used as an example throughout this work. It is natural then to illustrate a WCC instruction motivated by immune system response communication. Most of the interesting properties of the immune system relate to communication and therefore it makes a good example of WCCNs. However, in order to effect the necessary communication, I/O instructions and pathways are needed. An illustration of an I/O instruction motivated by the molecular binding of a molecule called IFN-γ (Interferon gamma) to a macrophage receptor, which subsequently activates the macrophage, is shown here (Abbas, 2000). The process is greatly simplified to eliminate the biochemical pathway details, but the instruction illustrates the response of a cell or WCC to an external signal. The instruction is:

$$I=[O_I=\{A, B\} \to P_I=\{AB\}; E_I=\{\text{IFN-}\gamma\}]$$

The simple ligation of A and B resulting in AB is intended to represent an activation signal. If <AB> is high, then the macrophage (WCC) activates. This is presumably because AB is an operand in an instructional pathway that causes the desired response. The "enzyme" IFN-γ is shown to the right of a vertical bar indicating that it is not in the WCC region.

3.3.5 Example Instruction #5: An instruction involved in cell cycle control

Cell cycle control is a problem if interest to biologists. A series of signals determines whether and when a cell divides. An illustration of a WCC instruction that advances a cell one stage in the cell cycle is provided for the purposes of illustrating how to model a biological process as a computation.

The cell cycle progresses through four stages known as M, G1, S and G2 (Becker, 2000). G1 is the first growth stage and progression through this stage requires energy from ATP, various enzymes called "kinases", a molecule called G1 Cdk (G1 "cycline dependent kinase"), and a molecule called GI cyclin (Becker, 2000). The following instruction enables passage through G1. readers with a biological background will recognize the enzymatic chemical reaction embedded in the WCC instruction:

$$I=[O_I=\{G1\text{-}cdk, G1\text{-cyclin}, ATP\} \to P_I=\{G1\text{-}cdk\text{-}G1\text{-cyclin-}P, ADP\};$$

$$E=\{\text{kinases}\}].$$

The instruction removes a phosphate group P from ATP (converting it to ADP) and attaches it to a concatenated string of all the rest of input operands.

3.3.6 Example Instruction #6: Endocytosis or an I/O instruction for output

Endocytosis is a process where a cell exports one or more molecules by merging a vesicle (or region) containing them with the cell membrane. The process motivates a type of output instruction for WCCs whereby strings are removed from the WCC. It can be modeled as a simple movement of strings as follows:

$$I_v=[O_I=\{s_1, s_2, \ldots s_k\|\} \to P_I=\{\|s_1, s_2, \ldots s_k\}]$$

The subscript V is used to reference the instruction to a specific vesicle or region V within the WCC. The use of the double bar ∥ indicates that the strings $s_1, s_2, \ldots s_k$ pass through two regions (from the vesicle to the exterior of the WCC). The instruction does not modify any of the strings, but rather it moves them across regions.

3.3.7 Example Instruction #7: Digestion

Digestion involves breaking a string into two strings after the nth token. It is useful in computational work involved in sorting, matching or logical comparisons. The digestion instruction can be formally represented as follows, where the instruction is parameterized by n, the position of cleavage of the string.

$$I_n=[O_I\{(s_1s_2 \ldots s_m)\} \to P_I=\{(s_1s_2 \ldots s_n), (s_{n+} \ldots s_m)\}; E_I=\{\text{digest}_n\text{-enzyme}\}].$$

3.3.8 Example Instruction #8: Ligation

Ligation is the opposite of digestion and it is the process of concatenating two strings. It is a very useful instruction for computational purposes. Basically it works by given two strings, merge them together. The following is the formal representation of the instruction for a general purpose WCC system.

$$I=[O_f=\{(s_1s_2 \ldots s_n), (t_1t_2 \ldots t_m)\} \rightarrow P_f\{(s_1s_2 \ldots s_nt_1t_2 \ldots t_m)\}; E_f=\{\text{ligase-enzyme}\}].$$

3.3.9 Example Instruction #9: NAND Gate

A NAND gate is a function that means "not AND". In traditional computers, it returns a value of 0 when all of its inputs are 1, and otherwise it returns a 1. Things are not so simple in the WCC world, as there is no absolute 1 or 0 answer to a question, but rather a statistical concentration indicating an expression level. Tokens and strings are not variables, they are absolute symbols and cannot take on a 0 or 1 value. Instead, they are absent or present.

An AND gate is a simple ligation instruction of two or more inputs in a specified order. The output is the ligated string and the answer to the AND function is the concentration level or expression level of the output product. This, in shorthand notation, A AND B can be implemented by the following ligation: (A, B)→AB.

The expression level of AB, or <AB> is the result. A high value of <AB> means A AND B is true. A NAND gate requires no further implementation, as a low value of <AB> indicates A NAND B is true.

Statistical computing output is always in expression level rather than absolute values. The very meaning of a logic gate operator is changes. In a von Neumann architecture, the gates AND and NAND have absolute meaning. In a WCC architecture, they have only expression levels. The tokens and/or strings with high expression levels represent the state or answer to a problem. This is not unlike gene expression or biochemical reactions in cells. There is only an expression state and never an absolute state. This will be significant later when programs and algorithms are discussed.

3.3.10 Example Instruction #10: OR XOR, and NOR gates.

An OR gate can be computed from a ligation instruction also, but other operands must be involved. For example if it is desired to compute the value of A OR B, this can be done by ligating A and B separately with other commonly available operands and then digesting the A or the B off the resulting string. This would proceed as follows. The ligation operations (in shorthand notation) are:

(A, X, Y)→AXY (B, X, Y)→BXY

Here it is assumed that X and Y are highly expressed in the region of computation. This ligation instruction is followed by a digestion instruction, as follows:

AXY→(A, XY)

BXY→(B, XY)

The value of A OR B can be ascertained by measuring the expression level of XY as <XY>. If <XY> is high, then A OR B is considered to be true. Once again, recall that A and B (and X and Y) are tokens or strings and not algebraic variables. There are no algebraic variables in WCC instructions. The data and programs are inseparable as in LISP programming in the conventional computing world.

A NOR gate is implicitly implemented whenever an OR gate is executed, because when <XY> is low, then A NOR B is true. The meaning of A OR B or A NOR B is purely a logical statement about the presence of A and/or B tokens or strings, as the case may be.

An exclusive OR, or XOR gate, can be implemented by simply adding two instructions to the pathway listed above. These would be the AND gate as described in Section 3.3.9, and a further digestion instruction:

(XY, AB)→(X, Y, A, B)

Then, <XY> will be low when both A and B are high, and XOR is implemented.

Logic gates in a WCC must be interpreted thermodynamically. The execution of any one copy of the logic gate instruction is insignificant. What is significant is the concentration of operands and products indicating in a large sense the relative quantity of execution of the logic gate instruction. Thus, the "answer" is not black or white, but gray. One would expect that the results point toward a black or white answer.

The ability to implement logic gates in a statistical sense in WCCs is significant. It means effectively that conventional computing algorithms may be implemented in cells or in WCCs by pathways of instructions or reactions. Not only are biological functions able to be implemented, but essentially any computing algorithm can be carried out by the right set of instructions, operands and enzymes. This observation may be of significant interest in reverse engineering the biochemistry of a cell. If a cell is viewed as carrying out computations, then understanding the program that is being executed may lend new insight into cellular functioning.

The instructions shown in 3.3.9 and 3.3.10 were without enzymes or energy consumption. This could just as easily have been the other way. Each of those logic gate instructions could be rewritten to require either the consumption of an energy token (equivalent to ATP conversion to ADP in the biochemical sense), or to require an enzyme, or both. If either or both of these were the case, there would be an energy economy associated with the large scale execution of a massive number of copies of the logic gate, making energy consumption a component to the outcome. Depending on the physical implementation of a WCC for such logic gates, this might be required.

For example, suppose E is the number of "energy tokens" consumed by a logic gate instruction. If P is the product of the instruction, then [P], or "the concentration of P" is the quantity of output after the instruction has executed many times. Assume that $[P]=P_{crit}$ is the critical threshold indicating a successful result. The energy requirement to achieve that result is $E \cdot P_{crit}$. If the energy pool does not contain $E \cdot P_{crit}$, then the instruction cannot achieve the critical output concentration $P_{crit}$.

The work presented here is distinct from the research of Thomas Knight at MIT (Garfinkle, 2000) whose work focuses on the implementation of logic gates using multiple bacterial cells. Here the focus is on implementing logic gates within a cell, or WCC. The significance is the implication of a biological cell or its simpler WCC counterpart as a general purpose computational processing unit.

3.4 Complex Systems Solution to WCC Problems

This section introduces the concepts of cooperative problem solving, agent based models (ABM) and emergence as a way of describing the behavior of WCCNs. It answers the question "How are WCCs configured into a network to solve problems?" by showing that WCCNs are a special case of the existing theory of ABMs, and by using the immune system response as an illustrative example. The main intent of this section is to provide an introduction to the concept of WCCN operation in order to place the extensive WCC study of this research into context. A deeper study of WCCNs as ABMs is a vast subject and the topic of future research.

The immune system response was previously introduced as a system of WCCs that operate in a network called a WCCN. Recall that in the immune system consists of a number of object classes (T Cells, B Cells, macrophages, natural killers, etc.), each of which are WCCs and together which coordinate am immune system response. In such as system, each cell or WCC follows its own rules or instructions, but also engages in various communication events with other cells or WCCs. The total response of the network of cells or WCCs, called a WCCN is the emergent behavior of the collective action of the individual WCC behavior. The immune system response is an ideal prototype for the model of a WCCN.

Computation in WCCs occurs when an instruction executes and causes a change to the structure of one or more strings. As illustrated in Section 3.3.6, "communication" occurs when one or more "objects" crosses a membrane boundary. Communication is the passage of "signals" which can be from a set of operands for another region or WCC. Hence, a WCCN not only contains a large collection of WCCs (of similar and mixed types), but also requires communication events so that WCCs influence each other.

One model of computation that may be suited to WCCNs is the cellular automata (CA). Cellular automata are simple, discrete dynamic systems. A CA consists of cells, rules and states. Each cell computes with rules and the result is a state. Cells communicate with their local neighbors and a network of cells has emergent behavior. Wolfrom (2002) studied CA in depth for computer graphics problems. His main contribution was the evidence that with CA, programs with simple rules can yield behavior of great complexity. It appears on the surface that CA is a good model for networks of WCCs as each WCC could be considered a cell and the instructions are its rules. A limitation, however, of CA is that cells remain fixed in place and communicate only with local neighbors. This is an overly restrictive limitation for WCCs as they may be permitted to move and communicate over long distances per their biological analogical counterparts.

A more general model than CA that is not subject to the same restrictions mentioned above are agent-based models (ABM). ABM have "agents" rather than cells and they are not restricted to communicating only with their immediate neighboring cells, and in general are mobile. ABM is therefore a better model for WCCNs than CA. WCCNs and their component WCCs were explicitly define and therefore are a specialization of ABMs. But ABMs are software entities and WCCNs are hardware entities (or wetware), at least in theory. Hence WCCNs become the physical realization of certain ABMs. The purpose of this discussion is to put into context the following discussion on ABM properties applied to WCCNs.

Because ABMs are more general than CA, the property that Wolfrom (2000) observed should extend to ABMs—that is, simple rules can yield behavior of great complexity. WCCs may have simple or not so simple rules. Networks of WCCS or WCCNs should, therefore, be capable of coordinated behavior of extraordinary complexity. That is observable everyday by looking at living organisms, which are of course, made of networks of cells.

One of the main reasons WCCNs must be modeled by ABMs rather than CA is the nature of their inter-WCC (or intercellular) communication. Again, taking analogies form biology, intercellular communication can be autocrine, paracrine or endocrine (Becker, 2000). What this means is that communication from a WCC can be with itself, its neighbors, or long distance to other WCCs not nearby as accomplished with hormones, for instance). It is this latter property that is not modeled by CAs. Further, outputs from WCCs, including I/O instructions or communications, are inherently statistical, which fits well with ABMs, but not with CAs.

WCCs must also allow for multiple types of I/O instructions that affect the WCCN. Biological analogies of interest are ligand binding, ion channels, diffusion, endo/exocytosis. All of these have been discussed with the exception of diffusion. That can be modeled with a simple membrane traversal instruction.

ABMs are a general and powerful mechanism, though not well developed. There is a host of ABM software models in various fields, such as economics (Axelrod, 1997). A general theory is still in the waiting. Nonetheless, there are valuable properties of ABMs that can be drawn form the field of complex systems (Bar Yam, 1993), (Dooley, 2002) which make a useful starting point for analysis.

Dooley (2002) delineates 7 properties of complex systems that ABMs obey. In a complex system (including a WCCN), agents (including WCCs) interact with one another and produce emergent properties. Some of these properties will be illustrated here for WCCNs through the use of the immune system response as a WCNN as introduced in Section 3.3. The emergent properties of the immune system include its ability to mount an attack against invaders. No one cell "knows" what the entire system is doing.

Table 3.4-1 highlights the 7 properties of complex systems modeled by ABMs that Dooley (2002) reviews, along with their definitions, their respective implementation in the immune system (Abbas, 2000), and finally a general principle for WCCNs.

TABLE 3.4-1

ABM Properties for WCCNs

| PROPERTY | EXPLANATION | IMMUNE ROLE | WCCN ROLE |
| --- | --- | --- | --- |
| Aggregation | Groups of agents can be collectively modeled as a meta-agent | Inflammation is a collective process of the immune system | Groups of WCCs may form functional elements (organs) |
| Tagging | Agents are categorized or tagged; facilitates aggregation | Tags include: B-Cell, T-Cell, macrophage, etc. | Different types of WCCs within same WCCN are tags |
| Nonlinearity | Response is not proportional to stimulus | Immune response is nonlinear, i.e. delay due to adapting | WCCNs are ABMs in physical form and therefore nonlinear |

TABLE 3.4-1-continued

ABM Properties for WCCNs

| PROPERTY | EXPLANATION | IMMUNE ROLE | WCCN ROLE |
| --- | --- | --- | --- |
| Flow | Physical elements and information flow within an ABM | Cells move, and they signal others: (cytokines) | WCCs move and information is transferred |
| Diversity | Each agent is potentially unique | Every cell is in a slightly different state, or more | No WCC is in the same exact state or place |
| Internal Models | Mental models of the problem space | Signal transduction pathways | Instructions and pathways |
| Building Blocks | Reusable pieces or modules | Complex molecules | Tokens, strings and trees |

The table shows the properties of an ABM and it is clear that WCCs are the agents of WCCNs and behavior emerges from the instructions and communications (I/O instructions) that the WCCs execute. But how do you solve problems with such a general network? Examples are shown in Section 3.6 of specific computational problems, and a programming method based on gene tic algorithms is provided in Section 3.7. Lastly, an in depth look at a single problem—character recognition—is provided in Section 3.8.

Before concluding that genetic algorithms are needed to optimize WCCNs in order to achieve a desired result, however, a review of work attempting to explicitly achieve results in cooperative problem solving networks (Lesser, 1987) is provided.

According to Lesser (1987), a distributed problem solving network is a network of "nodes" (agents) that work together to solve a problem. Cooperation toward solving problems is achieved through communication. Lesser (1987) suggests that goals should be used to drive problem solving behavior. For example, he introduces a "functionally accurate, cooperative" (FA/C) model where the agents cooperate by exchanging tentative partial solutions based on their own limited local views of a problem. The goal of each agent is to reach a solution and so it is to their benefit to exchange partial solutions in order to gain additional information. The drawbacks of this approach are the need for explicit representation of details in a highly complex network. That is not likely to be achieved explicitly in a WCCN as it is a pure dataflow model and a FA/C model has a control flow orientation. There is a lack of a significant following to this otherwise good research, which is further evidence of the difficulty of implementation of this approach.

An important concept for the description of network dynamics is the state space (Huang, 2002). A state space is a description of the "state" of each WCC in the network as a function of time with regard to the input and output operands of that WCC. For example, suppose $WCC_i$ has three inputs $I_i1$, $I_i2$, and $I_i3$ and two output operands $O_i1$ and $O_i2$. If we use the brackets [O] to denote "the concentration of" operand O, then the state of $WCC_i$ at an instant in time is given by the vector $\{[I_i1], [I_i2], [I_i3], [O_i1], [O_i1], [O_i2]\}$. The collection of such vectors for all i corresponding to a $WCC_j$ in the WCCN is the state of the WCCN at that instant in time. The network state vectors represent the "network dynamics" as a function of time.

Network dynamics and state vectors are a complicated ordeal, but typify complex systems [Bar Yam, 1993]. One property of complex system network dynamics is the concept of an "attractor". An attractor is a set of state trajectories that repeat or recur over time. A trajectory is a time dynamic segment of the WCCN state vectors. If a trajectory returns to a previous state, then they dynamics will continually repeat that cycle, Such a cycle is called an attractor. In a complex system, an attractor represents a stable place, and in a WCCN it may correspond to the solution of a complex problem.

WCCs and WCCNs have a large state space. A state space is the collection of all possible state vectors to describe the network. To solve problems globally would require some methodical enumeration of the possibilities is the "state space" of the WCCs and the WCCN. It is in general not possible to pre-state the entire possibility space of a WCC. This can be concluded from the work of Kaufmann (2000) on biospheres. He concludes that it is not possible to re-state the entire state space of a complex network by showing a calculation that quickly leads to a combinatorial explosion of states that exceed the age of the universe in seconds for even a small network. He then heuristically reasons that each state must be studies for more than a second and therefore it could not have been possible for a biosphere to emerge based on pre-calculation because it is immensely more complex than the small network example used in the computation. The same in general holds for WCCNs, as they are topologically equivalent to the networks Kaufmann (2000) was speaking of.

For this reason, genetic algorithms are the method of choice for optimizing WCCNs. WCCNs do not have a central intelligence, they operate in large swarms and high redundancy, and the only means of controlling their emergent behavior is by changing the instructions or environment. Without a means of explicit control, all other optimization techniques that are well developed are not available to program WCCNs and WCCs. The details of this theory are presented in Section 3.7.

A WCCN may be viewed as a "multi-computer". A multi-computer is a multiprocessor architecture that has no shared memory and no shared memory address space (Ranka, 1989). Thus, each processor operates independently. Consequently, to use data in a multi-computer (and hence a WCCN), the data must be moved to the processor (WCC) where the computation is to take place. In a WCCN, this takes place through the I/O instructions, which pass operands into the network and ultimately to other WCCs in the network. Ranka (1989) presented several different kinds of interconnection networks for multi-computers, including a binary tree, a mesh, a hypercube and a ring architecture. These have been popular architectures for study, but are much more limiting than WCCNs. The difference is that in a WCCN, the connections are not necessarily fixed. WCCs are, in general, mobile, and thus the ABM model of a WCCN is extremely flexible compared to classical multi-computer architectures.

In the same way, a WCCN is a much more general structure than a neural network. Neural networks use very simple processing elements (PEs), which are far less, sophisticated than WCCs. Further, their interconnection networks are fixed, rather than general ABM models. Hence, a WCCN can be formulated to solve any neural network problem, and much more. The reverse is not true.

In summary, a WCCN is a powerful and complex network. It is describable by the principles of ABMs, and is more general than either a multi-computer or a neural network. In fact, a WCCN can be setup to solve any multi-computer or neural network problem simply by specializing its design to emulate the chosen multi-computer or neural network. However, given its ABM power, a WCCN can emulate any complex system. It is then theoretically highly suited then to modeling distributed systems such as biological systems, complex networks, economic systems, etc. the principles of complex systems (Bar Yam, 1993) then can be mapped directly onto some WCCN for any given complex systems problem. This is a powerful statement of the potential of a WCCN. The theoretical issues of computability are addressed in Chapter 4.

3.5 Defining the WCC Operating System

An operating system is traditionally a software layer that mediates between an application program and the physical hardware. The operating system in the WCC architecture should in principle be the same. However, there are some fundamental distinctions because of the distributed nature of the architecture and because of the possible inseparability of hardware and software in some implementations. The operating system of a cell was previously discussed in 3.1.2. The operating system of a WCC is defined to mimic the properties of a cell operating system as necessary to support the definition of a WCC. The remainder of this section defines and elaborates on the operating system of a WCC, including those functions necessary for the cooperative operation of WCCs in a network a discussed in 3.4.

This section continues to answers the following two research questions:

11. How are the concentration levels of "operands" and the second law of thermodynamics relevant to computing with WCC instructions?
12. What are the architecture of WCC in terms of "organelles" (compartments or membrane bound subsets), the "nucleus" and its functions, and the concentrations levels of "operators" (i.e. enzymes)?

Many aspects of the first question have already been answered. The remaining issue to be addressed in this section is how the strings are managed from a randomness or maintenance point of view. The second question will be more deeply addressed as the nuclear issues of transcription and subsequent translation as well as the organelles of the cell has not yet been covered from a WCC point of view. These aspects are part of the operating system. This is done by analogy to cell biology functions that are necessary to maintain the life of the cell and by comparison with the cellular operating system described in Section 3.1. Further, several scenarios of computational needs are discussed that put the resulting WCC operating system structure into context.

Section 3.1.2 described the operating system of a living cell. In this section, the operating system of a WCC is defined. Note that the operating system has an impact on the WCCN emergent behavior. There is no separate operating system for the WCCN however, as its behavior "emerges" from the collective behavior of the WCCs.

The WCC operating system is then defined by analogy with cellular processing per Table 3.1.2-1 and with a discussion of organelles and statistical distribution of objects. By direct observation of Table 3.1.2-1 and evaluation of cellular life support functions in Becker (2000), the salient features of a WCC operating system compiled below in Table 3.5-1. Each concept is briefly discussed or illustrated.

Program execution in a WCC is similar, but potentially less complicated that transcription and translation in cells. A region in the WCC is required for program storage, which is called the nucleus for its analogy with real cells. The program storage consists of lists of possible instructions along with an "enzyme" or activating string for each. An operating system instruction must reside in the nucleus region that activates an instruction upon the presence of its enzyme by moving a "copy" of the rule associated with it outside the nucleus. Such an operating system instruction looks like this:

$$I_{os}[O=\{(\text{instruction-i, enzyme-i})\} \rightarrow P=\{(\text{instruction-i}|\text{instruction-i})\}].$$

What this says is that whenever enzyme-I appears in the nucleus, put a copy of instruction-i in the main WCC region and eliminate enzyme-i.

TABLE 3.5-1

Components of WCC's Operating System

| Operating System Function | Living Cell Implementation |
|---|---|
| Program Execution | Need region for storage area for programs (lists of available instructions and the enzymes that activate them). An activation instruction is needed as part of the OS that starts instructions when enzymes are there. |
| Cache Memory | A copy of each currently active instruction is maintained in the program storage region (nucleus). This is a desirable feature, but not required for a given WCC design. |
| File System Support | Files do not exist. Information is distributed and represented by expression levels of tokens, string and trees. There is no need for central support as it is handled intrinsically by the architecture. |
| Code Optimization | Mapping of instructions into variants based upon specific activating operands is a desirable feature of a WCC operating system, but not absolutely required. |
| Program Execution Policies | Signaling instructions to guide strings to their region of destination, tagging for deletion by ligation of a symbol, and doing these functions statistically is included. |
| I/O Control | Need operating system instructions to control endocytosis and exocytosis by forming temporary regions. |
| Memory Management | Expression levels of strings store information. Regulatory processes controlling instructions manage this. The built in enzyme control of instruction activation is part of the operating system. |
| Virtual Memory | Memory is not fixed. A WCC can continue to express many instructions and strings and is limited only by its total token material obtained through I/O operations and instruction execution. |

TABLE 3.5-1-continued

Components of WCC's Operating System

| Operating System Function | Living Cell Implementation |
|---|---|
| Scheduling of Resources | There is no clock in a WCC. Program execution is parallel and distributed and operand driven. Strings such as enzymes schedule resources by their presence and hence the instructions that produce them and their activating enzymes are responsible for scheduling resources. |

A cache memory of currently active instructions is analogous to mRNA in cells. Based on the definition of a WCC, there is no absolute requirement for this as an operating system function. However, in many potential system designs for WCCs, it may be desirable as a means of tracking activity. This could be accomplished by modifying the instruction above so as not to destroy the activating enzyme, but instead ligate it with a tag and save it. Then, <enzyme-I-tagged> becomes a measure of expression of instruction i. A means would be needed to extinguish the tagged enzymes after a period of time, such as a half life implemented by means of an appropriate supply of digestion instructions in the nucleus region.

As mentioned in the chart, there is no need for file management in a WCC or WCCN. Information is distributed, no history is maintained, and the expression of all WCCs in a WCCN at an instant in time is a snapshot of the entire current memory of the WCCN. The instruction set and WCC set is a form of permanent memory 9 at least for the current generation of WCCs). The expression levels are short term memory and the implied regulatory networks based upon the active instructions and enzyme networks for activating other instructions (in other words the computer programs) are long term memory. Expression levels of strings store information. Regulatory processes controlling instructions manage this. The built in enzyme control of instruction activation is part of the operating system.

A mechanism for code optimization is not required by the posed definition of a WCC. However, cells have one—mRNA splicing and splice variation. To the extent that a WCC maintains a set of operating system instructions for alternative instruction compilation, it would exhibit similar functionality. This could be implemented through enzyme strings that control digestion instructions that splice out portions of other instructions. Because instructions are not strings, but instead relationships between strings, such instructions could only reside in the nucleus region and be controlled by the operating system. For the purposes of this research, such sophisticated operating system instructions shall be considered desirable, but optional, for a WCC implementation.

Program execution requires several operating system support functions. One is that instructions must be delivered to the proper region (or node within the WCC). Another is that sometimes strings must be tagged for digestion to systematically eliminate them (corresponding to ubiquilation in cells). Finally, all strings and instructions must follow a Brownian motion (random walk) within their respective regions. The latter is a hardware (or shall we say wetware) function. The first two can be implemented by ligating tags to instructions and/or strings and having the existence in the operating system throughout the WCC of instructions to digest tagged strings and to tag them in the first place. The delivery of an instruction to an appropriate region in the first place should be encoded within the instruction string to begin with so that chaperone instructions will move them to the proper region when they randomly contact them. The result of all this machinery is the underlying mechanism of statistical dataflow computing. It is built into real cells, it can be easily simulated on a digital machine, but for all other WCC implementations, it must be crafted into the engineering of WCC design. For example, let us suppose that instruction I Kx is the Kth instruction bound for region X. An operating system instruction to move it to region X is represented by:

$$I_{KX} = [O = \{(I_{KX})\} \rightarrow P = \{(\|_X I_K)\}; E = \{\text{transportX-enzyme}\})].$$

The double vertical bar indicates that it must cross two membranes (nuclear, region X). the X subscript is moved from the instruction to the region to indicate the move.

I/O instructions require operating system support. The biological process of diffusion can be permitted by a WCC only if an inherent instruction designed to enable the passage of a specific string is built into the WCC design baseline. Similarly, I/O instructions that mimic endocytosis and exocytosis require temporary regions that fuse with other regions to transport groups. The underlying mechanism to accomplish this should be supplied by the operating system. A plausible mechanism for doing this is to form a temporary region V and have instructions move strings to V and have an operating system instruction move V to the WCC membrane (essentially it moves all contents of V to the extra-WCC zone, or outside the WCC membrane for other WCCs to ingest).

In addition to the items mentioned in Table 3.5-1, other housekeeping functions of real cells can be used as inspiration for the design of WCC operating system functions. For example, in real cells, apoptosis means programmed cell death, or a biochemical pathway whereby cells destroy themselves when things go awry. A similar pathway may be needed in WCCs to eliminate WCCs that have failed as a means of error control. Such a pathway is considered part of the WCC operating system. An example trigger for such a pathway may be the presence of a specific concentration level of a "toxic" string, <toxic-string>.

Another biological concept that may prove of value is the notion of molecular chaperones. In real cells, molecular chaperones are used to escort molecules to their proper organelles. In WCCs, they may be thought of as internal I/O instructions of the operating system that move activated instructions from one region to another based on their encoded destination. A difference between such operating system chaperone instructions and normal program instructions is that they operate on instructions rather than strings and thus are the exclusive property of the operating system.

Cells have clearly understood functional organizations. Regions in cells are called organelles and each has a well known function. For example, the nucleus stores and processes the DNA and genes, the mitochondria produce energy from glucose and oxygen, lysosomes digest complex molecules, etc. A well designed WCC will have regions with specific functions. The need for a "nucleus" to store the computer program has already been discussed. An analog to the mitochondria is needed by any WCC that uses a concept similar to ATP or energy as an operand. It would act as the power supply, taking in external strings and converting them to energy tokens. Similarly, regions that digest used strings (analogous to the lysosome) may be needed to keep the population of strings and token management under control.

Each of these may be hard-wired, or else produced by WCC synthetic pathways, depending on the complexity of the WCC implementation. A cell clearly grows by systematic expression of its own genes. A WCC may do this or it may be directly encoded by design.

Lastly, the location of a WCC within a WCCN must be a WCC operating system function. In many systems, this may be merely random Brownian motion and in others this may be fixed coordinates as in CA systems. But using biology as a model suggests that the most general systems must provide for partial, but constrained WCC mobility. The grounding of each WCC in the network may happen naturally, but it will be considered a WCCN design feature. The motion from its tethered position shall be random or under operating system control as the designer chooses.

3.6 WCC Computational Illustrations

In this section, several computational examples of solving problems using WCCs are illustrated. It is shown through examples that WCCs are well suited to solving problems of pattern recognition, simulation and control, but less suited to solving traditional problems of mathematics and logic. This section begins to answer the question "What classes of problems are best solved with WCCs?", which is sub-question 9 from Section 1.3.2. It does so by providing computational examples from different problems classes. This section also answers the question: "Show 2 examples of computing problems and how it is solved using WCCs (lymphocyte response simulation in the immune system, and intelligent character recognition)". It does so by giving several examples of small computing problems and then applying the concepts learned in the smaller problems to fill in some of the details of the immune system simulation problem.

3.6.1 Traditional Computation

WCCs compute by means of statistical aggregation. This means that answers are approximate and not exact, but perhaps robust. Traditional computing problems like addition and spell checking that require exact answers can be accomplished with WCCNs, but this comes with greater cost than doing so on a traditional von Neumann machine.

For example, consider the problem of addition. One way to implement addition in a WCCN is to build a WCCN of a large number of identical WCCs, each of which contain an instruction that combines a string operand with an energy token to produce a product that is exported. One can add two numbers by injecting a large quantity of the operand into the WCCN proportional to each number and measuring the quantity of the resulting exported product. Another way of doing addition with a single WCC is to construct a pathway of logic gate instructions that implements the addition circuit from a traditional digital circuits book. Addition is accomplished by injecting operands in quantities proportional to the numbers being added and measuring the concentration of some resulting product at the end of the pathway.

Both of these approaches are very clumsy. A WCC designer must establish first, exact circuits. Second, the problem must be set up almost as if it a laboratory experiment, measuring quantities of operands and products. Third, the results will approximate, but not be exactly equal to the answer. It can be argued that these kinds of computations are best left to the well established traditional computing architectures for these reasons.

A discussion of sorting was previously given. A couple of additional comments are warranted. Sorting is an exact computation, but when implemented in WCCs, there is a small probability of error due to the random "motion" of strings leading to expression levels that only approximate true value. For this reason, it appears that WCCNs solve the sorting problem more like a pattern recognition problem than like an exact string matching problem. This points toward evidence again that pattern recognition is a good problem for WCCNs, while exact string matching may be better left to traditional von Neumann machines, when given a choice.

Spell checking could be implemented with massive numbers of WCCs in a WCCN as follows. Each WCC corresponds to a correct spelling of some word $w_i$. There are many copies of each $w_i$. A new word is placed in a WCC of a test type with an I/O instruction. The test WCC wanders through the WCCN randomly (via operating system help). It maintains a pointer to the location of $w_i$ with a special string type. An instruction is set up to calculate distance from a neighbor WCC by using the sorting algorithm discussed in Section 3.3 for only two WCCs. Whenever the distance is below an arbitrarily small threshold, a correct spelling is declared and the test word is expelled from the WCC with an I/O instruction to move it. On the other hand, if the distance is larger than the threshold, the sorting is extended to multiple WCCs and after a period of time, the closest neighboring WCC containing a correctly spelled word is considered the best candidate. With additional work, the details of every instruction could be spelled out here. However, because of the involvement of sorting and exact string matching being approximated statistically, the conclusion is that while spell checking can in principal be done with a WCCN, is rather clumsy and inefficient for the same reasons that the other problems above were. It can be concluded then, that spell checking too cam be better implemented on traditional computers.

3.6.2 Pattern Recognition and Character Recognition

Pattern recognition is a class of problems that traditional von Neumann architectures do poorly and neural network architectures do well. It can be argued that WCCNs should be able to do pattern recognition very well, and at least as well as neural networks. The reason for this is that neural networks can easily be implemented in a WCCN as a WCCN is much more powerful generalization of neural networks. Why is this the case? Each node in a neural network could be implemented by the much more powerful WCC mechanism which in turn could be "programmed" through suitable pathways to implement a neural network node integration. The network connections could be formed using directed I/O instructions.

For example, a neural network node received inputs from multiple other nodes and integrates the results into a single value that represents a signal level as previously shown in FIG. 2.3-1. This can be tracked by appending a token to a string corresponding to the level of stimulation, and then systematically digesting the tokens off the string as a function of time to diminish the signal. For example, consider the token C (for carrier) and the token S (for signal). An integrating instruction can be represented as:

$$(S_1 S_2 \ldots S_N C, S_1 S_2 \ldots S_M C) \rightarrow (S_1 S_2 \ldots S_{N+M} C, C)$$

which yields a larger signal string $S_1 S_2 \ldots S_{N+M} C$ that might possibly be exported to the next node. At the same time, a digestion instruction insures that these strings do not last long and exists in concentration as:

$$(S_1 S_2 \ldots S_N C) \rightarrow (S_1 S_2 \ldots S_{N-1} C, S)$$

The export of strings to the next node takes place using an I/O instruction of the form:

$$(S_1 S_2 \ldots S_N C\|) \to (\|S_1 S_2 \ldots S_N C)$$

This moves strings, short and long, to the next node which can then measure signaling strength by the value of $<S_1 S_2 \ldots S_N C>$ for different N.

Clearly, a WCC is a much more general machine that these neural network functional instructions, and therefore it can be argues that the computational power is much greater. This almost certainly means that pattern recognition with WCCNs can be made to be much superior than neural networks through future studies. In the very least, the performance of a neural network can be matched by the above implementation. This claim of superiority over neural networks is one of the significant claims of this research.

Another mechanism for pattern recognition with WCCNs can be illustrated by considering the problem of the recognition of characters (A, a, B, b, . . . 0,1,2, . . . ). It is motivated by the binary image processing techniques presented by Horn (1986) which aggregate dark spots and count features of the resulting shape. FIG. 3.6.2-1 shows a simplified version of such an image.

A tree can be used to represent the image as follows:

{(0 0 0 0 0 0 0), (0 0 0 0 0 0 0), (0 0 0 0 0 0 0), (0 0 0 0 0 0 0), (0 1 0 0 0 0 0), (0 1 0 0 0 0 0), (0 1 0 0 0 0 0), (0 1 1 1 1 1 0), . . . etc. . . . }

Many copies of this tree may be passed to a WCCN for evaluation. They way it works is to aggregate WCCs into three layers. The first layer is the "reader layer" which is fed a binary string representing black and white for 0 and 1, each of which is an image pixel making up a part of the character. The second layer is a "processor layer" that counts the instances of neighboring WCCs that match the string values contained for each WCC by keeping an expression level of strings of various lengths. It can "ligate" strings of various lengths in a given neighboring direction. The third layer is a "processor layer" which operates on ligated strings and counts directional changes by expression levels. For example, the A and B characters will result in dramatically different expression levels and hence that serves to identify the character. This is discussed in mechanistic detail below. The different approach serves to show that many approaches can be evaluated for the best fit for a pattern recognition problem due to the high flexibility of the WCCN architectural concept.

The pathways that are used to process each character implement standard binary image processing algorithms (Horn, 1986) such as run length encoding (which calculates the length of a binary run of 1s), pixel counting (i.e., how may 1's are there), location of the centroid (as determined by thinning, resulting in a remaining remnant), etc. Horn (1986) provides many such algorithms and only experimentation (or genetic programming) can determine the best fit. The resulting "features" are ligated into a string whose concentration is evaluated by the sorting algorithm described above and discussed in context below.

This leads one to conclude that there is great promise for the field of pattern recognition for WCCNs, potentially beyond the known techniques for pattern recognition with traditional machines or neural networks. A pattern recognition algorithm is for character recognition is presented below to substantiate this claim. A deeper study of the many possible pattern recognition techniques possible with WCCNs is beyond the scope of the current work.

For the purposes of this work, a WCC and WCCN is designed to recognize a single character. The issues involved in the engineering of complete word recognition and scanning are not addressed. In the previous section, it was shown that there are many potential implementations of a pattern recognition problem with a WCCN. No comprehensive study has yet been undertaken to determine the best method.

At the same time, the initial design is a point in time and a case study. It is limited in scope in that it is not intended to be a state of the art OCR system, nor is it indented to use large databases comprehensive of the real world or measure absolute performance. Nonetheless, the first goal has been achieved, that of validating the concept of a WCC.

The total design of the WCCN is as follows. The WCCN shall consist of a number of different types of WCC, one for each character to be recognized and one to mediate the results. The design is built around the concept that the WCCN is partitioned into N groups of WCCs where each group has one of each character. The digits WCCs undergo a set of pathways that accumulate an expression level of a counting string (see description below). The sorting algorithm previously presented is then applied to the ten WCCs and the one that lays to the right of the other nine is the decision. The mediator WCC "counts" the number of the N groups that vote for each character in order to make a final decision using pathways that accumulate a score for each character by a ligation instruction.

3.6.3 Simulation of Complex Systems

Section 3.4 showed the link between WCCNs and ABMs. It has been widely accepted by the complex systems community that ABMs represent a general model or architecture for most complex systems (Bar Yam, 1993). However, since WCCNs are intended to represent a physical realization (even though the current work focuses only on an abstract description of such a physical realization), then any ABM that is modeled by a WCCN can be considered a complex system simulation. Features of WCCNs that further support this notion are the fact that computation is statistical, based on Brownian motion of strings, and behaves like the second law of thermodynamics, as previously discussed. This line of argument leads one to conclude that WCCNs are superb structures for doing complex simulation. To substantiate this claim, the remainder of this sub-section describes in greater detail the previous example of a simulation of the immune system using a WCCN.

The groundwork has been laid to describe an immune system simulation with a WCCN. The immune system consists of numerous objects (B cell, macrophage, etc.) and the immune system response can be described by the relationship among these objects. For example, a B cell releases antibodies, which in turn activate the complement system. Signal transduction pathways can describe the events that occur within an object. For example, cytokines activate the JAK/STAT pathway that transcribes gene releasing cytokine response chemicals.

A WCCN is ideally suited to simulating the immune system as follows. A different type of WCC is defined for each object. So, for example, there will be a B cell WCC, a helper T cell WCC, a macrophage WCC and a natural killer WCC, among others. Small molecules such as cytokines and antigen fragments are treated as strings that emerge from WCC instruction sets and sometimes are exported using I/O instructions. Invading bacteria are treated as a WCC type. Invading viruses are treated as strings that are ingested by I/O operations. Essentially, all cell types are modeled as WCC types and all significant molecules are modeled as strings. The pathways that correspond to cellular response such as interleukin 4 or cytokine response (JAK/STAT) are modeled as instruction sets within the appropriate WCCs.

To describe how these objects (WCCs, strings) interact with each other, consider the functioning of the adaptive immune system. B cells produce antibodies that circulate in the blood and lymph streams and attach to foreign antigens to mark them for destruction by other immune cells (Abbas, 2002). Certain T cells, which also patrol the blood and lymph for foreign invaders, can do more than mark the antigens; they attack and destroy diseased cells they recognize as foreign (Abbas, 2002). T lymphocytes are responsible for cell-mediated immunity (or cellular immunity). T cells also orchestrate, regulate and coordinate the overall immune response. Therefore, the design of the T cell WCC must be particularly sharp. T cells depend on unique cell surface molecules called the major histocompatibility complex (MHC) to help them recognize antigen fragments (Abbas, 2002). These fragments must be modeled as strings produced by instruction sets.

The WCCN is then the collection of all the WCCs, including the number of copies of each kind of WCC, and the rules for their interconnection or I/O relationship. To simulate the immune system, the network must be setup to mimic all the rules of the immune system, such as the detailed descriptions among the 550 pages of Abbas (2002), which is beyond the scope of the current research. In addition, it is necessary to identify the proper concentration level of each object. A simulation proceeds then by introducing a certain concentration of an invader and allowing the response to progress and monitoring certain string and object concentrations as a function of time.

In practice, this must be done on a much smaller scale than an emulation of the entire human immune system, as there are trillions of cells in the real system (unless, of course, if the WCCs are implemented with colonies of real cells). To do that, each object must represent many copies of the same object in order to achieve scale. The selection of such a scale is an engineering design choice and is dependent upon the specific context. Such a simulation can quantify what most works on the immune system only describe qualitatively. Quantitative data is available sporadically throughout the literature and could be used in simulation design. Thus it has a significant medical research benefit and is a natural project for follow up research to this current effort.

The major advantages of using a WCCN for immune system simulation are several. Traditional machines require extensive resources to do object oriented simulations of even a small number of objects. The number of objects required for an immune system simulation is in the tens of millions even if a $10^6$ to 1 scale ratio is used for object representation of real cells. Such a scale may require a parallel solution. A WCCN is a natural fit to this problem 9and any complex system simulation) because it is biologically motivated. In addition to matters of scale, the natural distribution of computation is also a major advantage of a WCCN. There is an isomorphic map between a WCCN and the immune system, making it natural to represent a cellular communication event in the proper context.

To optimize a simulation of the immune system, or of any complex simulation, will require the employment of the genetic algorithm programming techniques discussed in Section 3.7.

3.6.4 Control Tasks

Control is about changing the output of a dynamic system. Simulation is about predicting the output of a dynamic system. Generally, systems that are good at simulation are also good at control, because simulation can be used to design a control to achieve a certain outcome. Consequently, it can be concluded that control tasks are well suited to WCCNs, particularly given that WCCNs are intended to be physical entities.

Control in a WCCN is more complex than simulation because an additional level of redundancy is required. To achieve control, one needs to know the outcome of many different possible inputs and that implies running a simulation many times or else in many different configurations simultaneously. Fortunately, WCCNs are designed and modeled after massive parallelism.

Examples of control tasks that could be performed with a WCCN implemented in physical form with either real cells or alternative technologies include such tasks as:

Acquire an external substance and devour it (toxic waste cleanup, microsurgery)

Deliver a substance to a specified location (drug delivery)

Actuator signals (robotic control ins response to perception)

3.7 Programming the WCC

The section defines how a WCC may be programmed using genetic algorithms. It answers the question "How are WCCs programmed using genetic programming techniques?", which is sub-question 6 from Section 1.3.2. This question is addressed by mapping the genetic programming techniques from Chapter 2 onto the parameter space of a WCC.

As implied above, a cell programs itself through genetic recombination and natural selection. Like a cell, a WCC has a highly nonlinear space that cannot be fully pre-stated. To program a WCC is very similar to solving a complex nonlinear optimization problem in a multi-dimensional space. To allow for the maximum flexibility in hardware implementations, the programming of a WCC may proceed in one of several ways:

1) Like a cell, it may be programmed by a form of genetic recombination and selection, or
2) It may be programmed in software using genetic programming techniques, or
3) Its program may be "transfected", that is a program may be manually inserted into the WCC and allowed to continue programming by the methods above.

Regardless of the origin of the program, its behavior is genetic in nature, meaning that certain parameters are modified as promising solutions are combined.

First, some examples of parameters for WCCs are described. The instruction is the basic unit of the WCC program. Parameters of an instruction include the operands, products and enzymes. Changing the strings that make up one or more products or enzymes and/or products in such a way that the instruction remains well formed may parametrically modify instructions. By a well formed instruction, it is meant that tokens making up strings are neither created nor destroyed by execution of the instruction. Changing the regions to which products are delivered, but this is a more drastic modification may modify I/O instructions. For use of genetic programming to alter a WCC program, the present work restricts the parametric changes to changing the strings that make up the products, enzymes and operands in a well formed way.

There are two levels of programming that must be accounted for. These are the programming of an individual WCC through genetic recombination, and the programming of the WCCN. Both must be accomplished by using genetic recombination to select parameters for individual WCCs. The latter may require that not all WCCs are programmed the same, and therefore some degree of genetic recombination akin to developmental biology and its associated genetics may be required. While this may sound extremely complex, and it can be, the approach taken here is a simple first order implementation plan of each.

In section 3.2.4, a WCC was defined as a 6-tuple set $\{N, I, O, S_t, M_W, M_N\}$. Of these, the set I is most amenable to parametric modification, although the mapping set, $M_W$ could be as well. For WCCNs, the mapping set $M_N$ could be treated parametrically as well as the number of each type of WCC in the network. Genetic programming can be used to modify either of these sets parametrically.

It is also important to stress those WCCs and WCCNs may be implemented manually rather than through genetic programming. This is an engineering decision. It may be easy or convenient to set up an initial solution. But due to the high complexity of WCCs and WCCNs, it is unlikely that a manually derived solution will be optimal in any sense. Further, it is difficult to imagine that traditional analytical techniques can be used to derive an optimal design in a problem space with such high state dimensionality as a WCCN by other than an empirical optimization method like genetic programming.

A general methodology for genetic programming was presented in Section 2.3 and in FIG. 2.3-2. This methodology is directly applicable to the programming of both WCCs and WCCNs in a straightforward application of the genetic programming algorithm in its original form. Table 3.7-1 below shows how by relating the actions required of the flow chart in FIG. 2.3-1 to the specific application to WCCs and WCCNs. The table entries are explained in the text that follows.

Programming a WCC or WCCN requires beginning with a random population of WCCs or WCCNs that appear to solve the problem. Each of the members of the population will be tested against a fitness function as the genetic programming algorithm of FIG. 2.3-2 is executed. The fitness function must be chosen as a desirable outcome and a distance metric to it in terms of the state vector of WCC or WCCN. Only the relevant output parameters are used in this assessment.

Random variations are made to the variable parameters in either the WCC or the WCCN, as the case may be. These random variations for a WCC include changing operands, enzymes or products in instructions, or changing the membrane into which a particular instruction or pathway is assigned. While the algorithm specifies that these variations are to be random, intuition suggests that there is room here for making intelligent choices to accelerate the programming. This can only be tested empirically. For the WCCN, the parametric variations apply to the interconnection map between WCCs, the I/O strings that are exchanged and/or the population size of the WCCs of each type involved. This is obviously a large and nonlinear search space and can only be solved empirically such as with the proposed genetic programming technique. Mutation, reproduction and crossover are simply redefinitions of the WCC or WCCN based on the shuffling of parameters so as to provide new populations for testing on the next iteration of the algorithm.

TABLE 3.7-1

Genetic Programming of WCCs and WCCNs.

| Genetic Programming Action from FIG. 2.3-2 | Application to WCCs | Application to WCCNs |
|---|---|---|
| Initial Random Population | Initial Instruction Set and Membrane Mapping for N variations | Initial Interconnection Map and Population Size and Membrane Mapping for N variations |
| Termination Condition | Fitness Function of Best Run Exceeds Preset Threshold | Fitness Function of Best Run Exceeds Preset Threshold |
| Fitness Function | A distance metric is applied to relevant subset of the state vector | A distance metric is applied to relevant subset of the network state vector |
| Mutation | Randomly vary an instruction parameter or membrane boundary | Randomly vary a map interconnection parameter or WCC population size |
| Crossover | Combine half the instructions and membrane boundaries from one WCC with another | Combine half the interconnections and WCC population parameters from one WCC with another |
| Reproduction | Define a new WCC by combining the crossover information above | Define a new WCCN by combining the crossover information above |

3.8 Hardware Implementations

This research is limited to exploring the architectural issues devoid of specific hardware implementation. However, sufficient progress has been made to determine candidate hardware implementations. The specific engineering details of the implementation of each of these will be left to future work. What follows is an array of various potential WCC hardware implementations.

The specific question answered by this section is sub-question 10 from Section 1.3.2, "What are some potential physical/hardware implementations for WCCs?". Surveying a range of possible technologies through the literature and then describing how each can potentially satisfy the requirements for a WCC implementation answer this question.

Bacterial cells make an obvious first choice, As stated within, real cells are WCCs and hence a bacterial cell is a WCC based on the formal definition of a WCC. E. coli, for example, has most of its metabolic functions cataloged in the KEGG database (KEGG, 2002). Controlling its biochemical environment could internally program it. Knight (Garfinkle, 2000) at MIT has been studying this area, but his work focuses on implementing logic gates with multiple cells rather than through biochemical reactions within the cell.

Another possibility is the application of genetically engineered cells as WCC units. Such cells can be constructed by inserting genes using genetic engineering techniques (transgenic modification) or via standard knock out techniques in molecular biology (Becker, 2000). A transgenic cell is a specific cell with genes imported into it from another organism (3ecker, 2000). A knockout is a cell with genes removed. Adding and deleting genes may form a genetically engineered cell. The science of genetic engineering is young and vast and beyond the scope of this research other than to mention that it is a promising and viable approach for manufacturing WCCs. As the field of bioinformatics matures, it may eventually become possible to design a WCC that can then be built to spec via genetic engineering techniques.

Future possibilities exist for the manufacture of artificial cells. For example, the E-Cell project (Tomita, 1999) has conducted research to determine the minimum number of genes to sustain life. More realistic near term implementations are likely to be with complex hydrocarbons or complex chemicals using chemical engineering techniques. Small multicellular organisms, such as worms, could be viewed as WCCNs and studies could be done using them as laboratory tools.

In addition to cellular and biochemical implementations, WCCs could be implemented in custom silicon chips or in silicon chips interfacing with tethered cells. This is the subject of active research (Biosensors, 2002). Other possibilities include the creative use of microarrays or protein arrays, and software emulation on supercomputers.

The applications for WCCs and WCCNs will be numerous. Examples include, but are not limited to tissue engineering, MEMs, chemical reaction chambers, interfacing with microfluidics, microsurgery, and simulation of complex systems. The use of WCCs and WCCNs has application in nanotechnology as well, as it could turn out to be a key engine or tool in that field, depending on the implementation.

CHAPTER 4

Performance

The definition of the Whole Cell Computer (WCC), its operating environment, the Whole Cell Computer Network (WCCN), and its method of genetic programming were evolved in Chapter 3 by analogy to biological cells and complex systems theory. These definitions were illustrated by various examples and discussions.

The purpose of Chapter 4 is to analyze what can be computed by WCCs operating in WCCNs and to summarize the research accomplished. The results provided here show that WCCs /WCCNs as a computing architecture to be powerful and promising. Not only are the theoretical computing limits of these architectures pushing the leading edge of computing as it is known today, but several promising classes of computing problems highly suited to WCCs/ WCCNs have been identified.

The research and findings in Chapter 4 were established to answer and further answer the following two sub-questions originally posed in Chapter 1:

13. How well do WCCs perform in terms of time to solution, computing resources required, time to program, ability to solve a problem (computability), etc.?
14. What classes of problems are best solved with WCCs and networks of WCCs? Provide an assessment of their computability.

Chapter 4 is organized along three themes. These are:

To determine the computing power of WCCs/WCCNs relative to the Universal Turing Machine To assess the computational and programming complexity of WCCs/WCCNs for various classes of problems To draw conclusions and findings regarding the computational capability and limitations of WCCs/WCCNs.

The method of research used in this chapter is to provide analysis of the overall performance capability of WCCs using techniques often used in computational complexity theory and analysis. In addition, a review of the 10 sub-questions posed in Chapter 1 is provided.

4.1 Hypercomputing Potential of WCCs

The Turing machine was described in section 2.2 and illustrated in FIG. 2.2-2 as an abstract representation of a computing machine (Kampis, 1994). As stated previously, Turing machines are of theoretical interest because algorithms that can be computed on other architectures can be mapped into Turing machines. The well known thesis called the Church-Turing thesis that states that every "reasonable" computation or a Turing machine can carry out algorithm. Again, as stated in Chapter 2, this is accepted to be true by many, but is often challenged by researchers in artificial intelligence or biological computing when investigating novel architectures.

4.1.1 The Relevance of the Church-Turing Hypothesis

This Church-Turing hypothesis implies that there is no need to create new computers to solve each type of problem—if a problem would yield to a "reasonable" solution, a Turing Machine could solve it. According to the Church-Turing hypotheses, all modern digital computers are essentially Turing Machine equivalents. This way of thinking, however, ignores computational efficiency and economy. The word "reasonable" is extremely important.

A "reasonable" algorithm is generally considered to be on in which programs have a finite number of instructions from a finite set of possible instructions and which comes to a halt for valid input data, that is when a solution has been found.

The Church-Turing hypothesis says nothing about which procedures are considered to be "reasonable". Godel's theorem from mathematics proves that not every truth can be mechanically generated. Hence, there are problem classes that are not "reasonable". WCCs/WCCNs are a class of computer that brings economy and efficiency to certain problem classes that otherwise cannot achieve such efficiency on traditional computer architectures. Further, it shall be shown that some problems, which are not "reasonable", can be solved on a WCC/WCCN and that WCCs/WCCNs can surpass the Turing Machine performance potential.

4.1.2 Cellular Automata and WCCNs

Before addressing the ability of a WCCN to exceed Turing Machine capability, a specific class of algorithm, the Cellular Automata (CA) is addressed with respect to WCCNs. The purpose of addressing this area is to illustrate the computational power of WCCNs.

A CA is a general class of model for a dynamic system that is both simple, yet it captures a rich variety of complex behavior. Bar-Yam (1993) and Wolfrom (2002) discuss CA at length for modeling complex systems and capturing emergent behavior. A CA is a computing or algorithm model that consists of cells, which are locally connected together. Each cell computes on data using simple rules and passes the output to its neighbors.

An example of a 2D CA is shown below in FIG. 4.1.2-1. It shows several cells that operate on data and pass its output in two directions to neighboring cells for further computation. Such a network can be used to solve linear equations or matrix problems by putting appropriate arithmetic operations in each box.

Wolfrom (2002) studies CA extensively using simple computer programs, which generate graphical output. As a result, he was able to develop systems that produced very complex, yet elegant output. It is easy to see that CA is a specialization of ABM and therefore a WCCN can be designed to implement any CA. Letting each of the cells be a WCC does this and the interconnection network of the CA is the defined WCCN. The passage of data between cells is handled by I/O instructions.

As such, a WCCN is a generalization of a CA and all CAs can be implemented in WCCNs. This is a powerful property of a WCCN because it shows that all complex systems that can be modeled by CA can also be implemented on a WCCN. Bar-Yam (1993) shows that dynamical systems that can be implemented with differential equations can also be implemented via a CA. Bar-Yam (1993) illustrates that CA can be used to implement complex systems and Wolfrom (2002) provides extensive examples. This means that WCCNs can implement a very broad class of complex problems. The theoretical limits and computing capability of WCCNs/WCCs is the subject of the remainder of this chapter.

4.1.3 The Hypercomputing Claim of WCCs/WCCNs

As described in 4.1.1, it has long been assumed that the Turing Machine computes all "reasonable" computable functions. There have recently emerged a variety of papers claiming new computing models that have more than Turing Machine power. While such views are in the minority, it would be a mistake to dismiss them. Ord (2002) summarizes the work, including work with strong claims and support, such as Copeland (1998, 1999) and his coupled Turing Machines, Leeuw (1956) and probabilistic Turing Machines, and Spaan (1989) and her work on nondeterministic Turing Machines. Ord (2002) shows that each of these machine concepts has hypercomputing power, or beyond Turing Machine power. A few cases are considered in Section 4.1.

Models of computation that compute more than Turing Machines are called hypercomputers or hypercomputing models (Ord, 2002). To show that a model of computation exhibits hypercomputing, one must show that it cannot be simulated on a Turing Machine, yet the new model of computation can simulate it.

Turing (1939) proposed an "O Machine" which is a Turing Machine with an "Oracle". The way it works is that it is a Turing machine with an Oracle capable of answering questions about membership of a specific set of natural numbers (Ord, 2002). The O-Machine is equipped with three states: the call state, the 0-state and the 1-state. It also has a special symbol marker $\mu$. "To use the oracle, the machine must first write $\mu$ on two squares of the tape and then enter the call state. This sends a query to the oracle and the machine ends up in the 1-state if the number of tape squares between the $\mu$ symbols is an element of the oracle set and ends up in the 0-state otherwise" (Ord, 2002). Turing (1936) showed there exists a function called the halting function that cannot be computed by a Turing Machine. The halting function takes a natural number representing a Turing Machine and its input and returns a if the machine halts on its input and 0 if it does not. A Turing Machine cannot compute this because the machine has halted in the halting case (Ord, 2002). This is a paradox. The O-Machine with the halting set as its oracle can compute the halting function and thus exhibits hypercomputing. There are numerous other such examples discussed throughout the literature (Ord, 2002).

In Section 4.1, WCCs/WCCNs are explored to determine if they have Turing machine power, and more specifically, if they exceed Turing machine power. By drawing on the work of Ord (2002), it is easily shown that WCCs/WCCNs exhibit "hypercomputing" potential, that is, they are more powerful than a Universal Turing Machine! This is a stunning result and clearly the most significant result of this research project. Ironically, the result is obtained by inspection based upon the definitions in Chapter 3 and the summarized work on hypercomputing by Ord (2002), Turing (1939), and Copeland (1999). These claims are justified in the remainder of Section 4.1.

4.1.3 Some Hypercomputing Models

Ord (2002) reports on a number of hypercomputing machines and examples. The present work shows that WCCs/WCCNs satisfy the definition of a number of the hypercomputing models summarized by Ord (2002) and others. Some of these concepts are purely theoretical and cannot be applied to WCCs/WCCNs. One such example, is that Ord (2002) claims that a Turing machine with an infinite number of initial inscriptions, or symbols already written on the tape, exceeds Turing Machine power. Clearly, a WCCN cannot contain an infinite number of infinite transcriptions. Other examples are provided such as nondeterministic Turing Machines, probabilistic Turing machines and Couple Turing Machines (Ord, 2002). Some of them are directly applicable. The relevant ones are taken one at a time in this section.

Copeland (1999) introduces the "coupled Turing Machine". This is a Turing Machine where one or more input channels provide input to the machine during the progress of computation (Ord, 2002). For example, one Turing Machine may input to another while it is in progress. A coupled Turing Machines differs from O-Machines and Turing Machines with initial inscriptions, in that they are finite (Ord, 2002), and therefore practical. Copeland (1999) showed that a coupled Turing machine could compute the halting function and all other recursively enumerable functions. Turing (1939) showed that some recursively enumerable functions required an O-Machine and could not be simulated by a Turing Machine if a halting function is required. Hence, the Coupled Turing Machine is a hypercomputing model.

It is easy to see that a WCCN is a Coupled Turing Machine. Each WCC may be viewed as a single Turing Machine and since by definition, the WCCs in a WCCN communication with each other via I/O instructions, the WCCN itself is a Couple Turing Machine. Hence the WCCN exhibits hypercomputing potential (depending on the selected instruction set, of course). This is a strong fundamental claim. A WCCN is a finite machine by definition. Many, if not most, hypercomputing models proposed to date have been infinite machines not practically realizable. Further, the claim that a WCCN is a hypercomputer implies that all living organisms are potentially hypercomputers (depending on the instruction set which is not completely known for any living organism), because a living organism is a hypercomputer and has potentially greater than Turing Machine power.

Copeland (1999) also generalizes Coupled Turing Machines to asynchronous networks of Turing Machines and shows that these also can solve the halting function and therefore are also hypercomputers. A WCCN is an asynchronous network of WCCs and a WCC can be configured to be a Turing Machine. Hence, this provides further evidence based on the work of another (Copeland, 1999) that WCCNs are hypercomputers.

Ord (1999) introduced the infinite state Turing Machine. This is a machine where the set of states is allowed to be infinite. Ord (2002) shows constructively that this leads to a hypercomputer as well, as it can compute the halting function and all recursively enumerable functions. Kaufmann (2000) argues that biological systems have states that cannot be finitely enumerated. The states of biological systems can be mapped directly to the states of WCCs and WCCNs as defined in Chapter 3 if the WCCs are defined to match the biochemistry of the biological system. Hence, there is at least one example and a general capability that WCCNs may be infinite state Turing Machines following Ord (2002). Hence, using a different computing structure, it has been demonstrated that WCCNs can exhibit hypercomputing potential, further supporting the previous claims.

Spaan (1989) introduced the nondeterministic Turing Machine and showed that it exhibits hypercomputing because it can solve the halting function. A nondeterministic Truing Machine is defined to be one in which many branching actions are allowed at each instructional step rather than one as in the case of the traditional Turing Machine. A WCC clearly has this capability because it is stochastic and it may have many instructions competing for the same operands. Hence, yet again, by comparison to the work of others, the WCCN is showed to be a hypercomputer.

The main result of this section is also the most significant work of this research project. It shows that WCCNs/WCCs, as well as biological organisms, have hypercomputing potential and thus are potentially more powerful than any current digital computer. The result does not prove that all WCCNs are hypercomputers, but only those with a set of instructions that meets the criteria of definition for the theoretical cases described above. The result opens the door for much future research into how WCCNs, as well as biological organisms, can achieve computational functions that modern day digital machines cannot achieve at all. It is one that has not been previously demonstrated in the literature. This result was achieved by construction. The WCCN was shown to be a hypercomputer by showing its isomorphism to known theoretical hypercomputers. The WCCN and WCC were constructed by definition through analogy to biochemistry and biological cells.

4. Computability and Complexity

The evaluation of several computing problem classes for WCCNs/WCCs is provided here. There are several metrics of computational performance that are of interest. This work is limited to the following evaluations:
1. Is the problem class computable? That is, does the algorithms eventually halt at a correct solution.
2. How long does the problem class take to compute? This is called time complexity T(n) indicating the number of steps it takes to solve the problem as a function of the size n of the problem.
3. How much resource or space is required? This is called the space complexity and it measures the memory required S(n) for a problem of size n.
4. Is the problem programmable? In other words, is the genetic algorithm described in Chapters 2 and 3 as used to program a WCCN for the class of problem under consideration computable?

Each of these four factors will be reviewed for the following classes of computing problems:
   Arithmetic operations: Addition
   Symbolic programming and logic: Expert systems programs
   Statistical algorithms: Pattern recognition programs
   Complex systems: Simulation programs
   Nonlinear systems: control systems programs 4.2.1 Arithmetic Operations Arithmetic operations such as addition is a good example to use to baseline a computing architecture because it represents a problem that traditional von Neumann architectures are good at. There are a number of ways to implement arithmetic operations on WCCs. A few are discussed here before making a complexity estimate. As previously discussed, there are two distinct methods that addition can be performed, repeated here for convenience.

One way to implement addition in a WCCN is to build a WCCN of a large number of identical WCCs, each of which contain an instruction that combines a string operand with an energy token to produce a product that is exported. One can add two numbers by injecting a large quantity of the operand into the WCCN proportional to each number and measuring the quantity of the resulting exported product, which is produced by merely moving data. Another way of doing addition with a single WCC is to construct a pathway of logic gate instructions that implements the addition circuit from a traditional digital circuits book. Addition is accomplished by injecting operands in quantities proportional to the numbers being added and measuring the concentration of some resulting product at the end of the pathway. Regardless of which of these two approaches is taken, the complexity analysis is similar.

Computability. The addition problem will converge on the right solution after enough time every time. There is nothing inherent in the algorithm definition that would lead it astray. It is certainly possible that some approximate solutions would be produced, but the average concentration would always converge on the answer due to the law of large numbers.

Time Complexity. For the first method of solving addition, an operand merely moves through the WCC until an energy enzyme expunges it into the WCCN region. This happens in parallel for all operands and hence the time complexity is on the order of one time step and not proportional to problem size.

Space Complexity. The space complexity is proportional to the answer because the number of operands injected into the network is proportional to the addends.

Programmability. The best method of programming is manual because there is no nonlinear optimization or genetic recombination required in order to develop a better program.

Addition is a simple example. It produces only approximate and not exact answers and therefore a traditional von Neumann machine would be required for applications like accounting where is required, but a WCCN may be a good choice for an application like simulation where approximation is acceptable. The complexity properties are good as convergence is guaranteed and the solution is performed in pure parallel and is therefore fast. The space complexity is undesirable as the resource need grows with the problem answer. Overall, traditional mathematics may be best left to the von Neumann machine, but is certainly possible and useful in WCCNs/WCCs when needed for approximate answers as a step toward solving some other problem.

4.2.2 Symbolic Programming and Expert Systems

The field of Artificial Intelligence has emerged since the 1970s with various computing problem classes. Many of them follow the lines of symbolic computing that is largely based on logic, search and symbol manipulation.

Expert systems are programs that capture expertise and store them as facts and inference rules. On first look, it may appear that WCCs are good candidates for expert systems because their instructions are rules. But the WCC rules are statistical and low level. They do not capture high level intuitive facts. It is possible that an expert system be manually coded into a WCC, but only if the rules can be neatly packaged into a lot of small symbolic transforms that operate in statistical concentration. Certain kinds of expert systems, such as those that operate over fuzzy data (for example, medical diagnosis) may be able to be coded this way. Let's do a brief assessment of the computational complexity of an expert system implemented in a WCC. It shall be assumed that all rules are stored in one WCC and the answers are provided via I/O instructions.

Computability. There is no guarantee that an expert system consisting of WCC instructions will converge, nor can a time estimate be made. The path through the rules leading to a conclusion may vary with the problem and the input data.

Time Complexity. An expert system may have N rules. However, that says nothing about how many times each rule, if any, must execute, before the problem halts with a successful solution. Unlike mathematical problems, the time complexity of an expert system cannot be completely estimated.

However, one aspect of it may be estimated. Suppose there are N rules and an operand is just produced that is destined for rule k. The operand must move randomly in the WCC region it belongs to until it randomly arrives to instruction k. If there are N instructions and the average time for a random walk to an arbitrary instruction is T, then after T seconds there is a 1/N probability that the operand has reached the instruction. This corresponds to a geometric probability density function with parameter 1/N. The total time to find the instruction will be proportional to N. Hence, the larger the rule set, the longer the execution time. Execution time will also be inversely proportional to the number of copies of the rule set and the number of copies of the operand, so a proper design could minimize execution time in trade for space complexity (see below).

Space Complexity. For a system with N rules, M operands and K copies of each rule and L copies of each operand, the storage required is KNr+MLb where r is the size of a rule in atomic units and b is the size of an operand in atomic units on average. If the system is dominated by a large number of rules, the storage is proportional to N. If it has a small number of rules and is dominated by operand concentrations, then the space requirement is driven by the MLb term, which is independent of program size.

Programmability. The success of an expert system in a WCC will depend on the ability of the programmer to manually craft an elegant solution. The genetic programming methodology outlined in Chapter 3 is unlikely to be broadly applicable to expert systems other than simple pattern recognition tasks.

In summary, it appears for conceptual reasons that expert systems and symbolic programming are not the best candidate problems for WCCs. If one is implemented, its success is at the mercy of the programmer who must implement it manually in most circumstances, and the computability of the particular problem domain. The genetic programming algorithm may possibly be able to optimize the rule-base for some problems, but the author is aware of no research yet to support this. In conclusion, expert systems might be selectively implemented in and experimented with in WCCs. With proper choice of K and L, the execution time could be minimized in trade for more storage or "hardware".

4.2.3 Pattern Recognition

It has already been showed by demonstration in Chapter 3 that pattern recognition is an area of promise for WCCs. Further, it was argued that WCCNs are stronger than neural networks for pattern recognition because of their inherently more general structure. For the purpose of analysis of computing performance, the character recognition example of Chapter 3, section 3.6.2 shall be used. The algorithm shall not be repeated here but referred to by reference.

Computability. The character recognition problem described in Section 3.6.2 is a feed forward three layer CA. It always produces an answer at the output of the third layer, although one can never say it always produces the right answer. Hence, it always converges to a solution.

Time Complexity. The three layers are massively parallel and all compute at once. The recognition of a character occurs in three steps using this architecture and k steps in a general feed forward pattern recognition CA architecture, where k is independent of N, the size of the problem. Hence, pattern recognition problems organized in this manner compute in fixed time independent of problem size as the problem size is distributed over space complexity instead.

Space Complexity. For N characters and K copies of each WCC per character, the first layer will require NK WCCs, each capable of handling a string of size n×n for the character image. The second and third layers involve a count and sort operation which require N WCCs and at least one WCC. The value of N is fixed for most pattern recognition problems (i.e., the number of characters to be recognized) and the statistical strength of the algorithm depends on choosing a large K for extensive replication. Hence space complexity is determined by desired accuracy and is driven by the quantity NK.

Programmability. Supervised learning best programs pattern recognition problems. That is, some external influence "tells" the program whether it is right or wrong and the program adapts to the feedback. This is an excellent fit for the genetic programming method proposed, but it requires feedback, which could be accomplished in the form of a test file, or better yet, ongoing use of the program. The program will always converge to a solution, not necessarily the best solution.

Overall, WCCNs/WCCs are excellent for pattern recognition. The time complexity is brief, the space complexity and hence cost is driven by desired accuracy, and convergence is guaranteed, although accuracy is not necessarily. However, it was argued in Chapter 3 that WCCNs/WCCs are at least as strong as neural networks for solving any pattern recognition problem because they are a generalization of neural networks (which can be represented as a CA).

4.2.4 Simulation of Complex Systems It has been shown by example (the immune system) that WCCNs are suited to complex systems simulation. The fact that WCCNs were derived by analogy to biology should make that no surprise. The immune system was used as an example of a complex simulation that could be implemented in a WCCN due to its ABM properties.

Computability. Complex systems generally do not converge to a point solution, but instead they "behave" according to a trajectory in state space indefinitely unless they halt. The goal of complex simulation would be to create a WCCN implementation that cam close to a realistic set of trajectories. That is a programmability issue and is discussed below. Once the complex simulation is programmed, it will converge to a trajectory always. However, the quality of such a solution depends on the programming performance.

Time Complexity. Koza (1999) argues that genetic programming has time complexity on the order of $N^2$ for a system with N parameters. Hence the programming time will be proportional to the number of parameters being programmed. The more complex the system, the greater N will be, but no specific value can be stated in general for all systems. This means large scale systems will take many generations to adapt to an optimal solution. This is not unlike what the biological world has experienced with evolution.

Space Complexity. The space complexity of complex systems will be proportional to the number of agents in the system. Generally such systems are efficient in time at the expense of state. A biological example is that the human body has 100 trillion cells and hence has space complexity of 100 trillion WCCs. The simulation of a complex phenomenon like the weather is a 3 dimensional CA problem where many cells are required for accuracy. The number of cells could easily be in the trillions for even a small volume of space for accurate simulation. But WCCNs are designed o have a large number of WCCs. Once the technology matures to use biological cells or biochemical agents as WCCs, achieving such large numbers will be easily possible.

Programmability. Complex simulation is highly suited to genetic programming. Part of the reason for this is that WCCNs and WCCs were designed by construction from biological cells which themselves are complex systems. A well designed program will "adapt" to its environment over an unspecified number of "generations" of programming. This cannot be bounded because of the inherently open nature of complex systems.

4.2.5 Nonlinear Systems and Control

Control of nonlinear systems is a direct extension of simulation of complex systems. First, that will be established, and then the results from 4.2.4 may directly apply accordingly to provide a computational assessment of control as a function for WCCNs.

The complexity analysis for nonlinear control is essentially the same as for complex simulation. This is because most realistic nonlinear control problems are not merely a nonlinear differential equation with an input function, but instead are complex systems with many variables. For example, consider the task of trying to control the delivery of a drug into a human body by injecting biochemical agents into the bloodstream. It is an ABM, much like a complex simulation.

Another example using electrical stimulus to control epileptic seizures. Such events are known to be complex systems with trajectories and attractors (Bar-Yam, 1993). ABMs can be used to both model and control them. Once again, this is not unlike simulation. The only difference is one added calculation—the control input. This essentially involves iterating over a simulation until proper results are achieved and hence control is of the order of complexity of simulation with an added dimension for iteration.

Evaluation of Computing Problem Classes

Section 4.2 provided a summary complexity analysis of several classes of computing problems for WCCNs/WCCs. The purpose of this section is to provide an overall assessment of the suitability of these classes of computing problems to WCCNs/WCCs, including practical aspects. Table 4.3-1 summarizes the complexity assessment of each problem class, followed by a concluding discussion.

TABLE 4.3-1

Complexity of Problem Classes.

| PROBLEM | Computability | Time Complexity | Space Complexity | Programability | COMMENT |
|---------|---------------|-----------------|------------------|----------------|---------|
| Mathematics: Addition | Always Converges | $O(1)$ Order of 1 | Proportional to answer | Manual Only | Approximate Answers |
| Expert System | Not Guaranteed | N The Rule Set Size | ML Operands x quantity | Manual | Brittle |
| Pattern Recognition | Always Converges | Fixed Time $O(1)$ | NK for N classes and K replicas | Converges to a Solution | At least as good as neural nets |
| Complex Simulation | Converges to trajectory | Computed in parallel, indefinite | Proportional to number of agents (trillions?) | $O(N^2)$ where N is number of parameters | Natural fit for WCCN |
| Nonlinear Control | Converges to trajectory | Same as simulation N times for control function | Proportional to number of agents (trillions?) | $O(N^2)$ where N is number of parameters | Similar to simulation |

Problems that are well suited to WCCNs/WCCs are those that have good time complexity and good programmability and/or computability. Generally such problems will also have what appears to be poor space complexity. However, WCCNs/WCCs are designed with the notion that there will be very large numbers of WCCs in a WCCN. Otherwise, conventional computing machines may be just as good for these problems.

The table clearly shows that pattern recognition, complex simulation and nonlinear control are excellent fits for a WCCN/WCC environment. Each is a problem class that is difficult on a conventional computer and natural fits for the WCCN/WCC based on its computability, programmability and complexity. On conventional computers, the programmability is enormous for these classes of problems and the convergence is questionable at best, but most important, enormous computing resources are required. Supercomputers have often been resorted to for the solution of problems in these classes.

Mathematics, on the other hand, can be implemented on WCCNs/WCCs, but it produces only approximate answers and has the undesirable property that the amount of resources required are proportional to the numbers involved. Expert systems and symbolic programming do not perform especially well on either WCCNs/WCCs or traditional machines and perhaps need another kind of architecture for its optimal implementation, although they can be implemented on WCCNs/WCCs.

4.4 Findings: The Research Questions Revisited

As part of the research plan to answer the main question, ten sub-questions were posed in Chapter 1. Each of those questions was addressed throughout this patent applicaiton. In this section, the 10 sub-questions are stated along with the key findings in response to each in question order.

4.4.1 Sub-question 1

What are 10 examples of computing instructions that typify a WCC?

This question was answered in Section 3.3. It did this by analogy to biological reactions and phenomena. The results included the abstract definition of an instruction as follows. An instruction I is defined as the transformation of a set of N operands: $O_I = \{O_{I1}, O_{I2}, \ldots O_{In}\}$ into a set of M products $P_I = \{P_{I1}, P_{I2}, \ldots P_{IM}\}$ in the presence of a set of L invariant operands called enzymes: $E_I = \{E_{I1}, E_{I2}, E_{IL}\}$.

Sections 3.3.1-10 provided the ten examples ranging from ion channel analogs, to logic gates, to biochemical pathways derived from bioinformatics databases. These ten examples provide a wide range of instruction illustrations as well as coverage of critical computer logic instructions that underlie all of conventional computing. These examples provided the basis to delve deeper into computing problems and generalize the definition of a WCC.

4.4.2 Sub-question 2

How are the concentration levels of "operands" and the second law of thermodynamics relevant to computing with these instructions?

This question was answered in Sections 3.2 and 3.5. It did this by first introducing the notion of statistical dataflow computing in Section 3.2 and then introducing the notion of a random motion property in the operating system in Section 3.5. The concepts were derived by analogy to the behavior of real cells. The results were built into the definition of the WCC. The computational output does not depend on the execution of any one instruction just one time, but multiple copies of the instruction and executed multiple times and the output is based upon the statistical aggregate concentration of the relevant operands. The notion that instructions are executed many times by many copies of operands that move randomly around WCC regions was explained as well as its motivation from the $2^{nd}$ law of thermodynamics. In essence, it brings the concept of the second law of thermodynamics into computing.

4.4.3 Sub-question 3

What are the architecture of WCC in terms of "organelles" (compartments or membrane bound subsets), the "nucleus" and its functions, and the concentrations levels of "operators" (i.e. enzymes)?

This question was answered in Sections 3.2 and 3.5. It did this by analogy to real cells and construction of the definition of the WCC and WCC operating system principles. The results included a WCC architecture with multiple regions (see FIG. 3.2.-1 for illustration) where different instruction sets operate in different regions. The WCC operating system was defined to process instructions over operands in the specific region where they are located, yet enable operands to cross region boundaries via I/O instructions.

4.4.4 Sub-question 4

How are sample instructions "derived" from bioinformatics databases?

This question was answered in Section 3.3. It did this by example, using glycolysis as a biochemical pathway that can be extracted from known bioinformatics databases, and then used to define an instruction in a WCC environment. The results were successful and show a direct isomorphism between bioinformatics database entries that store biochemical pathway information and analogous instructions in a WCC environment.

4.4.5 Sub-question 5

How are WCCs configured into a network to solve problems?

This question was answered in Section 3.4. It did this by showing that WCCNs are a special case of the existing theory of ABMs, and by using the immune system response as an illustrative example. The results are summarized in Table 3.4-1 where properties of ABMs are identified that has a relevant role in organization of the architecture of a WCCN. There are no instructions at the WCCN level per se, as they all are inside specific WCCs. But the network architecture and set of I/O instructions within the WCC brings about an emergent behavior in the WCCN that solves problems.

4.4.6 Sub-question 6

How are WCCs "programmed" using genetic programming techniques?

This question was answered in Section 3.7. It did this by mapping the genetic programming techniques from Chapter 2 onto the parameter space of a WCC. The results are summarized in Table 3.7.1, which shows how to use the standard genetic programming algorithms presented in Section 2.3 and apply it to the programming of a WCC and/or a related WCCN. Programming can also proceed manually for problems of well defined or rigid structure.

4.4.7 Sub-question 7

Show 2 examples of computing problems and how they are solved using WCCs (lymphocyte response simulation in the immune system, and intelligent character recognition).

This question was answered in Section 3.6. It did this by giving several examples of small computing problems and then applying the concepts learned in the smaller problems to fill in some of the details of the immune system simulation. The results included a description of the character recognition problem and of the immune system simulation problem from the perspective of how they would be implemented in a WCC environment. In each case, sample instructions were provided and a functional description of the method of solution was given.

4.4.8 Sub-question 8

How well do WCCs perform in terms of time to solution, computing resources required, time to program, ability to solve a problem (computability), etc.?

This question was answered in Sections 4.2.1–4.2.5. It did this by enumerating 5 different problem classes and analyzing the computability, time complexity, space complexity and programmability of each. Examining the computability of the genetic programming algorithm for some of the problem classes assessed the programmability. The results were that all five problem classes could be solved on a WCCN/WCC, although some of them (such as expert systems) could only be solved for specific implementations. Some problem classes worked better than others and a summary of the performance was given in Section 4.3

4.4.9 Sub-question 9

What classes of problems are best solved with WCCs and networks of WCCs? Provide an assessment of their computability.

This question was answered in Sections 4.2 and 4.3. It did this by applying standard computational complexity questions to examples of implementations of various problem classes in WCCNs/WCCs. The results were described completely in Section 4.3 and will not be repeated here.

4.4.10 Sub-question 10

What are some potential physical/hardware implementations for WCCs?

This question was answered in Section 3.8. It did this by surveying a range of possible technologies through the literature and then describing how each can potentially satisfy the requirements for a WCC implementation. The results were the identification of at least a half dozen possible implementations ranging from silicon chips to artificial cells.

A response to the main research question posed in Chapter 1 is provided in Chapter 5.

CHAPTER 5

Summary, Conclusions and Future Research

This research sought to answer the following main question: "How can one define and utilize a computational paradigm based on the biochemical behavior of eukaryotic cells to solve complex computing problems which are otherwise difficult for conventional machines?" This question has been answered through the constructive definition, conceptual examples and analysis provided throughout Chapters 3 and 4.

In this concluding section, three topics are specifically addressed. These are:

- A summary of the research that was accomplished and the key findings
- A technical explanation to answer to the main research question
- A recommendation of areas of further study, given what has been accomplished within this project.

5.1 Summary of Research Accomplished

A new computing architecture that mimics the behavior of biological cells (called a whole cell computer) was defined by this research. The Whole Cell Computer (WCC) is a computational architecture only (and is therefore independent of what hardware or physical implementation is used to render it) and it is based on the biochemical processing of cells, it "computes" by cooperating with a "network" of WCCs, and it is "programmed" by genetic recombination. It draws from recent success in molecular biology, bioinformatics and systems biology and it offers the promise of a machine that can solve pattern recognition problems, complex simulation problems and biochemical process problems (such as drug delivery or toxicity assessment).

This section summarizes the major tasks and the most significant findings of this research. The following research tasks were completed by this work:

1. Viewing a eukaryotic cell as a computing device assessed the computational properties of cells. Using the principles of computer architecture, the functioning elements and principles of cells from a computational perspective were identified. This was provided in Section 3.1.
2. A broad set of computational problems was used as exemplar functions to extract the most important elements from the computing properties of a cell to define a WCC. The definition of a WCC was provided in Section 3.2. the concept of statistical dataflow computing was introduced as a means to characterize the statistical nature of cellular chemistry as a computing machine.
3. Examples of computational instructions that can be implemented on a WCC were provided in Section 3.3. This included arithmetic functions, biochemical functions, and most important, logic gates.
4. The method by which WCCs function in complex systems networks, WCCNs, was studies and explained in Section 3.4. It was concluded that WCCNs behave like ABMs, making modeling complex systems a natural fit for WCCNs.
5. The conceptual description of a WCC operating system and its features were derived by analogy to biological cells and elucidated in Section 3.5.
6. Advanced computing problems, including pattern recognition complex system simulation including the human immune system, pattern recognition and control of non-linear distributed processes were described conceptually including a description of how they would be implemented in Section 3.6. this included the significant argument that WCCNs are more powerful than neural networks for the solution for pattern recognition problems.
7. A method for programming the WCCN and WCC using genetic programming was presented in Section 3.7. Genetic programming is the logical method of optimization of complex systems and therefore the logical programming method of WCCs/WCCNs.
8. There are numerous potential technologies for the full implementation of a WCC/WCCN system and there are numerous potential applications. A set of possible physical implementations for WCCs was discussed in Section 3.8. While most of this was left to future research, significant promise was uncovered.
9. It was discovered that WCCNs/WCCs exhibit hypercomputing power as discussed in Section 4.1. This means that certain WCCN/WCC configurations are more powerful than Universal Turing Machines. A corollary observation is that biological organisms have the potential to be more powerful than Turing Machines in terms of their information processing capability.
10. The computational complexity of five problem classes was assessed in Sections 4.2–3. Some of the novel issues that were addressed and reported on by the study include:
6. The use of bioinformatics databases to compile representative instructions was accomplished in Section 3.3.
7. The use of a truly biological and distributed problem (simulation of lymphocyte response in the immune system) to define instruction sets, architectural configuration and state variables of importance was accomplished in Section 3.6.
8. The use of genetic programming to optimize the architecture for solving a problem—something that has only been speculated but not demonstrated for cellular architectures, was provided in Section 3.7.

9. A processing mechanism that takes into account "operator" and "operand" concentration levels in a statistical and/or stochastic manner as required was defined. This has only previously been demonstrated in systems biology, and is for the first time mechanistically applied to cellular processing architectures here and was discussed in Sections 3.2 and 3.5.

The most important findings and results were:
1. WCCNs and WCCs behave according to the principles of complex systems.
2. WCCNs and WCCs have hypercomputing power because they can sole the halting problem that the Universal Turing machine is unable to solve. This is significant and unique because it broadens the class of complex recursion problems that may be solved by WCCNs/WCCs that otherwise cannot be solved by Turing machine equivalent computers.
3. A corollary observation is that biological organisms exhibit potentially hypercomputing power. This implies that organisms could be more powerful than traditional digital computers. While this may be intuitive, it has not previously been shown.
4. WCCNs and WCCs are highly suited to solving large scale problems in pattern recognition, complex system simulation and nonlinear control of distributed systems.
5. It was persuasively argued that WCCNs/WCCs are at least as good as, and potentially superior to neural networks for all applications of neural networks.
6. There are numerous potential applications to medicine, biology, nanotechnology, theoretical computing and system modeling.

5.2 Conclusion: The Main Question

The question, "How can one define and utilize a computational paradigm based on the biochemical behavior of eukaryotic cells to solve complex computing problems which are otherwise difficult for conventional machines?", was addressed throughout this patent application. The answer lies in the concatenation of the answers to the 10 sub-questions, which were each concluded in Section 4.4. Together, Chapters 3 and 4 explain how a WCC can be implemented in a network called a WCCN that mimics biological computing properties and solves problems. Section 5.1 highlighted the most significant findings.

These innovations are significant because no architecture based on cellular processing or membrane computing to date has yet been illustrated over a large-scale computing problem, nor has one been shown to be genetically programmed in mechanistic detail. The significance of these innovations is threefold:

It brings new understandings of distributed computing by solving problems with a new paradigm. Greater practical and theoretical understanding was attained, especially through the Turning machine analysis in Section 4.1.

It offers the potential of using real biological cells as computing devices, as described in Section 3.8.

It potentially leads to greater understanding of biology (from forward modeling), which may include insights into why selective cell properties are the way they are.

Some of the key features, which underlie the answer to this main question, are:
9. Control is distributed with many inter-related processors operating asynchronously in parallel. In fact, it is the highly parallel, asynchronous, distributed architecture that makes WCCNs/WCCs novel.
10. The machine is a data flow, not a control flow architecture. It follows the principles of the second law of thermodynamics as defined by the concept of a statistical dataflow machine, presented in Chapter 3. Execution is driven statistically and therefore the principles of "soft computing" are used and results interpretation based on entropy and thermodynamic principles.
11. Programming takes place by adapting to the problem environment and surviving competitive solutions, using genetic programming techniques. Programming may also proceed manually, giving the maximum flexibility for this kind of computing device.
12. Instructions can be derived from bioinformatics by mining databases. This was illustrated in Section 3.3 with the derivation of a biochemical reaction.
13. The solution of problems using a WCC is accomplished by deploying a large network of WCCs that operate together in parallel. This enables the trade off between time complexity and space complexity, a well known property of biological organisms. Potentially, "NP complete" problems can be solved in linear time by deploying an "exponential volume" of processors.
14. The computer can be considerably simpler than a real cell, although real cells could potentially be used as WCCs.

5.3 Recommendations and Future Directions

This research on WCC has produced successful results. However, it is very early in the research of cellular architectures for computing. Hence, much study is yet to be done on the architecture, implementation, application and potential of this exciting technology area. There are a host of practical problems to be solved as well as enormous potential for additional theoretical research. The technology of WCCNs/WCCs, as well as the broader area of cellular architectures, has enormous potential. This section identifies the most promising areas for further research based on the experience of this project.

1. Architectures for cellular computing motivated by biology are nascent. The proposed WCC design concept and WCCN architecture are a detailed starting point, but by no means have addressed all the issues or optimized every idea. Further and deeper research into the WCC architecture should be carried out over several years.
2. Reverse engineering of the cell may become more feasible by forward modeling with WCCs and WCCNs. The known biochemical knowledge and bioinformatics principles can be programmed into a WCCN and used to simulate the response of cells to stimuli. This can be verified with laboratory data. This would make a valuable contribution to the emerging area of systems biology toward understanding cells and cellular circuits.
3. Modeling biological systems through WCCN simulations is possible, whether this is in a real WCCN or a simulated one on a supercomputer. The models can address problems in understanding tissues and tissue engineering, the immune system simulation, evolution, cellular response to drugs, impact of mutations on disease, and understanding the proliferation of cancer.
4. Biochemical implementations should be explored that make use of complex organic molecules to implement WCC regions, instructions or operands.
5. The strength of WCCNs in control of nonlinear systems combined with its micro-implementation potential has promise in the areas of microsurgery applications, drug delivery systems, and other biomedical intervention needs.
6. Simulation of complex systems can be carried out with WCCNs. This may include weather, stock market, socio economic evolution, cosmology, wind tunnel simulation, human brain, cancer, cellular metabolism, complex engineering designs etc. It will become possible not only to learn about these systems, but about complex systems in general. This would be a valuable addition to the work of the Santa Fe Institute.
7. Advances in computing algorithms can be studies using WCCNs as a testbed. Understanding distributed computing operating systems, theoretical computing limits, advances in artificial intelligence, pattern recognition performance and other areas are all very promising and should be pursued.
8. Modeling, simulating or synthesizing nanotechnology devices is another promising area that needs to be explored for its potential.

In summary, there is no shortfall of new research potential that is opened up by the concept of the WCCN/WCC. The results achieved are a baseline and many new projects will be established form here.

Glossary

This section defines technical terms specifically relevant to the reported on research problem. The list is not intended to be a comprehensive index or glossary, but rather a listing of terms that may be new or jargon related to the specific field of computing architectures based on cellular processing. Use of a term in the specification is with reference hereto.

| | |
|---|---|
| ABM | Acronym for "Agent Based Model". |
| Active Transport | The movement of molecules aided by energy. |
| ADP | Adenosine Di-Phosphate. This is a lower energy Molecule than ATP and the state ATP transitions To upon use of its energy in cellular activities. |
| Agent Based Model | Model of computing where many independent "agents" or processors act with rules or heuristics and outcome is based upon collective agent state. |
| Allosteric Protein | Protein that changes shape based on the absence or Presence of certain other binding molecules. |
| AND gate | Computer logic gate whose output is high or 1 when Both (or all) inputs are high or 1. |
| Antibody | A highly specific glycoprotein molecule secreted by a B cell to bind with invading antigens. |
| Antigen | A molecule that binds to an antibody. |
| Apoptosis | Process of self triggered death or suicide in cells |
| Artificial Enzyme | A computing operator that behaves like an enzyme. |
| ATP | Adenosine Tri-Phosphate, a high energy molecule Responsible for energy storage in cells. |
| Attractor | Trajectory in a complex nonlinear system that repeats itself over time. |
| B-Cell | Immune system cell produced in the bone marrow. It produces antibodies to counter invading antigens. |
| Bioinformatics | Field relating to the computer codification of molecular biology data and processes in databases and algorithms. |
| Bioinformatics Databases | Databases such as GenBank and Swiss-Prot containing gene, protein, pathway or other biological sequence or gene expression files. |
| Biosynthetic Pathway | A chemical pathway that synthesizes a compound. For WCCs, this can mean a sequence of instructions that produces a complex operand. |
| CA | See "Cellular Automata" |
| Cache | Short term, high speed memory in computers. |
| Catalyst | A molecule that causes a reaction to occur. Enzymes are catalysts. |
| Cell Cycle | The process a cell goes through to divide and Reproduce. |
| Cellular Automata | Computing architecture that involves locally connected cells, each obeying certain rules. |
| Cellular Computing | Computing architectures defined from concepts Derived from cellular biochemistry and biology. |
| Chloride | An ion symbolized by $Cl^-$. |
| CPU | Central Processing Unit. Main computing register In von Neumann architectures. |
| Complex System | A large scale distributed system consisting of many objects and relationships, typically following the rules of nonlinear dynamics, chaos or cellular automata. |
| Computability | Theory concerned with whether an algorithm exists Or not to solve a particular class of problems. |
| Cytoplasm | The heterogeneous fluid inside the cell. |
| Dataflow Computing | A type of computing architecture where processing Is dependent on the flow of operands rather than a Predefined sequence of instructions. |
| Decidability | A property of algorithms that determines whether or not a conclusion can be reached either via convergence or termination. |
| Distributed Computing | A branch of computing where the computations occur in many different locations, yet coordinate to solve a problem. |
| DAI | Acronym for "Distributed Artificial Intelligence" |

-continued

| | |
|---|---|
| Digestion | The reduction of a larger molecule into two or more smaller molecules by cleavage. |
| DNA | Deoxyribonucleic acid, the molecule containing Genes in biological organisms. |
| DNA Computing | A computing architecture that uses DNA as its main processing element. |
| Enzyme | In biochemistry, a protein that catalyzes a reaction. For WCCs, an operand that triggers a computation. |
| Eukaryotic Cell | A biological cell with a nucleus and organelles. Typically found in plants and animals. |
| Evolutionary Algorithm | A computing algorithm that solves problems through some form of genetic recombination and selection of the best fit. |
| Exocytosis | A cellular process whereby molecules are exported from the cell by merger of a vesicle containing them with the cell wall. |
| Expression level | An indicating of the concentration of mRNA transcribed for a particular gene in cells. |
| Endocytosis | A cellular process whereby molecules are imported into the cell by merger into the cell wall creating. |
| FA/C | Acronym in the field of DAI for "Funtionally Accurate and Complete model". |
| G Protein | A class of transmembrane proteins involved in cellular signaling by ligands. |
| GABA | Acronym for gamma-alpha-beuturic acid, a neurotransmitter molecule. |
| Gene Expression | The set of genes in a cell that are active. This determines whether certain proteins or enzymes are produced. For WCCs, the term denotes the set of operands and artificial enzymes that are present. |
| Genetic Network | A network describing the regulatory patterns of genes. |
| Genetic Programming | A method of programming by genetic recombination. See also evolutionary algorithm. |
| Glucose | A sugar molecule that provides energy for cellular metaabolism |
| Glycolysis | The chemical reaction process in the cell that converts glucose into pyruvate. |
| Glycolytic Pathway | The biochemical pathway describing glycolysis. |
| Helper T Cell | T lymphocyte whose function is to activate macrophages and promote B cell antibody production. |
| Hexokinase | An enzyme in the glycolytic pathway that Catalyzes the conversion of glucose to glucose-6-phosphate |
| Hormone | Small molecules that act as cellular signals. |
| Hypercomputing | Computing functions exhibited by a computer Design that exceed Turing Machine capability. |
| Immunolglobin | Globular protein synonymous with antibody. |
| Interrupt | A signal that stops the flow of computing. |
| I/O | Input/output. |
| Ion | A charged molecule used in cellular current flow. |
| Ion Channel | A protein that allows ions to cross the cell wall. |
| Ionic current | Electric current as a result of ion transport. |
| Isomerase | A reaction that changes the configuration or properties of a reactant (operand). |
| JAK/STAT | A key signal transduction pathways in cells Involved in gene expression and cancer. |
| Join and Break Enzyme | Artificial enzymes that concatenate or split lists. |
| Knockout | A gene that is removed from a laboratory specimen To conduct a biological experiment. |
| LAC operon | Regulatory binding regions controlling expression of genes relevant to lactose regulation in bacteria |
| Ligand | A molecule that binds to a cell's surface usually causing signaling or blocking of pathways |
| Ligation | The process of merging two molecules to make a larger one. In WCCs, this is merging 2 strings. |
| Lysosome | Cellular organell responsible for digesting large molecules. |
| Macrophage | An immune system cell that engulfs and kills microorganisms directly |
| Membrane | A boundary between two regions. The cell wall. |
| Membrane Computer | A type of cellular computing architecture that uses organelles extensively as locations of execution. |
| MEMs | Micro-electromechanical devices. |
| Metabolism | Energy processing in cells. The power supply in a WCC. |
| Microarray | DNA chip or array of single stranded DNA that hybridizes with expressed mRNA in experiments. |

-continued

| | |
|---|---|
| MIMD | Acronym for "Multiple Instruction Multiple Data" in the field of parallel computers. |
| Mitosis | The process of cell division. |
| Molecular Computing | Class of computing that uses molecular dynamics. |
| Motif | A subsequence of a protein that has a particular function. |
| mRNA | Messenger RNA, the RNA that encodes transcribed genes. |
| NAND gate | Logic gate for "Not AND". Outputs the opposite Of an AND gate. |
| Neural Network | Computer that uses networks of artificial neurons to complete computing or recognition tasks. |
| Neurotransmitter | Small molecule that is exported from a neuron by exocytosis and acts as a ligand or signaling molecule for a neighboring neuron. |
| Neutrophil | Cells of the immune system that engulf bacteria |
| NOR gate | Computer logic gate whose output is high or 1 when the inputs are either both low or 0 or else both 1 |
| O-Machine | Abstract computer invested by Turing that connects a Turing Machine to an oracle for added capability. |
| Operand | Item or data being operated on by an instruction. |
| OR gate | Computer logic gate whose output is high or 1 when any one of its inputs are high or 1 |
| Organelle | Membrane bound sac in a eukaryotic cell. Closed region of computation in a WCC. |
| Pathway | Coordinated sequence of chemical reactions. Coordinate sequence of instructions in a WCC. |
| Pattern Recognition | Computing problem whose goal it is to classify an object into a set. |
| Petri Net | A network of objects and rules for discrete event simulation. |
| Phenotype | The outward physical characteristics of a cell or organism based on genetic state. |
| Phosphorylation | Biochemical event that activates or energizes a complex molecule. Transfer of power supply energy to an operand in WCC. |
| Protein array | Similar to a microarray, but for proteins instead of DNA. |
| RNA | Ribonucleic acid. |
| Second Law of Thermodynamics | Law that says the entropy of the universe increases. For WCCs, it applies to statistical computing or determining results from operand concentration. |
| Sodium potassium pump | A biochemical mechanism for transporting sodium Ions into a cell as potassium ions leave, or visa versa |
| Substrate | Chemical species which undergoes an enzyme catalyzed reaction. In WCCs, the operand that is operated on by an instruction. |
| TCA Cycle | Also known as the Krebs Cycle, this is part of the cellular respiration cycle. |
| T-Cell | Immune system cell originating in the thymus. Responsible for signaling. |
| Transcription | The process of converting DNA to mRNA. |
| Translation | The process of converting mRNA into a protein. |
| Transmembrane protein | A protein that crosses the cell membrane and lodges There. Sometimes used in signaling. |
| Turing Machine | Abstract computing machine that consists of a serial tape of bits and simple rules operating on the bits. Often used as a baseline for theoretical computing comparisons. |
| Monte Carlo Simulation | Stochastic simulation where results are created using random numbers and aggregated statistics. |
| mRNA | Messenger RNA. Molecule that carries the coding of a gene to the translation process. |
| Phosphorylation | In biochemistry, this is the addition of a phosphate Group to an enzyme to add energy. |
| Ubiquilation | A biochemical process of tagging a protein with ubiquitin so that it will be digested. |
| Von Neumann Machine | Traditional computer architecture that is CPU based and depends on pre-programmed sequences of instructions. |
| Vesicle | A membrane enclosed structure in cells that is used to transport molecules from one place to another. |
| Virtual Memory | The apparent total memory available to a program. |
| von Neumann | Conventional type of control flow computer architecture named after John von Neumann |
| WCC | Acronym for "Whole Cell Computer". |
| WCCN | Acronym for "Whole Cell Computer Network". The set of WCCs used to solve a problem. |

| | -continued |
|---|---|
| Whole Cell Computer | Computing architecture that mimics the processing in eukaryotic cells and operates together in a network of other WCCs to solve problems. |
| XOR gate | Exclusive-OR gate. The output is high or 1 if either Input, but not both, are high or 1. |

References

Abbas, A. K., Litchman, A. and Pober, J. (2000). Cellular and Molecular Immunology, $4^{th}$ ed. Philadelphia: W. B. Saunders Co.

Abelson, H., Allen, D., Core, D., Hansen, C., Rauche, E., Sussman, G. and Weiss, R. (2000, May) *Amorphous Computing*. Communications of the ACM, 5, 74–82

Access Excellence (2003), at The National Health Museum. Graphics Gallery, accessed from http://www.accessexcellence.org/AB/GG/induction.html.

Addison, Edwin R. (2002, May). Subject Area Report for Structural Bioinformatics: Course 9", submitted in partial fulfillment of the degree of Doctor of Philosophy, Century University. Baltimore: Private Communication.

Adleman, L. (1994). Molecular computation of solutions to combinatorial problems. Science 266:1021–1024.

Arvind and Brobst, S., (1993) The evolution of dataflow architectures from static dataflow to P-RISC, int'l J. High Speed Computing 5, pp. 125–153

Axelrod, R. (1997) The Complexity of Cooperation: Agent-Based Models of Competition and Collaboration, Princeton: Princeton University Press Back, T. (1994). Evolutionary Algorithms: Comparison of Approaches. In Paton, R. (Ed.), Computing With Biological Metaphors (pp. 227–243). London: Chapman & Hall.

Bar-Yam, Y. (1997) Dynamics of Complex Systems. Reading, Mass.: Perseus Books.

Baxevanis, A. and Ouelette, B., (2001). Bioinformatics: A Practical Guide to the Analysis of Genes and Proteins. John Wiley, New York. $2^{nd}$ Ed.

Becker, W., Kleinsmith, L., and Hardin, J. (2000). The World of the Cell, $4^{th}$ Ed. San Francisco: Benjamin Cummings.

Bersini, H. and Varela, F. (1994). The immune learning mechanisms: reinforcement, recruitment and their applications. In Paton, R. (Ed.), Computing With Biological Metaphors (pp. 166–192). London: Chapman & Hall.

Biosensors. (2002). In: http://www.biosensors2002.com/

Boxer, L., Miller, R. and Rau-Chaplan, A., (1999) Scalable parallel algorithms for geometric pattern recognition. J. Parallel and Distrib. Computing 58, 466–386

Bray, D. (1990). Intracellular signalling as parallel distributed process. J. Theor. Biol. 143: 215–231.

Bray, D. (1995). Protein molecules as computational elements in living cells. Nature, 376:307–312.

Calude, C., and Paun, G. (2001). Computing with Cells and Atoms: An Introduction to Quantum, DNA and Membrane Computing. London: Taylor & Frances.

Clarck, L. (2000). A preliminary review of computational models applicable to cell signaling. In: http://www.csc.liv.ac.uk/~laurence/research/rereview.html.

Copeland, B. (1998) Super Truing-Machines. Complexity, 4:30–32

Copeland, B. and Sylvan, R. (1999) Beyond the Universal Turing Machine. Australian journal of Philosphy, 77:46–66.

Gray, S. (1996, May 30) An Imaginary Tour of a Biological Computer: Why Computer Professionals and Molecular Biologists Should Start Cooperating. Remarks of Seymour Cray to the Shannon Center of Advanced Studies, University of Virginia. http://americanhistory.is.edu/csr/comphist/montic/cray.htm (Oct. 24, 2002)

Coley, D. A. (1999). An Introduction to Genetic Algorithms for Scientists and Engineers. Singapore: World Scientific.

Dooley, K., and S. Corman, (2003) *Agent-Based Genetic And Emergent Computational Models Of Complex Systems*, under review at Encyclopedia of Life Support Systems.

Ferber J., (1995), "Les systemes multi-agent, vers une intelligence collective". InterEditions publishers.

Fernandez, J. The Genetic Programming Tutorial Notebook. (October, 2002) In: http://www.geneticprogramming.com/Tutorial/tutorial.html Forbes, N. (2000, November). *Biologically Inspired Computing*, Computing in Science and Engineering. In: http://www.computer.org/cise/articles/inspired.htm.

Forbes, N. and Landweber, L. (1999, September-October). *Computer Science and the Evolution of Genetic Information*. Computing in Science and Engineering. In: htt://www.Swiss.ai.mit.edu/projects/amorphous/News/nforbes-sept.html.

Garfinkle, S. L. (2000, May-June). Biological Computing. MIT Technology Review, 3, 70–77.

Gathercole, C. (1998). An Investigation of Supervised Learning in Genetic Programming. Ph.D. thesis. University of Edinburgh.

Genomic Object Net (2003). Genomic Object Net Projects Top Page. [website]; accessed Jan. 18, 2003 from http://www.genomicobject.net/member3/index.html.

Gurney, K. Nueral Nets: Dr. K. Gurney. In: http://www.shef.ac.uk/psychology/gurney/notes/contents.html. (October, 2002) University of Sheffield.

Harrogate. (2001, Jun. $26^{th}/27^{th}$). Report of the EPSRC Biologically Inspired Computational Systems Workshop. In:

http://www.cs.ucl.ac.uk/staff/W.Langdon/harrogate/BICS-_Workshop_Report.htm (October, 2002)

Hickman, J. J., Darema, F., and Adrion, W. R., (Co-chairs). (2000, Sep. 21), NSF Report of the Workshop on: Biological Computation: How does biology do information technology?". [A workshop proceedings by NSF], Arlington, Va.: NSF.

Hjelmfelt, A. and Ross, J. (1995). Implementation of logic functions and computations by chemical kinetics. Physica D., 84:180–193.

Holcombe, M. (1994). From VLSI through machine models to cellular metabolism. In Paton, R. (Ed.), Computing With Biological Metaphors (pp. 11–25). London: Chapman & Hall.

Horn, B. (1986). Robot vision. Cambridge, Mass.: MIT press, pp. 46–89.

Huang, S. (2002). Regulation of cellular States in Mammalian Cells form a Genomewide View. In Callado-Vidas (Ed.), Gene Regulation and Metabolism, Cambridge: MIT Press Hwang and Briggs. (1985). Computer Architecture and Parallel Processing. New York: McGraw-Hill.

Kampis, G. (1994). Life-like Computing Beyond the Machine Metaphor. In Paton, R. (Ed.), Computing With Biological Metaphors (pp. 393–413). London: Chapman & Hall.

Kanehisa, M. (2000). Post Genome Informatics. Oxford: Oxford University Press.

Karp, P., et. al. (2000). The EcoCyc and MetaCyc databases. Nucleic Acids Research, Vol. 28, No.1, pp. 56–59

Kaufmann, S. (2000). Investigations. Oxford: Oxford University Press.

KEGG (2003). Kyoto Encyclopedia of Genes and Genomes. In: http://bioinfo.weizmann.ac.il:3456/kegg/kegg2.html.

Koza, J. R. (1994). Evolution of emergent cooperative behavior using genetic programming. In Paton, R. (Ed.), Computing With Biological Metaphors (pp. 280–297). London: Chapman & Hall.

Koza, J. R. (1994). Genetic Programming II: Automatic Discovery of Reusable Programs. Cambridge, Mass.: The MIT Press.

Koza, J. R., Bennet, D. and Keane, M. (1999). Genetic Programming III: Darwinian Invention and Problem-Solving. NewYork: Morgan Kaufmann Publishers.

Krohn, Langer, and Rhodes. (1967). Algebraic principles for the analysis of a biochemical system. J. Thor. Biol., 116, 399–426

Kurzweil, R. (1999). The Age of Spiritual Machines. NewYork: Viking Press.

Lahoz-Beltra, R. (1998). Molecular automata modeling in structural biology. Advances in Structural Biology 5: 85–101.

Lahoz-Beltra, R. (1997). Molecular automata assembly: principles and simulation of bacterial membrane construction. BioSystems 44: 209–229.

Lahoz-Beltra, R. (2001). Evolving hardware as model of enzyme evolution. BioSystems 61: 15–25.

Lahoz-Beltra, R. And Di Paola, V. (2000). Towards a computational view of cell: do cells bear a resemblance with computers?. Madrid, Spain: Department of Applied Mathematics, Faculty of Biological Sciences, Complutense U. Madrid.

Langdon, William B. (1996). Data Structures and Genetic Programming. London: PhD thesis. University College. Also published as Genetic Programming and Data Structures: Genetic Programming+Data Structures=Automatic Programming! Amsterdam: Kluwer.

Leeuw, K., et. al. (1956). Computability by probabilistic machines. Pages 183–212 in C. E. Shannon and J. McCarthy, ed. Automatia Studies, Princeton university press, Princeton, N.J.

Lesser, V. (1987) Cooperation through communication in a distributed problem solving nework. In: Distributed artificial intelligence, Huhns, M. (ed.), London: Pitman Maes P, (1992), "Situated agents can have goals". In Designing Autonomous Agents, theory and practice from biology to engineering and back, edited by P. Maes. Vol 80(5).

Mano, M. (1976). Computer system architecture. Englewood Cliffs, N.J.: Prentice Hall, pp. 1–40.

Marijuan, P. (1994). Enzymes, automata and artificial cells. In Paton, R. (Ed.), Computing With Biological Metaphors (pp. 50–68). London: Chapman & Hall.

Rumelhart and McClelland. (1986). Parallel Distributed Processing, Vols. I, II. Cambridge, Mass.: MIT Press.

MuCulloch and Pitts. (1943). A logical calculus of the ideas in nervous activity. Bulletin of Mathematical Biophysics, 5, 115–133

Minsky, M. (1988). Society of Mind. Boston: Simon and Schuster.

Neimark, M. and Winfree, E. (2001, November). Reliable computation by circuits of unreliable biochemical gates. In: Yi, T., Hucka, M., Morohashi, M. and Kitano, H. (Eds.). Proceedings of the Second International Conference on Systems Biology. Madison, Wis.: Omnipress.

Ord, T. (2002) Hypercomputation: computing more than the Turing machine. Melbourne, Autralia: university of Melbourne, Dept. of Computer Science, thesis, In: http://arxiv.org/abs/math.LO/0209332

Paton, R. (Ed.). (1994). Computing With Biological Metaphors. London: Chapman & Hall.

Paton, R. (1994). Computing with biological metaphors—some conceptual issues. In Paton, R. (Ed.), Computing With Biological Metaphors (pp. 424–437). London: Chapman & Hall.

Paton, R. (2002). Fifth International Workshop on Information Processing in Cells and Tissues (IPCAT). [Announcement]. In: http://lslwww.etfl.ch/ipcat2003/.

Preuss, P. (2000, Summer). Circuits of a Cell. Berkely Lab Research Review. 3:1–7.

Ranka, S., and Sahni, S. (1989) Hypercube algorithms for image processing and pattern recognition. New york; Springer-Verlag. Chapter 1.

Rosen, R. (1979). Some comments on activation and inhibition. Bull. Math. Biol., 41: 427–45.

Saccharomyces Genome Database (2003), In: http://genome-www.stanford.edu/Saccharomyces/

Schwehm, M. (2001, November). Parallel Stochastic Simulation of Whole Cell Models, In: Proc. $2^{nd}$ International Conference on Systems Biology. Madison, Wis.: Omnipress.

Segal, L. (2001) design principles for the immune system and other distributed autonomous systems. Oxford: Oxford University Press.

SETI@ Home. (2002). The Search for Extra Terrestrial Intelligence. In: http://setiathome.ssl.berkeley.edu/. Berkely: SET@ Home.

Shackleton, M. A. and Winter, C. S. (1998). A computational architecture based on cellular processing. In Holcombe, M. and Paton, R., [Eds.] Information Processing in Cells and Tissues, pages 261–272, New York: Plenum Press.

Sigma-Aldrich (2003), Life Science as referenced in: http://www.sigmaaldrich.com/Area_of_Interest/Life_Science/Cell_Signaling/Pathway_Slides_an d_Charts/The_Jak_Stat_Signaling_Pathway.html#top Silc, J., Robic, B., and Ungerer, T. Asynchrony in parallel computing: from dataflow to multithreading. Parallel and Distributed Computing Practices, Vol. 1, No. 1, March 1998.

Small, P. (1998). How a human cell acts like a computer. In: http://avatarnets.com/cellbio/biosup1.htm.

Spaan, E. et. al. (1989). Nondeterminism, Fairness and a Fundamental Analagy. EATCS Bulletin, 37:186–93.

Spector, Lee, Langdon, William B., O'Reilly, Una-May, and Angeline, Peter [Eds.]. (1999). Advances in Genetic Programming 3. Cambridge, Mass.: The MIT Press.

Tackett, W. (1994). Recombination, Selection, and the Genetic Construction of Computer Programs. Ph. D. dissertation, University of Southern California. Computer Engineering Division. Electrical Engineering—Systems Department. Also available as Technical Report CENG 94–13, April 1994.

Tettamanzi, A. and Tomassini, M. (2001). Soft Computing: Integrating Evolutionary, Neural and Fuzzy Systems. Germany: Springer-Verlag.

Teuscher, C. (2001). Bio-Inspired Hardware and Computing Machines: Going Beyond Traditional Computation. In: *Christof Teuscher*, Lausanne, Switzerland, 2001.

Tomita,M., et. al. (1999) E-CELL: Software environment for whole cell simulation. Bioinformatics, Volume15, Number 1, 72–84

Turing, A. (1936). On Computable Numbers with Applications to the Entscheidungs problem. Proceedings of the London mathematical society, 42:230–265.

Turing, A. (1939). Systems of Logic based Ordinals, Proceedings of the London mathematical society, 45: 161–228.

Wasserman, P. (1989). Neural Computing: Theory and Practice. New York: Van Nostrand Reinhold.

Welch, G. R. (1994). The computational machinery of the living cell. In Paton, R. (Ed.), Computing With Biological Metaphors (pp. 40–49). London: Chapman & Hall.

Welch, G. R. and Kell, D. B. (1986). Not just catalysts—molecular machines in bioenergetics. In: The Fluctuating Enzyme, (Welch) New York: Wiley. pp. 451–92.

Williams, R., and Sears, B., Paraflow: a dataflow distributed data-computing system. In: Browsing to teraflops. California Institute of Technology, 1997.

Winter, C. (1994). The molecular computer. In Paton, R. (Ed.), Computing With Biological Metaphors (pp. 69–85). London: Chapman & Hall.

Wolfrom, S. (2001) A new kind of science. Champaign, Ill.: Wolfrom Media

Yamada, S. and Yoshimura, A. (2001), Computer Modeling of JAK/STAT Signal Tranduction Pathway, Genome Informatics 12: 282–283.

Yeshurun, Y. (2001, October). Principles of Intelligent Character Recognition. Today: The Journal of Work Process Improvement, TAWPI, p.22–24.

Yi, T. and Hucka, M., et. al., [Eds.] (2001). Proceedings of the Second Iternational Conference on Systems Biology. Madison, Wis.: Omnipress.

Zimmerberg, B. (2000). Synaptic transmission: a four step process. In: http://www.williams.edu/imput/synapse/pages/IIIA6.htm While the invention has been described in its preferred embodiments, it is to be understood that the words which have been used are words of description rather than of limitation and that changes may be made within the purview of the appended claims without departing from the true scope and spirit of the invention in its broader aspects. Rather, various modifications may he made in the details within the scope and range of equivalents of the claims and without departing from the spirit of the invention. The inventors further require that the scope accorded their claims be in accordance with the broadest possible construction available under the law as it exists on the date of filing hereof (and of the application from which this application obtains priority,) and that no narrowing of the scope of the appended claims be allowed due to subsequent changes in the law, as such a narrowing would constitute an expost facto adjudication, and a taking without due process or just compensation.

I claim:

1. A whole cell computer (WCC) comprising a computing node that operates in a network of many other WCCs of similar or different types, wherein:
   a) the WCC operates by the principles of stochastic dataflow computing;
   b) the WCC is classified as a membrane computer;
   c) the WCC substantially obeys the following basic principles:
      i. the WCC has at least one membrane bound instruction within it;
      ii. the WCC instructions convert one or more operands into one or more operand products and may optionally require the presence of additional operands that do not undergo change, and instructions execute upon the arrival of all necessary operands within a proximal distance to the instruction, which distance is determined by rule or instruction;
      iii. a state vector of the WCC provides information about results or status of which are determined by the statistical aggregate expression level and state vector as a result of the random motion and aggregate execution of instructions;
      iv. programs are stored as one or more strings of embedded operands in a latent state, and programs execute by arrival of activating or regulating operands;
      v. the WCC contains a "cache" memory, which maintains a single copy of each individual instruction that is active in a given WCC;
      vi. the WCC contains at least one of the following types of input-output instruction: 1) Instructions that cause operands to cross membrane boundaries, and/or 2) instructions that respond to ligands;
      vii. the WCC contains an operating system that provides the mechanism for copying instructions and operands from programs, delivering them to the proper location, and providing the power for their execution upon the arrival of their operands;
      viii. WCC program execution is massively parallel, distributed, multi-threaded and otherwise contains no central processing unit;
      ix. memory and computing results are stored via the state of WCC in a distributed manner, with short term memory of the WCC being the current state vector, and the long term memory of the WCC being the active pathways;
      x. when there are differing types of WCCs in a network, there must be more then ten copies of each type;
      xi. a WCC is robust to computing errors because there are many copies of any given instruction, operand or WCC in a network;
      xii. a WCC may cease to function by its own decision if it becomes defective; and
   d) the WCC may be programmed by manually fixing the instruction set and operands or through genetic programming.

* * * * *